US012429814B2

(12) United States Patent
Suetsugu et al.

(10) Patent No.: US 12,429,814 B2
(45) Date of Patent: Sep. 30, 2025

(54) IMAGE FORMING APPARATUS, PROCESS CARTRIDGES, AND CONNECTING MEMBER

(71) Applicant: CANON KABUSHIKI KAISHA, Tokyo (JP)

(72) Inventors: Masahiro Suetsugu, Kanagawa (JP); Hiroyuki Munetsugu, Kanagawa (JP); Shinjiro Toba, Kanagawa (JP); Shinichi Nishida, Kanagawa (JP); Yuichi Fukui, Kanagawa (JP); Takeo Kawanami, Kanagawa (JP); Yasuyuki Egami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/112,610

(22) Filed: Feb. 22, 2023

(65) Prior Publication Data

US 2023/0205129 A1 Jun. 29, 2023

Related U.S. Application Data

(63) Continuation of application No. PCT/JP2021/035215, filed on Sep. 16, 2021.

(30) Foreign Application Priority Data

Sep. 17, 2020 (JP) ................................ 2020-156781

(51) Int. Cl.
*G03G 21/18* (2006.01)

(52) U.S. Cl.
CPC ..... *G03G 21/1857* (2013.01); *G03G 21/1814* (2013.01); *G03G 21/1821* (2013.01);
(Continued)

(58) Field of Classification Search
CPC .......... G03G 21/1821; G03G 21/1825; G03G 21/1839; G03G 21/1842; G03G 21/1853;
(Continued)

(56) References Cited

U.S. PATENT DOCUMENTS 6,990,302 B2 1/2006 Toba
7,149,457 B2 12/2006 Miyabe
(Continued)

FOREIGN PATENT DOCUMENTS

CN 102165378 A 8/2011
CN 102193373 A 9/2011
(Continued)

OTHER PUBLICATIONS

International Search Report and Written Opinion for International Patent Application No. PCT/JP2021/035215.
(Continued)

*Primary Examiner* — Carla J Therrien
(74) *Attorney, Agent, or Firm* — Venable LLP

(57) ABSTRACT

An image forming apparatus includes a main assembly and a plurality of process cartridges detachably mountable to the main assembly. The process cartridges each includes a photosensitive member, a first frame rotatably supporting the photosensitive member, a developing member for depositing toner onto the photosensitive member, and a second frame rotatably supporting the developing member and movable relative to the first frame between a developing position for the developing member to deposit the toner onto the photosensitive member and a retracted position in which the developing member is more remote from the photosensitive member than in the developing position. The apparatus further includes a connecting member connecting at least
(Continued)

two of the second frames of the process cartridges and removable from at least one of the process cartridges and from the main assembly.

4 Claims, 50 Drawing Sheets

(52) U.S. Cl.
CPC ..... *G03G 21/1825* (2013.01); *G03G 21/1853* (2013.01); *G03G 2221/1684* (2013.01); *G03G 2221/1861* (2013.01); *G03G 2221/1869* (2013.01)

(58) Field of Classification Search
CPC ..... G03G 2221/1807; G03G 2221/183; G03G 2221/1853; G03G 2221/1861; G03G 2221/1869
See application file for complete search history.

(56) References Cited

U.S. PATENT DOCUMENTS

| | | | |
|---|---|---|---|
| 7,158,736 B2 | 1/2007 | Sato | |
| 7,164,875 B2 | 1/2007 | Miyabe | |
| 7,212,768 B2 | 5/2007 | Numagami | |
| 7,218,882 B2 | 5/2007 | Toba | |
| 7,224,925 B2 | 5/2007 | Sato | |
| 7,248,810 B2 | 7/2007 | Miyabe | |
| 7,349,657 B2 | 3/2008 | Sato | |
| 7,412,193 B2 | 8/2008 | Sato | |
| 7,567,769 B2 | 7/2009 | Noguchi | |
| 7,715,746 B2 | 5/2010 | Tanabe | |
| 7,761,024 B2 | 7/2010 | Imaizumi | |
| 7,860,433 B2 | 12/2010 | Toba | |
| 7,865,115 B2 | 1/2011 | Oguma | |
| 7,894,733 B2 | 2/2011 | Tanabe | |
| 7,907,866 B2 | 3/2011 | Imaizumi | |
| 7,953,340 B2 | 5/2011 | Tanabe | |
| 8,145,095 B2 | 3/2012 | Sakurai | |
| 8,160,478 B2 | 4/2012 | Munetsugu | |
| 8,165,493 B2 | 4/2012 | Chadani | |
| 8,175,487 B2 | 5/2012 | Imaizumi | |
| 8,213,831 B2 | 7/2012 | Toba | |
| 8,301,054 B2 | 10/2012 | Tanabe | |
| 8,442,412 B2 | 5/2013 | Imaizumi | |
| 8,463,157 B2 | 6/2013 | Sakurai | |
| 8,521,060 B2 | 8/2013 | Numata | |
| 8,559,849 B2 | 10/2013 | Suzuki | |
| 8,712,284 B2 | 4/2014 | Toba | |
| 8,843,023 B2 | 9/2014 | Fujinaka | |
| 8,862,014 B2 | 10/2014 | Imaizumi | |
| 8,879,944 B2 | 11/2014 | Takarada | |
| 8,879,954 B2 | 11/2014 | Nonaka | |
| 8,909,096 B2 | 12/2014 | Fukui | |
| 8,983,335 B2 | 3/2015 | Yamashita | |
| 9,002,230 B2 | 4/2015 | Imaizumi | |
| 9,052,640 B2 | 6/2015 | Kashiide | |
| 9,188,940 B2 | 11/2015 | Fukui | |
| 9,213,266 B2 | 12/2015 | Toba | |
| 9,213,306 B2 | 12/2015 | Morioka | |
| 9,274,489 B2 | 3/2016 | Takarada | |
| 9,291,994 B2 | 3/2016 | Kanno | |
| 9,304,488 B2 | 4/2016 | Toba | |
| 9,367,025 B2 | 6/2016 | Takarada | |
| 9,377,714 B2 | 6/2016 | Nakazawa | |
| 9,541,863 B2 | 1/2017 | Kashiide | |
| 9,688,008 B2 | 6/2017 | Takarada | |
| 9,720,374 B2 | 8/2017 | Kanno | |
| 9,727,021 B2 | 8/2017 | Fukui | |
| 9,733,612 B2 | 8/2017 | Toba | |
| 10,353,339 B2 | 7/2019 | Koishi | |
| 10,386,786 B2 | 8/2019 | Sato | |
| 10,459,402 B2 | 10/2019 | Kashiide | |
| 10,635,047 B2 | 4/2020 | Kamoshida | |
| 10,705,481 B2 | 7/2020 | Sugimoto | |
| 10,782,647 B2 | 9/2020 | Kashiide | |
| 11,067,950 B2 | 7/2021 | Kashiide | |
| 11,131,960 B2 | 9/2021 | Sato | |
| 11,307,529 B2 | 4/2022 | Sato | |
| 11,314,199 B2 | 4/2022 | Sato | |
| 11,353,822 B2 | 6/2022 | Kashiide | |
| 11,392,082 B2 | 7/2022 | Nishida | |
| 11,567,445 B2 | 1/2023 | Munetsugu | |
| 11,592,766 B2 | 2/2023 | Ozaki | |
| 2007/0160386 A1 | 7/2007 | Kawamura | |
| 2007/0177899 A1 | 8/2007 | Kawamura | |
| 2009/0003875 A1 | 1/2009 | Toba et al. | |
| 2009/0142096 A1* | 6/2009 | Greywall | G03G 21/1676 399/119 |
| 2010/0080615 A1 | 4/2010 | Kikuchi | |
| 2011/0164897 A1 | 7/2011 | Kikuchi | |
| 2011/0229194 A1 | 9/2011 | Okabe et al. | |
| 2012/0128387 A1 | 5/2012 | Kim et al. | |
| 2012/0163857 A1* | 6/2012 | Kamimura | G03G 21/1676 399/110 |
| 2013/0294799 A1 | 11/2013 | Okabe et al. | |
| 2014/0140719 A1 | 5/2014 | Suzuki | |
| 2014/0212170 A1* | 7/2014 | Kato | G03G 21/1623 399/118 |
| 2015/0117874 A1* | 4/2015 | Shiraki | G03G 21/1842 399/13 |
| 2015/0227110 A1 | 8/2015 | Yoshimura et al. | |
| 2016/0349664 A1 | 12/2016 | Sawashima | |
| 2017/0010580 A1 | 1/2017 | Yoshimura et al. | |
| 2019/0094792 A1* | 3/2019 | Kurihara | G03G 21/1647 |
| 2021/0263467 A1 | 8/2021 | Sato | |
| 2021/0382434 A1 | 12/2021 | Morioka | |
| 2021/0397122 A1 | 12/2021 | Fukui | |
| 2022/0050417 A1 | 2/2022 | Nishida | |
| 2022/0155722 A1 | 5/2022 | Kashiide | |
| 2022/0197211 A1 | 6/2022 | Sato | |
| 2022/0413414 A1 | 12/2022 | Ozaki | |
| 2023/0031856 A1 | 2/2023 | Munetsugu | |
| 2023/0074264 A1 | 3/2023 | Fujino | |
| 2023/0075423 A1 | 3/2023 | Fujino | |
| 2023/0096202 A1 | 3/2023 | Sato | |

FOREIGN PATENT DOCUMENTS

| | | |
|---|---|---|
| EP | 2 333 615 A1 | 6/2011 |
| JP | 2002-040753 A | 2/2002 |
| JP | 2007-213024 A | 8/2007 |
| JP | 2011-197408 A | 10/2011 |
| JP | 2014-067005 A | 4/2014 |
| JP | 2018-081331 A | 5/2018 |
| JP | 2019-061059 A | 4/2019 |

OTHER PUBLICATIONS

May 18, 2024 Office Action in Chinese Patent Application Pub. No. 202180062779.8.
Nov. 12, 2024 Office Action in Japanese Patent Application Pub. No. 2020-156781.
Sep. 27, 2024 Extended Search Report in European Patent Application No. 21 869 486.7.

* cited by examiner (a)

(b)

(a)

(b)

(a)

(b)

(c)

(a)

(b)

(a)

(b)

(a)

(b)

(a)

(b)

IMAGE FORMING APPARATUS, PROCESS CARTRIDGES, AND CONNECTING MEMBER

TECHNICAL FIELD

The present invention relates to an electrophotographic image forming apparatus such as a copying machine or a printer which employs an electrophotographic method, and to a cartridge and a connecting member usable with the electrophotographic image forming apparatus.

Here, an electrophotographic image forming apparatus (hereinafter also referred to as an "image forming apparatus") forms an image on a recording material using an electrophotographic image forming process. Examples of the image forming apparatuses include a copying machine, a facsimile machine, a printer (laser beam printer, LED printer, and so on), and a multifunction machine (multifunction printer). A cartridge is a device which integrally includes at least a device (developing device), as process means actable on an electrophotographic photosensitive member (hereinafter referred to as a "photosensitive drum"), for visualizing, using a developer, an electrostatic latent image formed on the electrophotographic photosensitive member by an electrophotographic image forming process, the cartridges being mountable to and dismountable from a main assembly of the image forming apparatus. A connecting member is a member four connecting a plurality of developing devices usable with a color image forming apparatus.

BACKGROUND OF THE INVENTION

Conventionally, in an image forming apparatus using an electrophotographic forming process, an electrophotographic photosensitive member (hereinafter referred to as a photosensitive drum) and process means actable on the photosensitive drum are integrated into a cartridge. A process cartridge system is employed in which the cartridge is mountable to and dismountable from the main assembly of the image forming apparatus. In this process cartridge system, the maintenance of the image forming apparatus can be performed, in effect, by the user himself/herself without relying on service personnel, so that the maintainability can be improved remarkably. Therefore, the process cartridge system is widely used with image forming apparatuses. A conventional process cartridge comprises a drum unit including a drum frame which holds the photosensitive drum, and a developing unit including a developing roller as means for developing the latent image on the photosensitive drum, a developing blade, and toner as a developer.

There is known an image forming apparatus called an in-line system in which a plurality of process cartridges are arranged. This in-line image forming apparatus includes the process cartridges including photosensitive drums and developing units for respective colors of yellow, magenta, cyan, and black, and superimposes images of these colors to form a full-color image. When the image is formed, the developing roller is contacted with the photosensitive drum with a predetermined pressure. In the contact development method in which the developing roller is in contact with the photosensitive drum for development, the developing roller is in contact with the surface of the photosensitive drum with a predetermined pressure. For example, there a case that a developing roller having an elastic layer is used and the elastic layer is brought into contact with the surface of the photosensitive, and if the developing roller is not used for a long period of time in such a case, the elastic layer of the developing roller may be deformed. This may cause image unevenness during developing operation.

As another example, regardless of the presence or absence of the elastic layer, if the developing roller is in contact with the photosensitive drum during non-image formation, the case may be that the developer carried by the developing roller will unnecessarily adhere to the photosensitive drum. As a further example, if the photosensitive drum and the developing roller rotate in contact with each other during the time without developing operation, deterioration of the photosensitive drum, the developing roller and the developer may be accelerated, due to the rubbing between the photosensitive drum and the developing roller. Therefore, in JP-A-2007-213024 and JP-A-2014-067005 discloses a structure of a main assembly of an image forming apparatus which comprises a mechanism which acts on the process cartridge to provide a space between the photosensitive drum and the developing roller when image formation is not performed.

SUMMARY OF THE INVENTION

Problem to be Solved

However, the conventional techniques described in JP-A-2007-213024 and JP-A-2014-067005 still have room for further improvement. Therefore, an object of the present disclosure is to further develop the conventional technology.

Means for Solving the Problem

In order to solve the above-described problems, the image forming apparatus disclosed herein comprises;

a main assembly;

a plurality of process cartridges detachably mountable to the main assembly, the process cartridges each including, a photosensitive member, a first frame rotatably supporting the photosensitive member, a developing member for depositing toner onto the photosensitive member, and a second frame rotatably supporting the developing member and movable relative to the first frame between a developing position for the developing member to deposit the toner onto the photosensitive member and a retracted position in which the developing member is more remote from the photosensitive member than in the developing position; and a connecting member connecting at least two of the second frames of the process cartridges and removable from at least one of the process cartridges and from the main assembly.

Effect of the Invention

According to the present disclosure, the prior art can be further developed.

DESCRIPTION OF EMBODIMENTS

The embodiments of the present invention will be exemplarily described in detail in conjunction with the drawings. However, the dimensions, materials, shapes and relative arrangement of the components described in this embodiment should be appropriately changed according to the structure of the device to which the invention is applied and various conditions. That is, it is not intended to limit the scope of the present invention to the following embodiments.

Embodiment 1 of the present disclosure will be described with reference to the drawings. In the following embodiments, an image forming apparatus to which four process cartridges (cartridges) can be mounted and dismounted is exemplified as an image forming apparatus. The number of process cartridges to be mounted on the image forming apparatus is not limited to this example. It is appropriately selected as needed. Further, in the embodiments described below, a laser beam printer is exemplified as one aspect of the image forming apparatus.

[Schematic Structure of Image Forming Apparatus]

Figure 1:
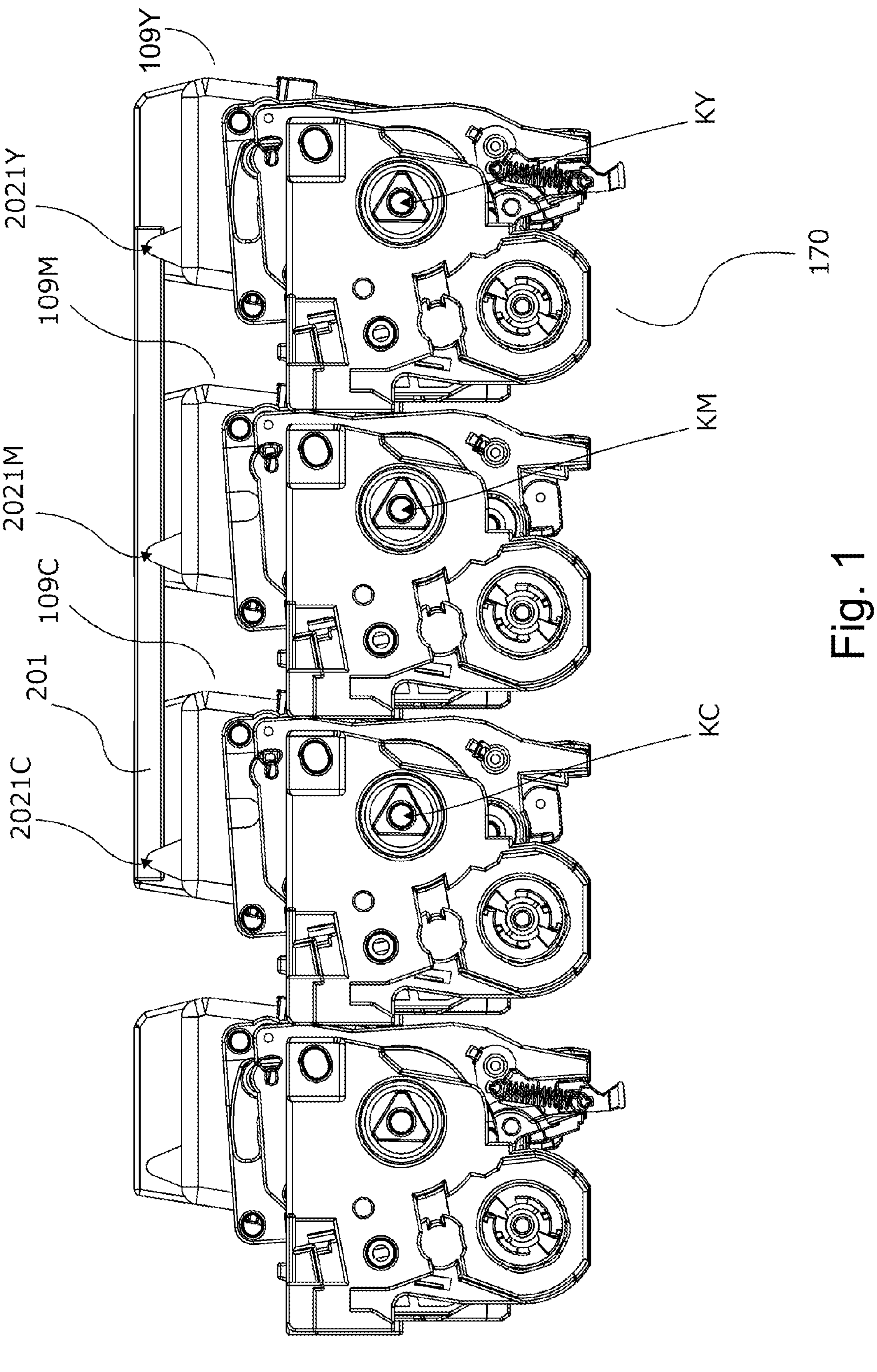
FIG. 1 is side view of a drive-side of a process cartridge mounted in an apparatus main assembly.
Figure 2:
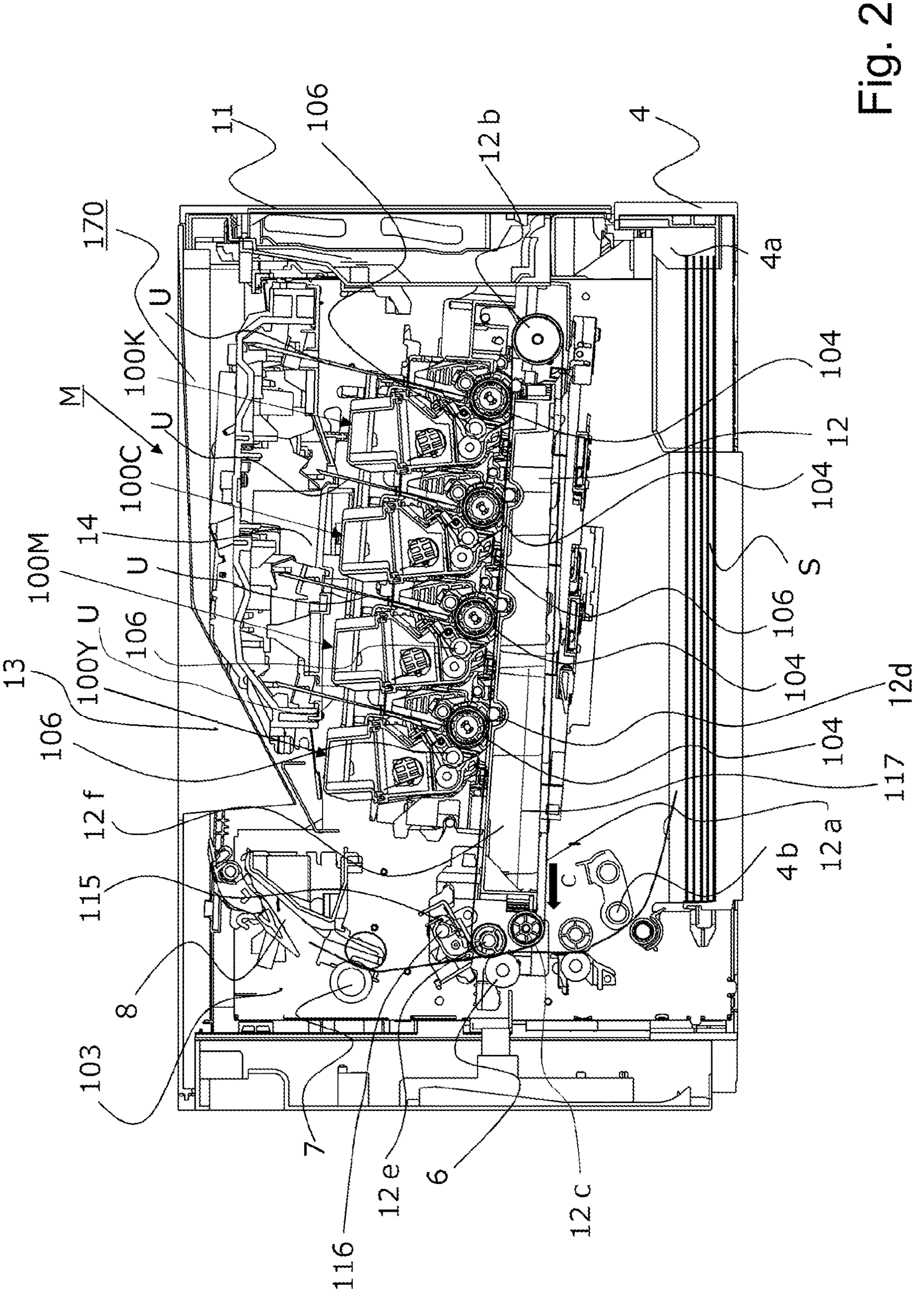
FIG. 2 is a schematic cross-sectional view of an image forming apparatus according to Embodiment 1.
Figure 3:
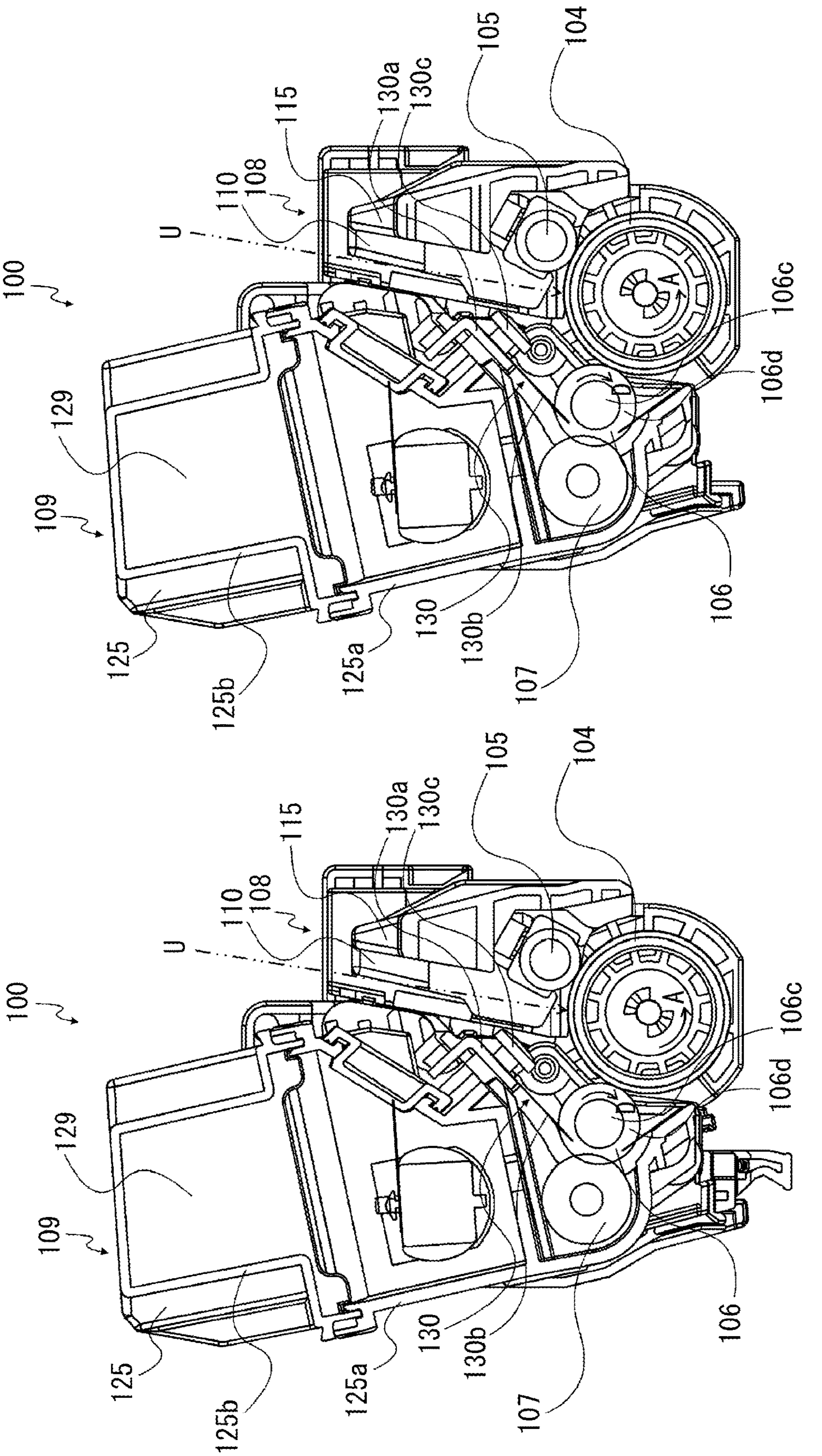
FIG. 3 is cross-sectional views of the process cartridge of Embodiment 1.

FIG. 2 is a schematic cross-sectional view of the image forming apparatus M. FIG. 3 is a sectional view of the process cartridge 100. This image forming apparatus M is a four-color full-color laser printer using an electrophotographic process, and forms a color image on a recording material S. The image forming apparatus M is of a process cartridge type, and forms a color image on a recording material S using the process cartridges dismountably mounted in the image forming apparatus main assembly 170.

Here, regarding the image forming apparatus M, the side on which the front door 11 is provided is the front side (front side), and the side opposite to the front side is a back side (rear side). The right side of the image forming apparatus M is called drive-side, and the left side thereof is called non-drive-side. Also, as the image forming apparatus M is viewed from the front side, the upper side is the upper surface, and the lower side is the lower surface. FIG. 2 is a sectional view of the image forming apparatus M as viewed from the non-drive-side, wherein front side of the sheet of the drawing is the non-drive-side of the image forming apparatus M, and the right side of the sheet of the drawing is the front side of the image forming apparatus M, and the back side of the sheet of the drawing is the dive-side of the image forming apparatus M. The drive-side of the process cartridge 100 is the side on which a drum coupling member (photosensitive member coupling member), which will be described hereinafter, is provided as viewed in the axial direction of the photosensitive drum. In addition, the drive-side of the process cartridge 100 is the side on which a development coupling member, which will be described hereinafter, is provided as viewed in the axial direction of the developing roller (developing member).

The image forming apparatus main assembly 170 includes a first process cartridge 100Y including a separation and contact mechanism 150 which will be described hereinafter, a second process cartridge 100M not including the separation and contact mechanism 150, a third process cartridge 100C not including the separation and contact mechanism 150, a fourth process cartridge 100K including the separation and contact mechanism 150, wherein the four process cartridges 100 (100Y, 100M, 100C, and 100K) are arranged substantially horizontally.

Each of the first to fourth process cartridges 100 (100Y, 100M, 100C, and 100K) has a similar electrophotographic process mechanism, and uses different colors of developer (hereinafter referred to as toner). A rotational drive force is transmitted from a drive output portion (details will be described hereinafter) of the image forming apparatus main assembly 170 to the first to fourth process cartridges 100 (100Y, 100M, 100C, 100K). A bias voltage (charging bias, developing bias, and so on) is supplied from the image forming apparatus main assembly 170 to each of the first to fourth process cartridges 100 (100Y, 100M, 100C, 100K) (not shown).

As shown in FIG. 3, each of the first to fourth process cartridges 100 (100Y, 100M, 100C, 100K) of this embodiment includes a drum unit 108 a photosensitive drum 104 and charging means as the process means actable on the photosensitive drum 104. Here, the drum unit may have not only charging means but also cleaning means as the process means. Each of the first to fourth process cartridges 100 (100Y, 100M, 100C, 100K) has a developing unit 109 including developing means for developing the electrostatic latent image on the photosensitive drum 104. The drum unit 108 and developing unit 109 are coupled together. A more specific structure of the process cartridge 100 will be described hereinafter.

The first process cartridge 100Y accommodates yellow (Y) toner in the developing unit frame 125 and forms a yellow toner image on the surface of the photosensitive drum 104. The second process cartridge 100M accommodates magenta (M) toner in the developing unit frame 125 and forms a magenta toner image on the surface of the photosensitive drum 104. The third process cartridge 100C accommodates cyan (C) toner in the developing unit frame 125 and forms a cyan toner image on the surface of the photosensitive drum 104. The fourth process cartridge 100K accommodates black (K) toner in the developing unit frame 125 and forms a black toner image on the surface of the photosensitive drum 104. The developing unit 109 of the first process cartridge 100Y, the developing unit 109 of the second process cartridge 100M, and the developing unit 109 of the third process cartridge 100C are connected by a connecting member 201, which will be described hereinafter.

A laser scanner unit 14 as exposure means is provided above the first to fourth process cartridges 100 (100Y, 100M, 100C, 100K). This laser scanner unit 14 outputs a laser beam U corresponding to image information. Then, the laser beam U passes through the exposure window 110 of the process cartridge 100 and scans and exposes the surface of the photosensitive drum 104.

An intermediary transfer unit 12 as a transfer member is provided below the first to fourth process cartridges 100 (100Y, 100M, 100C, 100K). The intermediary transfer unit 12 includes a drive roller 12*e*, a turn roller 12*c*, a tension roller 12*b*, around which a flexible transfer belt 12*a* stretched. The lower surface of the photosensitive drum 104 of each of the first to fourth process cartridges 100 (100Y, 100M, 100C, 100K) is in contact with the upper surface of the transfer belt 12*a*. The contact portion is a primary transfer portion. A primary transfer roller 12*d* is provided inside the transfer belt 12*a* so as to oppose the photosensitive drum 104. A secondary transfer roller 6 is opposed to the turn roller 12*c* with the transfer belt 12*a* interposed therebetween. A contact portion between the transfer belt 12*a* and the secondary transfer roller 6 is a secondary transfer portion.

A feeding unit 4 is provided below the intermediary transfer unit 12. The feeding unit 4 includes a sheet feeding tray 4*a* in which recording materials S are accommodated in a stack, and includes a sheet feeding roller 4*b*. A fixing device 7 and a paper discharge device 8 are provided in the upper left portion of the image forming apparatus main assembly 170 in the Figure. The upper surface of the image forming apparatus main assembly 170 is used as a paper discharge tray 13. A toner image is fixed on the recording material S by fixing means provided in the fixing device 7, and the recording material S is discharged to the paper discharge tray 13.

[Image Forming Operation]

The operation for forming a full-color image is as follows. The photosensitive drums 104 of the first to fourth process cartridges 100 (100Y, 100M, 100C, 100K) are rotationally driven at a predetermined speed (in the direction of arrow A in FIG. 3). The transfer belt 12*a* is also rotationally driven at a speed corresponding to the speed of the photosensitive drum 104 codirectionally (arrow C direction in FIG. 2) with the photosensitive drum 104. The laser scanner unit 14 is also driven. In synchronism with the driving of the laser scanner unit 14, the charging roller 105 in each process cartridge uniformly charges the surface of the photosensitive drum 104 to a predetermined polarity and potential. The laser scanner unit 14 scans and exposes the surface of each photosensitive drum 104 with laser beam U in accordance with the image signal of each color. By this, an electrostatic latent image corresponding to the image signal of the corresponding color is formed on the surface of each photosensitive drum 104. The formed electrostatic latent image is developed by a developing roller 106 which is rotationally driven at a predetermined speed.

A yellow toner image corresponding to the yellow component of the full-color image is formed on the photosensitive drum 104 of the first process cartridge 100Y by the electrophotographic image forming process operation as described above. Then, the toner image is primarily transferred onto the transfer belt 12*a*. Similarly, a magenta toner image corresponding to the magenta component of the full-color image is formed on the photosensitive drum 104 of the second process cartridge 100M. Then, the toner image is primarily transferred so as to be superimposed on the yellow toner image which has already been transferred onto the transfer belt 12*a*. Similarly, a cyan toner image corresponding to the cyan component of the full-color image is formed on the photosensitive drum 104 of the third process cartridge 100C. Then, the toner image is primarily transferred so as to be superimposed on the yellow and magenta toner images which have already been transferred onto the transfer belt 12*a*. Similarly, a black toner image corresponding to the black component of the full-color image is formed on the photosensitive drum 104 of the fourth process cartridge 100K. Then, the toner image is primarily transferred so as to be superimposed on the yellow, magenta, and cyan toner images which have already been transferred onto the transfer belt 12*a*. In this manner, an unfixed full-color toner image of four colors of yellow, magenta, cyan, and black is formed on the transfer belt 12*a*.

On the other hand, a recording material S is separated and fed one by one at a predetermined control timing. The recording material S is introduced to the secondary transfer portion, which is the contact portion between the secondary transfer roller 6 and the transfer belt 12*a*, at a predetermined control timing. By this, the four-color superimposed toner image on the transfer belt 12*a* is continuously transferred onto the surface of the recording material S all at once while the recording material S is fed to the secondary transfer portion. In more detail, the structure of the main assembly of the image forming apparatus will be described below.

[Outline of Process Cartridge Attachment/Removal Structure]

Figure 4:
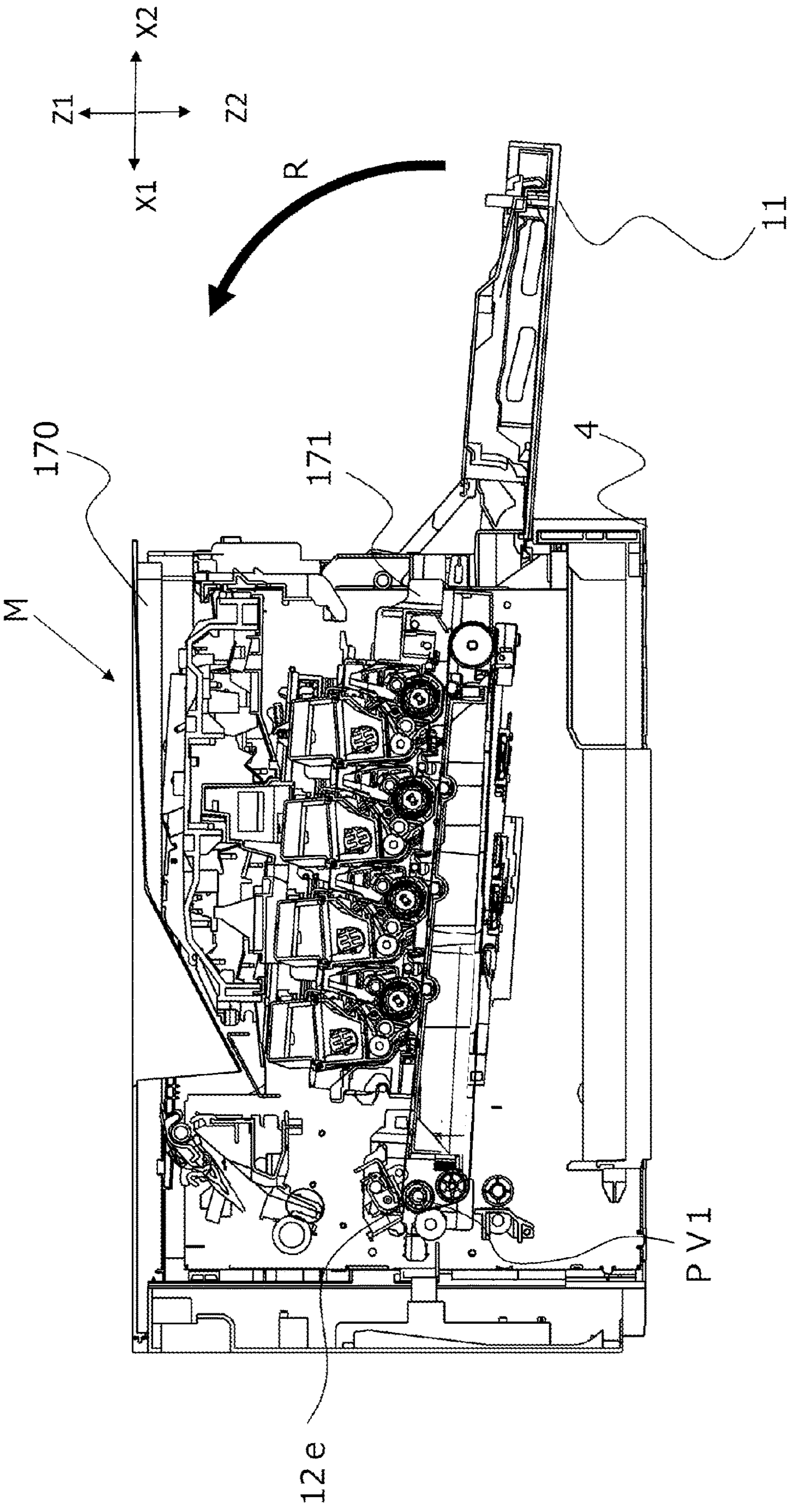
FIG. 4 is a cross-sectional view of the image forming apparatus of Embodiment 1.
Figure 5:
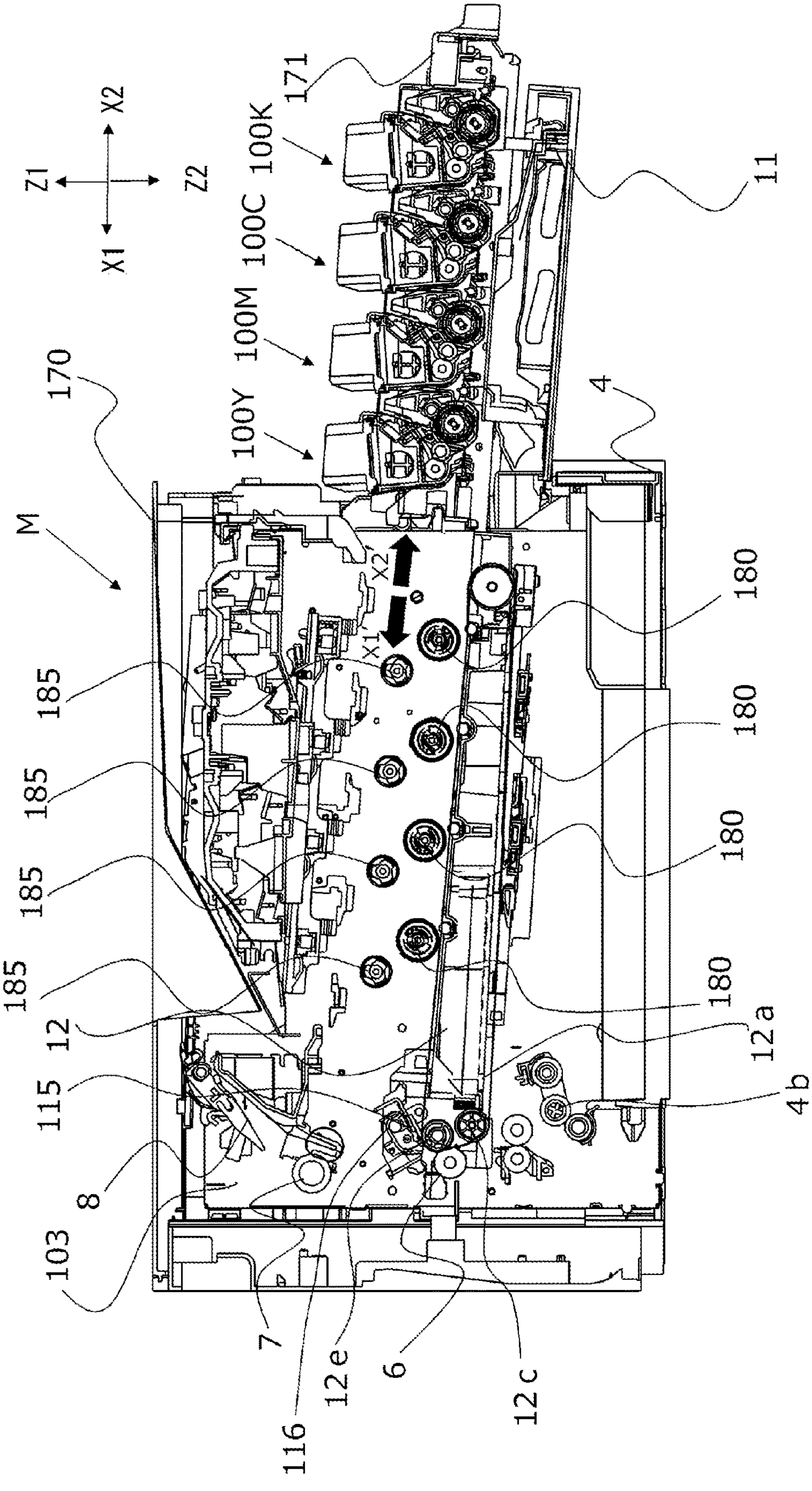
FIG. 5 is a cross-sectional view of the image forming apparatus of Embodiment 1.
Figure 6:
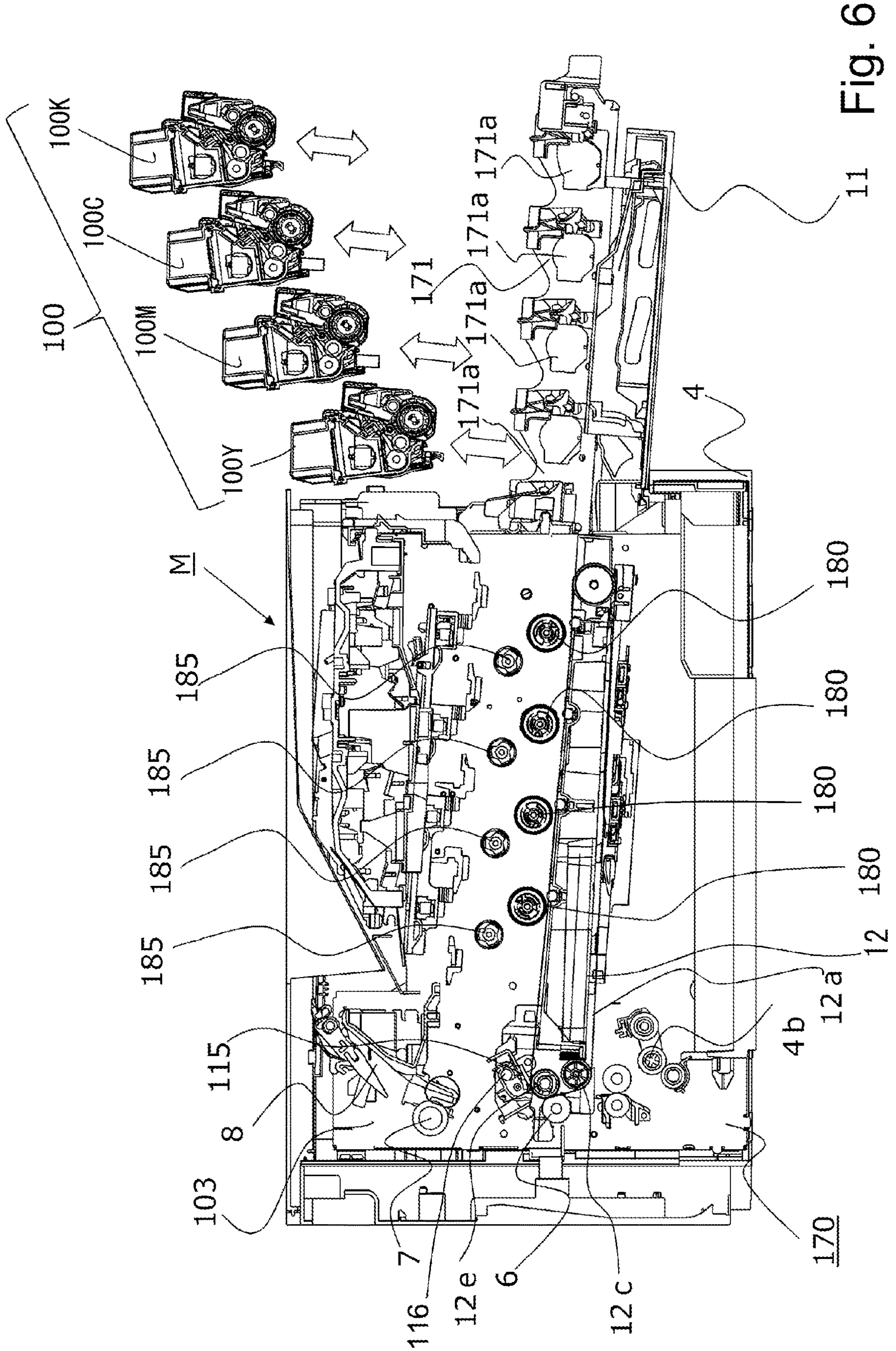
FIG. 6 is a cross-sectional view of the image forming apparatus of Embodiment 1.
Figure 7:
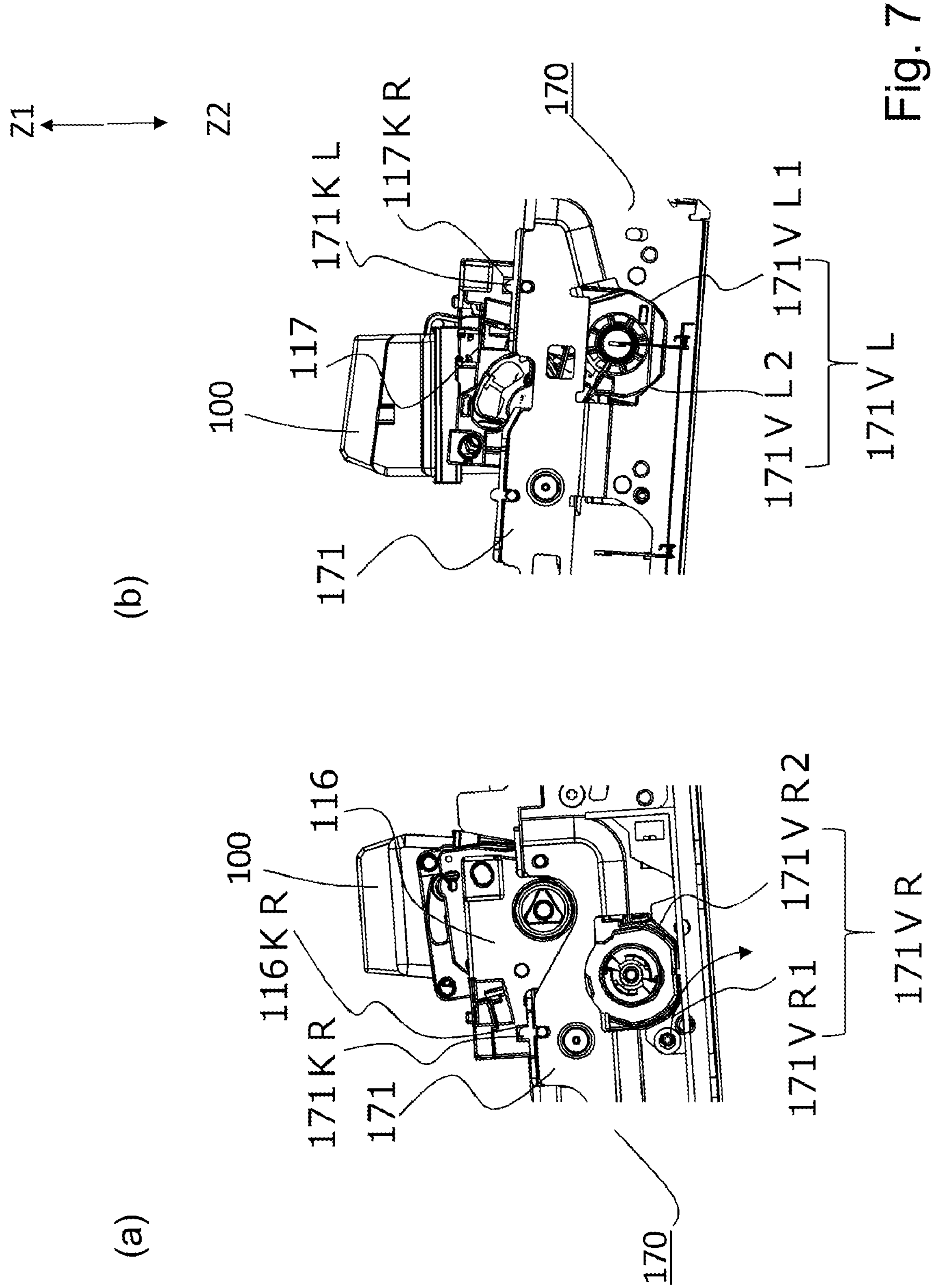
FIG. 7 is partial detailed views of a tray in Embodiment 1.

Referring to FIGS. 1 and 4 to 7, a tray (hereinafter referred to as tray) 171 for supporting the process cartridge will be described in more detail. FIG. 4 is a sectional view of the image forming apparatus M in which the tray 171 is positioned inside the image forming apparatus main assembly 170 with the front door 11 open. FIG. 5 is a sectional view of the image forming apparatus M with the front door 11 opened, the tray 171 positioned outside the image forming apparatus main assembly 170, and the process cartridges 100 are accommodated in the tray. FIG. 6 is a sectional view of the image forming apparatus M in which the front door 11 is opened, the tray 171 is positioned outside the image forming apparatus main assembly 170, and the process cartridges 100 are removed from the tray. Part (a) of FIG. 7 is a partial detailed view of the tray 171 as viewed from the drive-side in the state shown in FIG. 4. Part (b) of FIG. 7 is a partial detailed view of the tray 171 as viewed from the non-drive-side in the state of FIG. 4.

As shown in FIGS. 4 and 5, the tray 171 is movable relative to the image forming apparatus main assembly 170 in an arrow X1 direction (pushing-in direction) and an arrow X2 direction (pulling-out direction). That is, the tray 171 is provided so as to be able to be pulled out of and pushed into the image forming apparatus main assembly 170, and the tray 171 is structured to be movable in a substantially horizontal direction in a state in which the image forming apparatus main assembly 170 is placed on a horizontal plane. Here, the state in which the tray 171 is positioned outside the image forming apparatus main assembly 170 (the state in FIG. 5) is referred to as an outer position. In addition, a state in which the tray 171 is positioned inside the main assembly 170 of the image forming apparatus with the front door 11 open and the photosensitive drum 104 and the transfer belt 12*a* are separated from each other (state shown in FIG. 4) is referred to as an inner position. Further, the tray 171 is provided with a mounting portion 171*a* to which the process cartridge 100 can be dismountably mounted at an outer position as shown in FIG. 6. Each process cartridge 100 mounted on the mounting portion 171*a* outside the tray 171 is supported on the tray 171 by a drive-side cartridge cover member 116 and a non-drive-side cartridge cover member 117 as shown in FIG. 7. And, the process cartridges 100 are moved into the inside the image forming apparatus main assembly 170 as the tray 171 is moved while being supported in the mounting portions 171*a*. At this time, the tray 171 moves with the transfer belt 12*a* and the photosensitive drum 104 with a gap therebetween between, and therefore, the tray 171 can move the process cartridges 100 into the main assembly 170 of the image forming apparatus without the photosensitive drum 104 coming into contact with the transfer belt 12*a* (details will be described hereinafter).

As described above, the plurality of process cartridges 100 can be collectively moved by the tray 171 to the respective positions where image formation is possible inside the image forming apparatus main assembly 170, and can be collectively moved to the outside of the image forming apparatus main assembly 170. After inserting each process cartridge 100 (100Y, 100M, 100C, 100K) into the tray 171, the connecting member 201 is connected with the developing unit 109 of the process cartridge 100Y, the developing unit 109 of the first process cartridge 100Y, the developing unit 109 of the cartridge 100M and, and the developing unit 109 of the process cartridge 100C. Details will be described hereinafter.

[Positioning Process Cartridge to Electrophotographic Image Forming Apparatus].

Referring to FIG. 7, positioning of the process cartridge 100 to the image forming apparatus main assembly 170 will be described in more detail. As shown in FIG. 7, the tray 171 is provided with positioning portions 171VR and 171VL for holding the process cartridge 100, respectively. The positioning portion 171VR has linear portions 171VR1 and 171VR2, respectively. The structure is such that arc portions 116VR1 and 116VR2 of the drive-side cartridge cover member 116 shown in FIG. 7 contact the linear portions 171VR1 and 171VR2 to determine the center of the photosensitive drum. In addition, the tray 171 shown in FIG. 7 is provided with a rotation determining projection 171KR. The attitude of the process cartridge 100 is determined with respect to the apparatus main assembly 170 by engaging with the rotation determining recess portion 116KR position of the drive-side cartridge cover member 116 shown in FIG. 7. Here, a positioning portion 171VL and a rotation determining projection 171KL are arranged at positions (non-drive-side) opposite from the positioning portion 171VR in the longitudinal direction of the process cartridge 100 with the transfer belt 12*a* interposed therebetween. In other words, the position of the process cartridge 100 is determined on the non-drive-side by engagement between the circular arc portions 117VL1 and 117VL2 of the non-drive-side cartridge cover member 117 and the positioning portion 171VL and by engagement between the rotation determining recess portion 117KL and the rotation determining projection 171KL. By doing so, the position of the process cartridge 100 is correctly determined with respect to the tray 171.

Then, as shown in FIG. 5, the process cartridges 100 integrated with the tray 171 are moved in the direction of the arrow X1 and inserted to the position shown in FIG. 4. Then, by closing the front door 11 in the direction of arrow R, the process cartridge 100 is pressed by a cartridge pressing mechanism (not shown) which will be described hereinafter, and fixed to the image forming apparatus main assembly 170 together with the tray 171. In addition, the transfer belt 12*a* is contacted by the photosensitive member 4 in interrelation with the operation of the cartridge pressing mechanism. In this state, an image forming operation is enabled (FIG. 2). In this embodiment, the positioning portion 171VR and the positioning portion 171V are made of metal plate because they also function to reinforce the rigidity of the tray 171 when the tray 171 is pulled out, but the present invention is not limited to such an example.

[Cartridge Pressing Mechanism].

Figure 8:
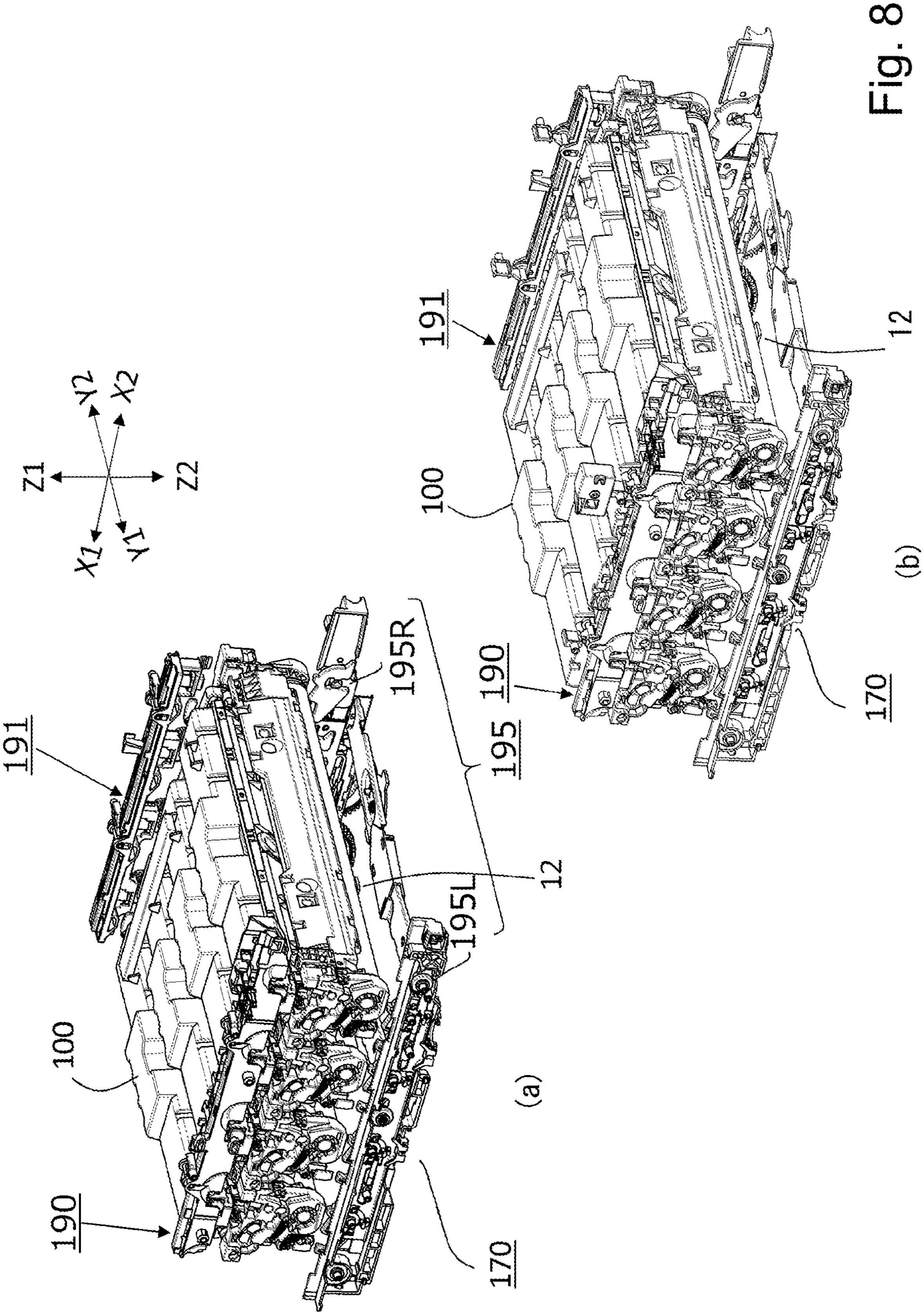
FIG. 8 is perspective views of a storing element pressing unit and the cartridge pressing unit in Embodiment 1.

Referring to FIG. 8, details of the cartridge pressing mechanism will be described. Part (a) of FIG. 8 shows only the process cartridge 100, tray 171, cartridge pressing mechanisms 190 and 191, and intermediary transfer unit 12 in the state of FIG. 4. Part (b) of FIG. 8 shows only the process cartridge 100, tray 171, cartridge pressing mechanisms 190 and 191, and intermediary transfer unit 12 in the state of FIG. 2.

While the process cartridge 100 receives driving force during image forming operation, it also receives reaction force in the direction of arrow Z1 from the primary transfer roller 12*d* (FIG. 2). Therefore, it is necessary to press the process cartridges in the Z2 direction in order to keep the process cartridges in a stable attitude without floating from the positioning portions 171VR and 171VL during the image forming operation. In order to achieve these, in this embodiment, the image forming apparatus main assembly 170 is provided with a cartridge pressing mechanism (190, 191).

The cartridge pressing mechanism (190, 191) includes a storing element pressing unit 190 on the non-drive-side and a cartridge pressing unit 191 on the drive-side. Further details will be described. By closing the front door 11 shown in FIG. 4, the storing element pressing unit 190 and the cartridge pressing unit 191 shown in FIG. 8 are lowered in the direction of arrow Z2. The storing element pressing unit 190 has main assembly side electrical contacts (not shown) which are to be contacted by electrical contacts of memory elements (not shown) provided in the process cartridge 100. By interlocking with the front door 11 by a link mechanism (not shown), the storing element 140 and the main assembly side electrical contact can be brought into contact with each other and can be brought out of contact from each other. More particularly, when the front door 11 is closed, the contacts are brought into contact with each other, and when the front door 11 is opened, they are brought out of contact from each other. By doing so, when the process cartridges 100 move into the main assembly of the image forming apparatus together with the tray 171, the electrical contacts are not rubbed, and the inserting and pulling-out operations of the tray 171 is not hindered because the electrical contacts are retracted from the insertion/pulling-out paths the process cartridges 100.

The storing element pressing unit 190 also functions to press the process cartridge 100 against the positioning portion 171VR. Similarly, to the storing element pressing unit 190, the cartridge pressing unit 121 also lowers in the direction of the arrow Z2 in interrelation with the closing operation of the front door 11, and has the function of pressing the process cartridge 100 against the positioning portion 171VL. In addition, although the details will be described hereinafter, the cartridge pressing mechanisms (190, 191) further functions to press down force applying members 152L, 152R of the process cartridges 100Y, 100K, which will be described hereinafter.

[Drive Transmission Mechanism]

Figure 9:
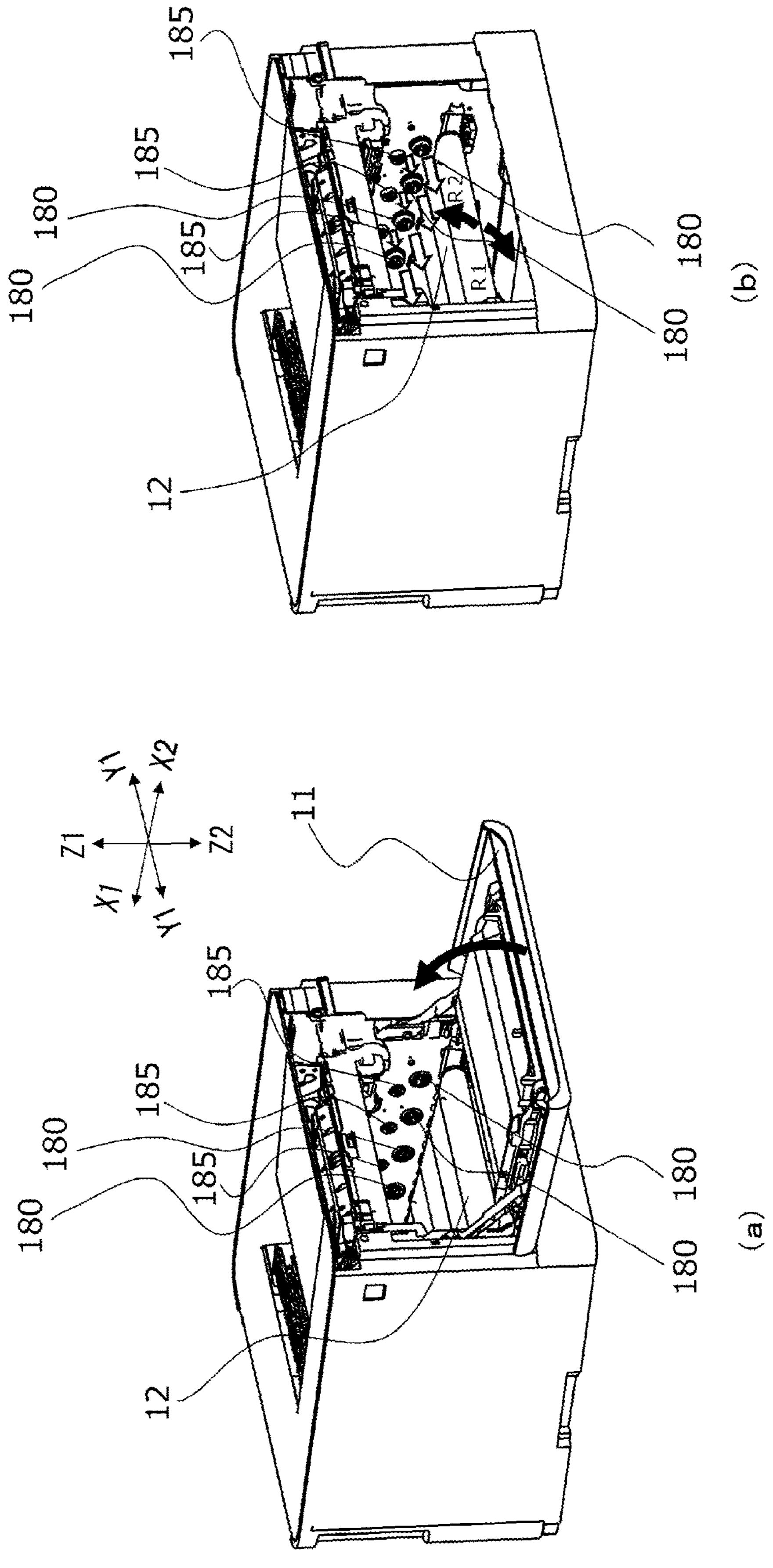
FIG. 9 is partial perspective views of the image forming apparatus of Embodiment 1.
Figure 10:
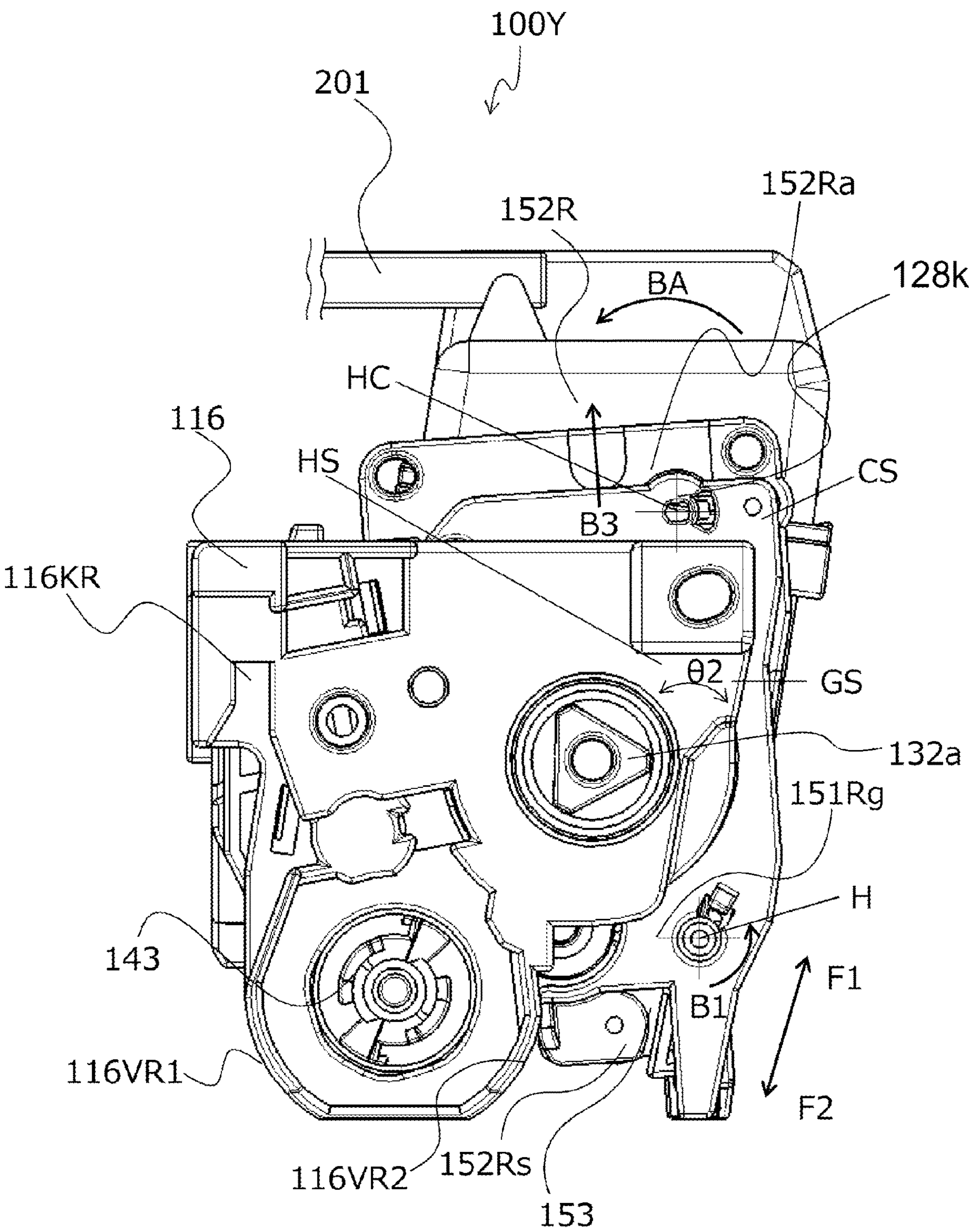
FIG. 10 is a side view (partial cross-sectional view) of the process cartridge of Embodiment 1.

Referring to FIGS. 9 and 10 (the tray 171 omitted for convenience of illustration), the drive transmission mechanism of the main assembly in this embodiment will be described. Part (a) of FIG. 9 is a perspective view of the image forming apparatus in the state shown in FIG. 4 or 5, with the process cartridge 100 and tray 171 omitted. Part (b) of FIG. 9 is a perspective view of the image forming apparatus state shown in FIG. 1 with the process cartridge 100, the front door 11 and the tray 171 omitted. FIG. 10 is a side view of the process cartridge 100Y as viewed from the drive-side. Since the drive transmission mechanisms for rotationally driving the photosensitive drums 104 and the developing rollers 106 are common among the first to fourth process cartridges, only the process cartridge 100Y will be described as a representative.

As shown in FIG. 10, the process cartridge 100 of this embodiment has a development coupling portion 32*a* and a drum coupling member (photosensitive member coupling member) 143. By closing the front door 11 (the state shown in part (b) of FIG. 9, the main assembly side drum drive coupling 180 and the main assembly side development drive coupling 185 which transmit drive to the process cartridge 100 are moved in the direction of the arrow Y1 by a link mechanism (not shown). In addition, by opening the front door 11 (state shown in part (a) of FIG. 9, the drum drive coupling 180 and the development drive coupling 185 are retracted in the arrow Y2 direction. By retracting each coupling from the insertion/removal trace (X1 direction, X2 direction) of the process cartridge, the insertion/removal operations of the tray 171 are not hindered. By closing the front door 11 and starting to operate the image forming apparatus main assembly 170, the drum drive coupling 180 is engaged with the drum coupling member 143, and the main assembly side development drive coupling 185 is engaged with the development coupling portion 32*a*, and the drive is transmitted to the process cartridge 100. The drive transmission to the process cartridge 100 is not limited to the two locations as described above, and the mechanism may be such that the drive is transmitted only to the drum coupling, and the drive is transmitted also to the developing roller 106.

[Structure of Intermediary Transfer Unit]

Referring to FIG. 9, the intermediary transfer unit 12 of the image forming apparatus main assembly 170 in this embodiment will be described. In this embodiment, when the front door 11 is closed, the intermediary transfer unit 12 is lifted in the direction of the arrow R2 by a linkage mechanism (not shown) to a position to be taken during the image forming operation (a position where the photosensitive drum 104 and the transfer belt 12*a* are in contact with each other).

In addition, by opening the front door 11, the intermediary transfer unit 12 descends in the direction of the arrow R1, thus separating the photosensitive drum 104 and the transfer belt 12*a* from each other. That is, in a state in which the process cartridge 100 is set on the tray 171, the photosensitive drums 104 and the transfer belt 12*a* contact and separate from each other according to the opening/closing operation of the front door 11. In the contact separation operation, the intermediary transfer unit 12 moves up and down while drawing a rotation locus centered on the center point PV1 shown in FIG. 4. Thus, the transfer belt 12*a* is rotated by receiving the force from a gear (not shown) provided coaxially with the PVI. Therefore, the intermediary transfer unit 12 can moves up and down without moving the gear center by setting the above-mentioned position PV1 as the rotation center. This eliminates the need to move the center of the gear, thus making it possible to maintain the position of the gear with high accuracy.

With the above-described structure, when the tray 11 is inserted or removed with the process cartridge 100 set on the tray 171, the photosensitive drum 104 and the transfer belt 12*a* do not slide relative to each other, thereby preventing image deterioration attributable to scratch of the photosensitive drum 104 or charge memory.

[Development Separation Control Unit]

Figure 11:
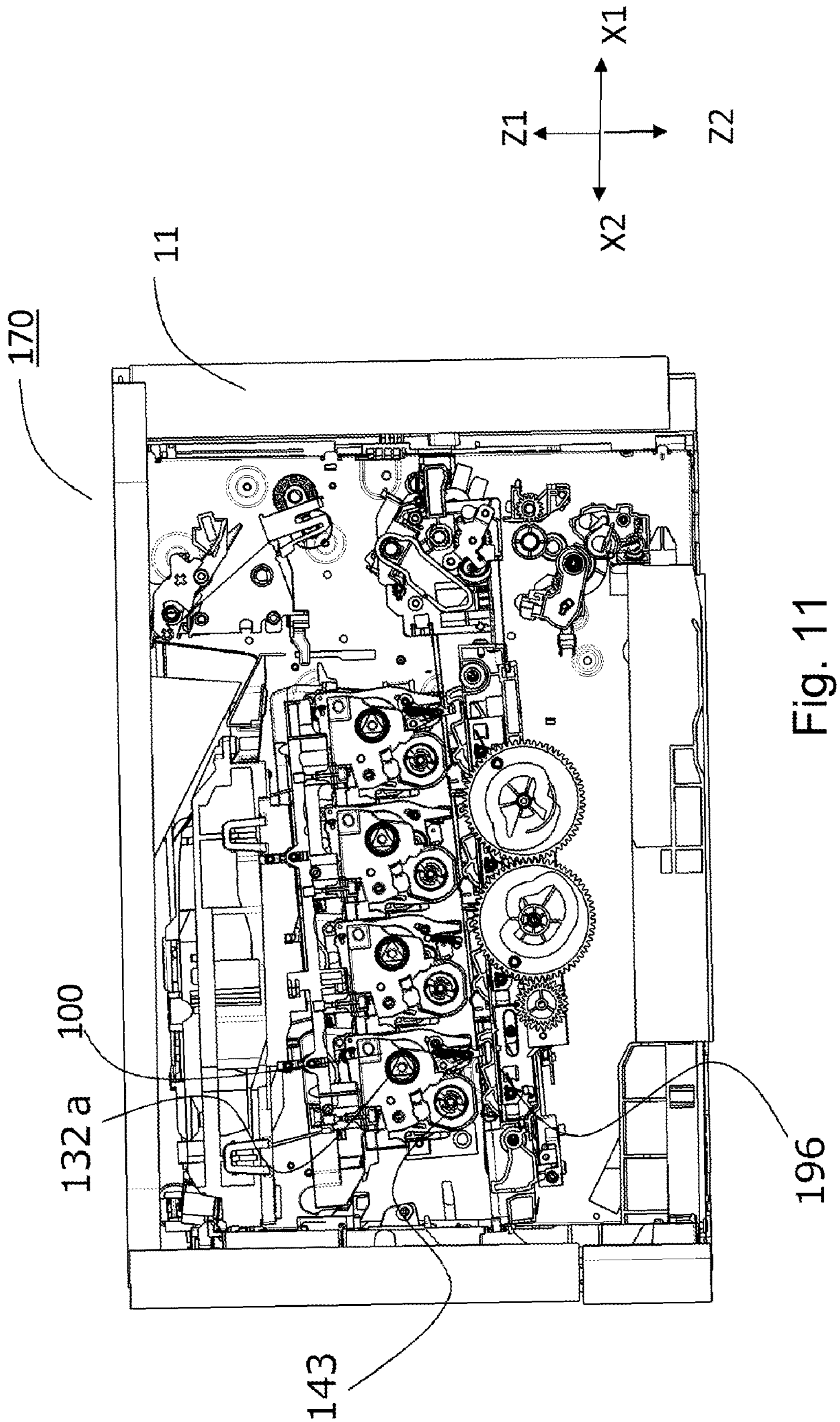
FIG. 11 is a cross-sectional view of the image forming apparatus of Embodiment 1.
Figure 12:
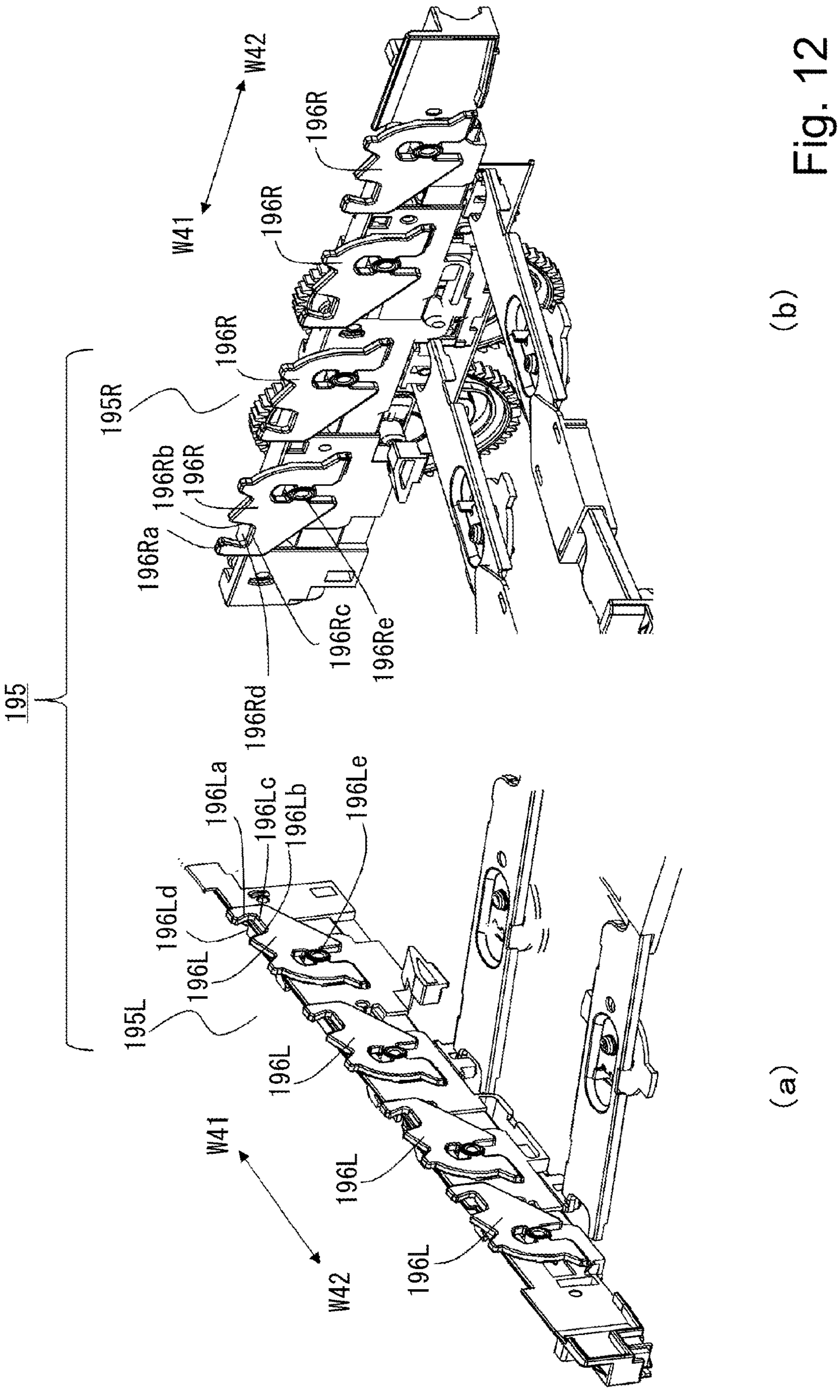
FIG. 12 is perspective views of a development separation control unit in Embodiment 1.

Referring to FIGS. 8, 11 and 12, a separation mechanism of the main assembly of the image forming apparatus in this embodiment will be described. FIG. 11 is a cross-sectional view of the image forming apparatus main assembly 170 taken along the drive-side end portion of the process cartridge 100. FIG. 12 is a perspective view of the development separation control unit 195 as viewed obliquely from the top.

In this embodiment, the development separation control unit 195 controls the separation and contact operation of the development units 109Y and 109K with respect to the photosensitive drum 104 by engaging with a portion of the development units 109Y and 109K. In this embodiment, the development separation control unit 195 engages only with the developing units of the process cartridges 100Y and 100K, and does not engage with the developing units of the process cartridges 100M and 100C. However, since the developing units 109M and 109C operate in interrelation with the operation of the developing unit 109Y by the connecting member which will be described hereinafter, the development separation control unit 195 indirectly controls the separating and contacting operations of the process cartridges 100M and 100C. The development separation control unit 195 is positioned in a lower part of the image forming apparatus main assembly 170 as shown in FIG. 8.

Specifically, the development separation control unit 195 is arranged vertically below the development coupling portion 32*a* and the drum coupling member 143 (downward in the arrow Z2 direction). In addition, the development separation control unit 195 is arranged in the longitudinal direction (Y1, Y2 direction) of the photosensitive drum 104 of the intermediary transfer unit 12. That is, the development separation control unit 195 includes a development separation control unit 195R on the drive-side and a development separation control unit 195L on the non-drive-side. As described above, by arranging the development separation control unit 195 in the dead space of the image forming apparatus main assembly 170, the main assembly can be downsized.

The development separation control unit 195R has at least two separation control members 196R corresponding to the process cartridges 100 (100Y, 100K). The separation control members have substantially the same shape. The development separation control unit 195R is always fixed with respect to the image forming apparatus main assembly 170. However, the separation control member 196R is structured to be movable in the W41 and W42 directions by a control mechanism (not shown), and among the separation control members 196R, the separation control members corresponding to the process cartridges 100Y, 100M, and 100C operate synchronously. A detailed structure will be described hereinafter. In this embodiment, the image forming apparatus main assembly 170 has four development separating members 196R corresponding to the process cartridges 100Y, 100M, 100C and 100K.

The development separation control unit 195L has at least two separation control members 196L corresponding to the process cartridges 100 (100Y, 100K). The separation control members have substantially the same shape. The development separation control unit 195L is always fixed to the image forming apparatus main assembly 170. However, the separation control member 196L is structured to be movable in directions W41 and W42 by a control mechanism (not shown), and among the separation control members 196R, the separation control members corresponding to the process cartridges 100Y, 100M, and 100C operate synchronously. In this embodiment, the image forming apparatus main assembly 170 has four development separating members 196L corresponding to the process cartridges 100Y, 100M, 100C, and 100K.

Further, in order for the development separation control unit 195 to engage with a portion of the developing unit 109 to control the separation and contact operation of the developing unit 109, a part of the development control unit 196 and a part of the developing unit 109 need to overlap in the vertical direction (Z1, Z2 directions). Therefore, in order to accomplish the above-described overlapping in the vertical direction (Z1, Z2 direction) after the developing units 109 of the process cartridges 100Y and 100K are inserted in the X1 direction, a part of the developing units 109 (in this embodiment) needs to be projected (details will be described hereinafter). If the development separation control unit 195 itself is lifted in the same manner as with the intermediary transfer unit 12*f* to effect the engagement, problems such as an increase in the operating force of the interlocking front door 11 and complication of the drive train arise.

In this embodiment, a method is employed in which the development separation control unit 195 is fixed to the image forming apparatus main assembly 170, and a part of the developing unit 109 (the force applying member 152) is projected downward (Z2) in the image forming apparatus main assembly 170, and this is done in view of the problems. In addition, the mechanism for projecting the force applying member 152 uses the mechanisms of the storing element pressing unit 190 and the cartridge pressing unit 191 as they are, the problems described above do not occur and the cost of the main assembly of the apparatus can be suppressed. Although the development separation control unit 195 as a whole is fixed to the image forming apparatus main assembly 170 a part thereof is structured to be movable, as will be described hereinafter, for the motion to accomplish the separated and contacted states of the developing unit 109 relative to the photosensitive drum 104 through engagement with the force applying member 152. Details will be described hereinafter.

[Overall Structure of Process Cartridge]

Figure 13:
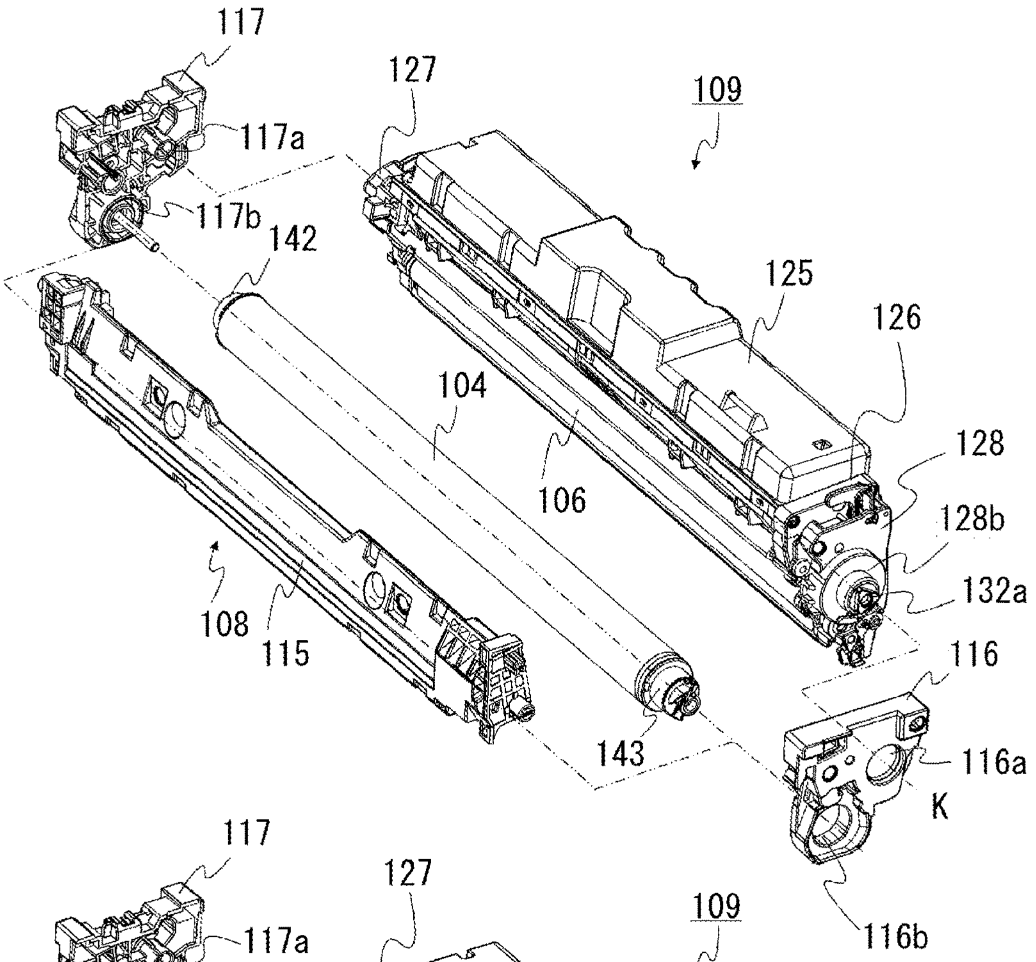
FIG. 13 is assembly perspective views of the process cartridge of Embodiment 1.
Figure 13:
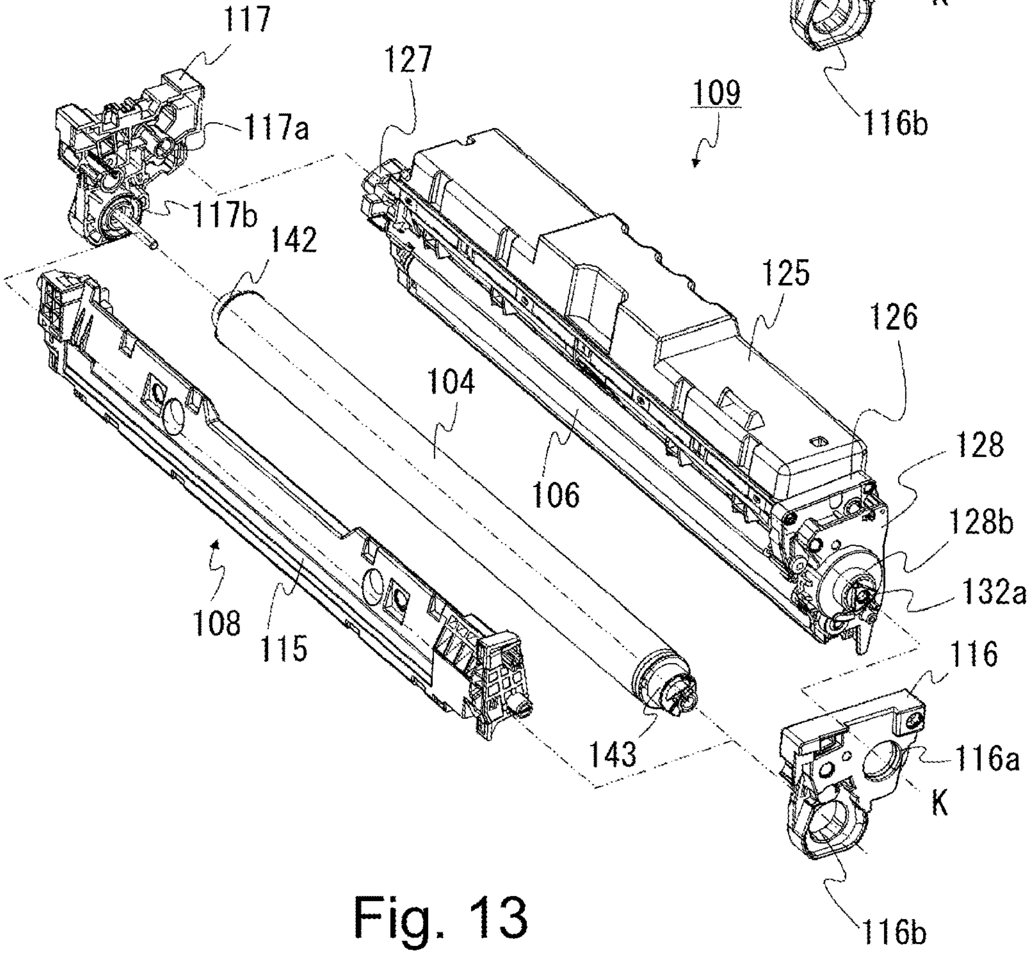
Figure 14:
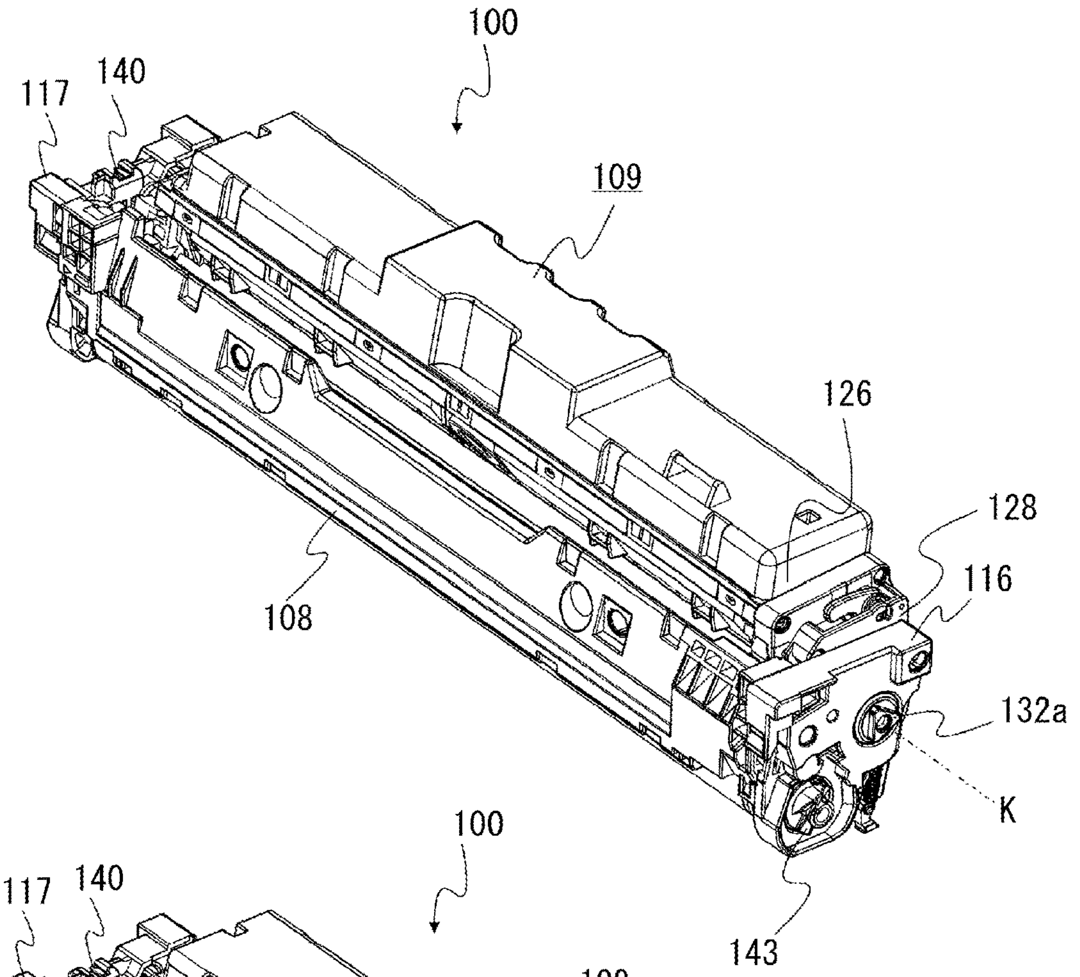
FIG. 14 is perspective views of the process cartridge of Embodiment 1.
Figure 14:
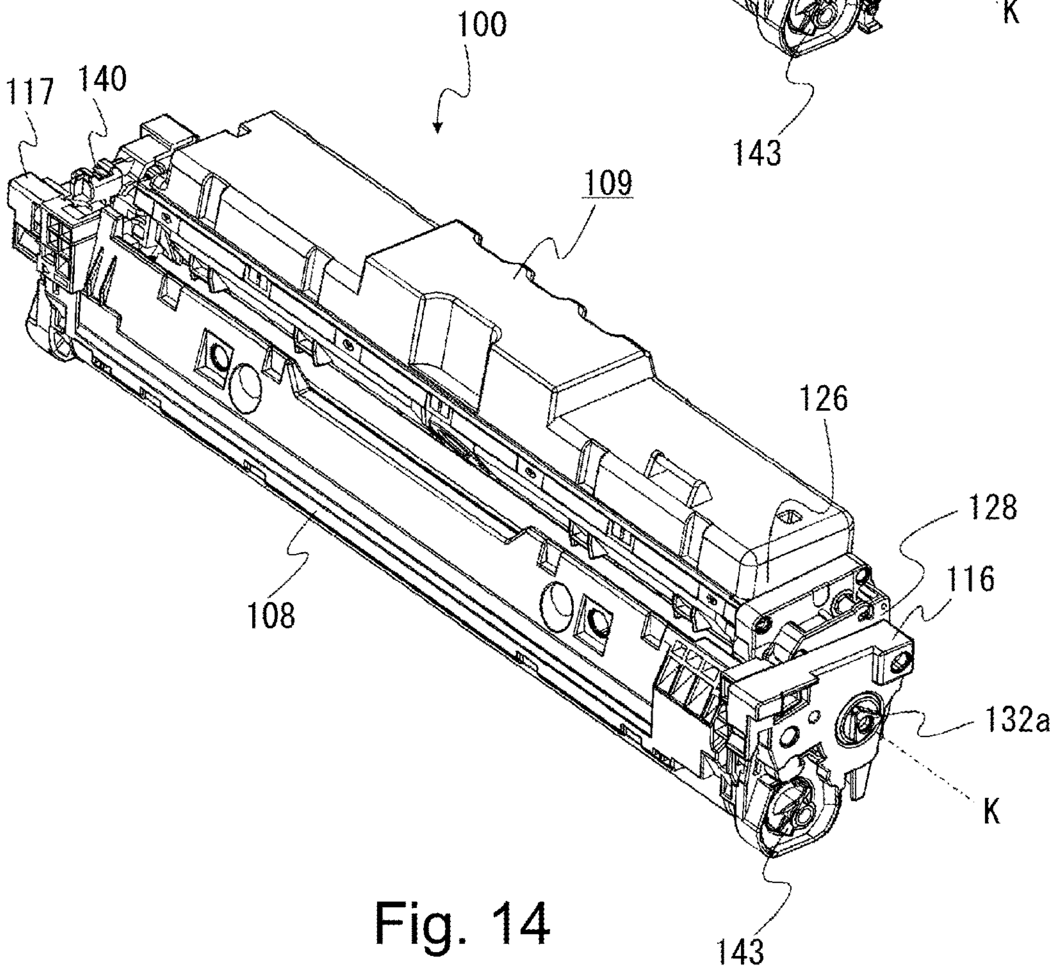

Referring to FIGS. 3, 13 and 14, the structure of the process cartridge will be described. In each Figure, part (a) shows the process cartridges 100Y and 100K including the separation and contact mechanism 150, and part (b) shows the process cartridges 100M and 100C which do not include the separation and contact mechanism 150. FIG. 13 is an assembly perspective view of the process cartridge 100Y as viewed from the drive-side, which is one end side of the photosensitive drum 104 in the axial direction. FIG. 14 is a perspective view of the process cartridge 100Y as viewed from the drive-side.

In this embodiment, the process cartridges 100 (100Y, 100M, 100C, and 100K) have the same electrophotographic process mechanism, and differ from each other in the color and amount of toner contained therein. However, as described above, the process cartridges 100Y and 100K have the separation and contact mechanism 150, and the process cartridges 100C and 100K do not have the separation and contact mechanism 150.

The process cartridge 100 comprises photosensitive drums 104 (104Y, 104M, 104C, 104K) and process means actable on the photosensitive drums 104. Here, the process means includes a charging roller 105 as charging means for charging the photosensitive drum 104, a developing roller 106 as developing means (developing member) for developing a latent image formed on the photosensitive drum 104, and a cleaning blade as a cleaning means for removing residual toner remaining on the surface of the photosensitive drum 104, or the like. However, the cleaning means may not be necessary in some cases, and it is assumed that there is no cleaning means in this embodiment. The process cartridge 100 is divided into drum units 108 (108Y, 108M, 108C, 108K) and developing units 109 (109Y, 109M, 109C, 109K). As has been described above, the image forming apparatus of the present disclosure includes the process cartridges 100Y and 100K including the separation and contact mechanism 150 and the process cartridges 100M and 100C not including the separation and contact mechanism 150. However, the substantial structure other than the presence or absence of the separation and contact mechanism is the same.

[Structure of Drum Unit]

As shown in FIGS. 3 and 13, the drum unit 108 includes the photosensitive drum 104, the charging roller 105, and the drum frame 115 as a first frame. The photosensitive drum 104 is rotatably supported by a drive-side cartridge cover member 116 and a non-drive-side cartridge cover member 117 provided at opposite longitudinal ends of the process cartridge 100. The drive-side cartridge cover member 116 and the non-drive-side cartridge cover member 117 will be described hereinafter.

As shown in FIGS. 13 and 14, a drum coupling member 143 for transmitting driving force to the photosensitive drum 104 is provided at one end of the photosensitive drum 104 in the longitudinal direction. As described above, the drum coupling member 143 engages with the main assembly side drum drive coupling 180 (see FIG. 9) as a drum drive output portion of the image forming apparatus main assembly 170 to drive the image forming apparatus main assembly 170, so that the driving force of a motor (not shown) is transmitted to the photosensitive drum 104 to rotate it in the arrow A direction. In addition, the photosensitive drum 104 has a drum flange 142 on the other longitudinal end side. The charging roller 105 is supported by the drum frame 115 so as to be in contact with the photosensitive drum 104 and to be rotationally driven.

[Structure of Developing Unit]

As shown in FIGS. 3 and 13, the developing unit 109 includes a developing roller 106, a toner feeding roller 107, a developing blade 130, a developing unit frame 125 as a second frame, and the like. The developing unit frame 125 comprises a lower frame 125*a* and a lid member 125*b*. The lower frame 125*a* and the lid member 125*b* are joined by ultrasonic welding or the like. A developing unit frame 125, which is a second frame, has a toner containing portion 129 containing toner to be supplied to the developing roller 106. The developing unit frame 125 rotatably supports the developing roller 106 and the toner feeding roller 107 by way of a drive-side bearing 126 and a non-drive-side bearing 127, which will be described hereinafter, and supports a developing blade 130 for regulating a thickness of the toner on the periphery of the developing roller 106.

The developing blade 130 is provided by mounting an elastic member 130*b*, of a metal plate having a thickness of about 0.1 mm on a support member 130*a* of metal material having an L-shaped cross-section, by welding or the like. The developing blade 130 is mounted to the developing unit frame 125 with fixing screws 130*c* at two locations, namely, one end and the other end in the longitudinal direction. The developing roller 106 comprises a metal core 106*c* and a rubber portion 106*d*.

The developing roller 106 is rotatably supported by a drive-side bearing 126 and a non-drive-side bearing 127 mounted to opposite longitudinal ends of the developing unit frame 125. As shown in FIGS. 13 and 14, a development coupling portion 32*a* for transmitting driving force to the developing unit 109 is provided at one end of the developing unit 109 in the longitudinal direction. The development coupling portion 32*a* engages with a main assembly side development drive coupling 185 (see FIG. 9) as a development drive output portion of the image forming apparatus main assembly 170, and the drive of a drive motor (not shown) of the image forming apparatus main assembly 170 is inputted to the developer unit 109. The driving force inputted to the developing unit 109 is transmitted by a drive train (not shown) provided in the developing unit 109, so that the developing roller 106 can be rotated in the direction of arrow D in FIG. 3. At one end in the longitudinal direction of the developing unit 109, a development cover member 128 for supporting and covering the development coupling portion 32*a* and a drive train (not shown) is provided. Here, the outer diameter of the developing roller 106 is smaller than the outer diameter of the photosensitive drum 104. The outer diameter of the photosensitive drum 104 in this embodiment is within a range of Φ18 to Φ22, and the outer diameter of the developing roller 106 is within a range of Φ8 to Φ14. Efficient arrangement is possible by using these outer diameters.

[Assembling Drum Unit and Developing Unit]

Referring to FIG. 13, assembly of the drum unit 108 and the developing unit 109 will be described. The drum unit 108 and the developing unit 109 are connected by a drive-side cartridge cover member 116 and a non-drive-side cartridge cover member 117 provided at opposite longitudinal ends of the process cartridge 100. A drive-side cartridge cover member 116 provided at one end in the longitudinal direction of the process cartridge 100 is provided with a developing unit support hole 116*a* for swingably (movably) supporting the developing unit 109. Similarly, a non-drive-side cartridge cover member 117 provided at the other longitudinal end of the process cartridge 100 is provided with a developing unit support hole 117*a* for swingably supporting the developing unit 109. In addition, the drive-side cartridge cover member 116 and the non-drive-side cartridge cover member 117 are provided with drum support holes 116*b* and 117*b* for rotatably supporting the photosensitive drum 104.

Here, the outer diameter portion of the cylindrical portion 128*b* of the development cover member 128 is fitted into the development unit support hole 116*a* of the drive-side cartridge cover member 116 at the one end side. On the other end side, the outer diameter portion of the cylindrical portion (not shown) of the non-drive-side bearing 127 is fitted into the developing unit support hole 117*a* of the non-drive-side cartridge cover member 117. Further, the opposite ends of the photosensitive drum 104 in the longitudinal direction are fitted into the drum supporting holes 116*b* of the drive-side cartridge cover member 116 and the drum supporting holes 117*b* of the non-drive-side cartridge cover member 117, respectively. The drive-side cartridge cover member 116 and the non-drive-side cartridge cover member 117 are fixed to the drum unit 108 by screws, adhesive, or the like (not shown). By this, the developing unit 109 is supported by the drive-side cartridge cover member 116 and the non-drive-side cartridge cover member 117 so as to be rotatable with respect to the drum unit 108 (photosensitive drum 104), and can be positioned suitably for acting on the photosensitive drum 104 during the image forming operation.

FIG. 14 shows a state in which the drum unit 108 and the developing unit 109 are assembled through the above steps and integrally formed as the process cartridge 100. An axis connecting the center of the developing unit support hole 116*a* of the drive-side cartridge cover member 116 and the center of the developing unit support hole 117*a* of the non-drive-side cartridge cover member 117 is called a swing axis K. Here, the cylindrical portion 128*b* of the development cover member 128 on the one end side is coaxial with the development coupling 32. That is, the developing unit 109 is structured such that the driving force is transmitted from the image forming apparatus main assembly 170 at this swing axis K. Further, the developing unit 109 is supported rotatably about the swing axis K.

[Structure of Separation and Contact Mechanism]

As described above, the process cartridges 100Y and 100K includes the separation and contact mechanism 150. Here, a detailed description will be made as to a structure in which the photosensitive drums 104 of the process cartridges 100Y and 100K in this embodiment and the developing rollers 106 of the developing units 109 are separated from each other and contacted with each other. The process cartridges 100Y and 100K include a drive-side separation and contact mechanism 150R on the drive-side and a non-drive-side separation and contact mechanism 150L on the non-drive-side.

Figure 15:
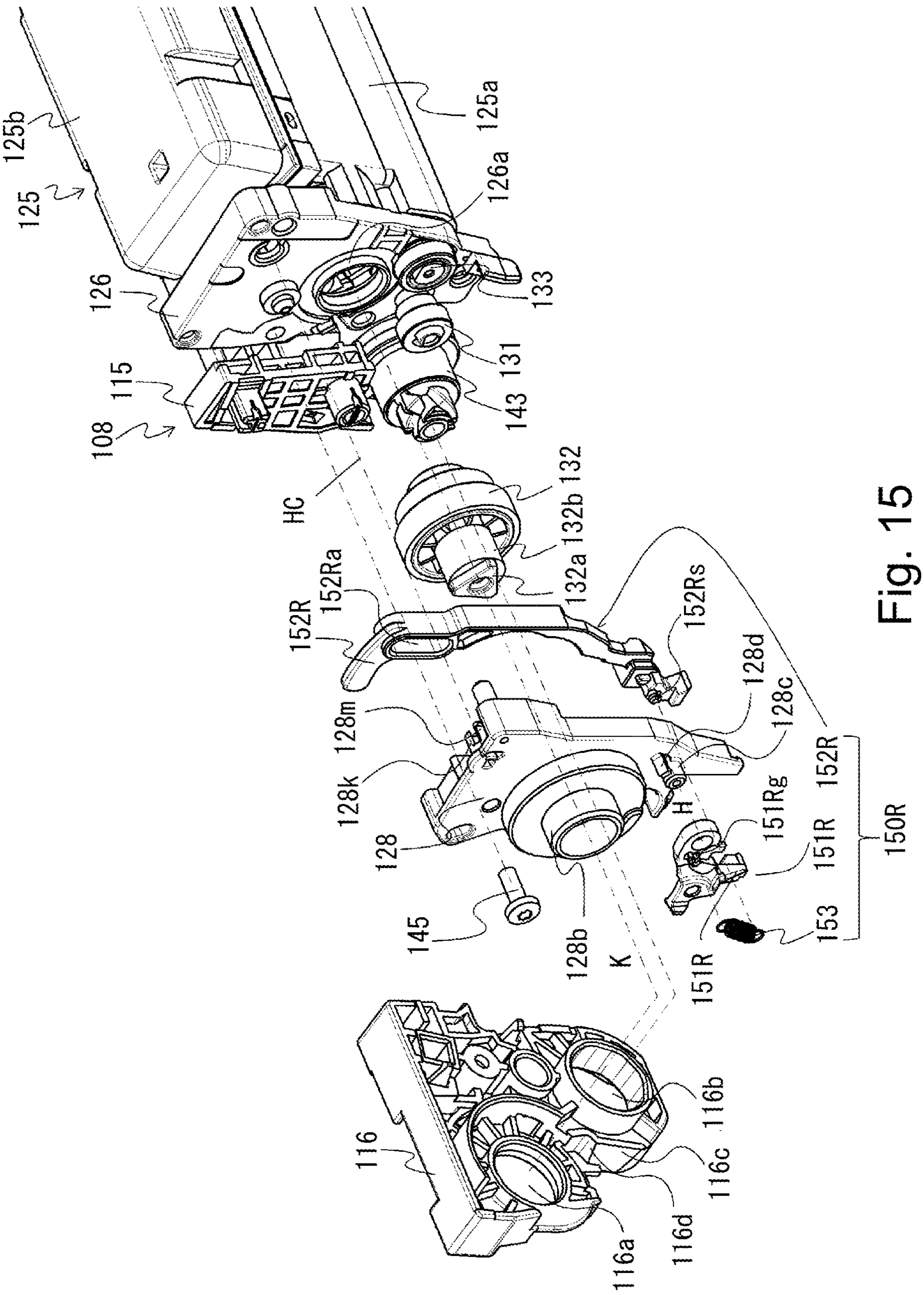
FIG. 15 is an assembly perspective view of the process cartridge of Embodiment 1.
Figure 16:
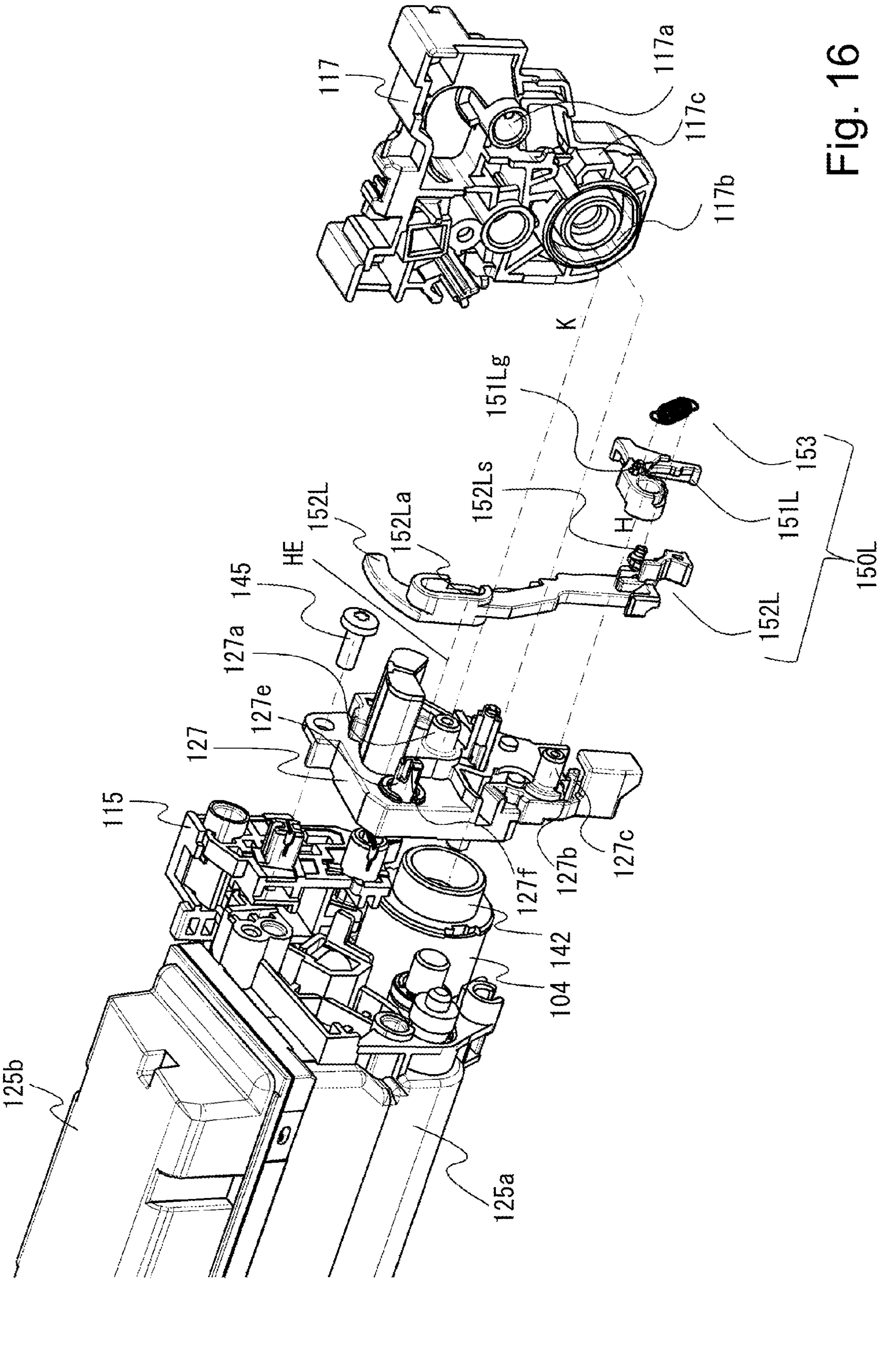
FIG. 16 is an assembly perspective view of the process cartridge of Embodiment 1.

FIG. 15 shows an assembly perspective view of the drive-side of the developing unit 109 including the drive-side separation and contact mechanism 150R. FIG. 16 shows an assembly perspective view of the non-drive-side of the developing unit 109 including the non-drive-side separation and contact mechanism 150L. Regarding the separation and contact mechanism 150, the drive-side separation and contact mechanism 150R will first be described in detail, and then the non-drive-side separation and contact mechanism 150L will be described. As for the separation and contact mechanism, the drive-side and the non-drive-side have almost the same function, and therefore, R is indicated at the end of the reference numeral of each member for the drive-side. For the non-drive-side, the reference numerals of the respective members are the same as those on the drive-side, and L is added at the end.

The separation and contact mechanism 150R has a separation holding member 151R as a regulating member, a force applying member 152R as a pressing member, and a tension spring 153. The non-drive-side separation and contact mechanism 150L has a separation holding member 151L as a regulating member, a force applying member 152L as a pressing member, and a tension spring 153.

[Detailed Description of Separation Holding Member 151R]

Figure 17:
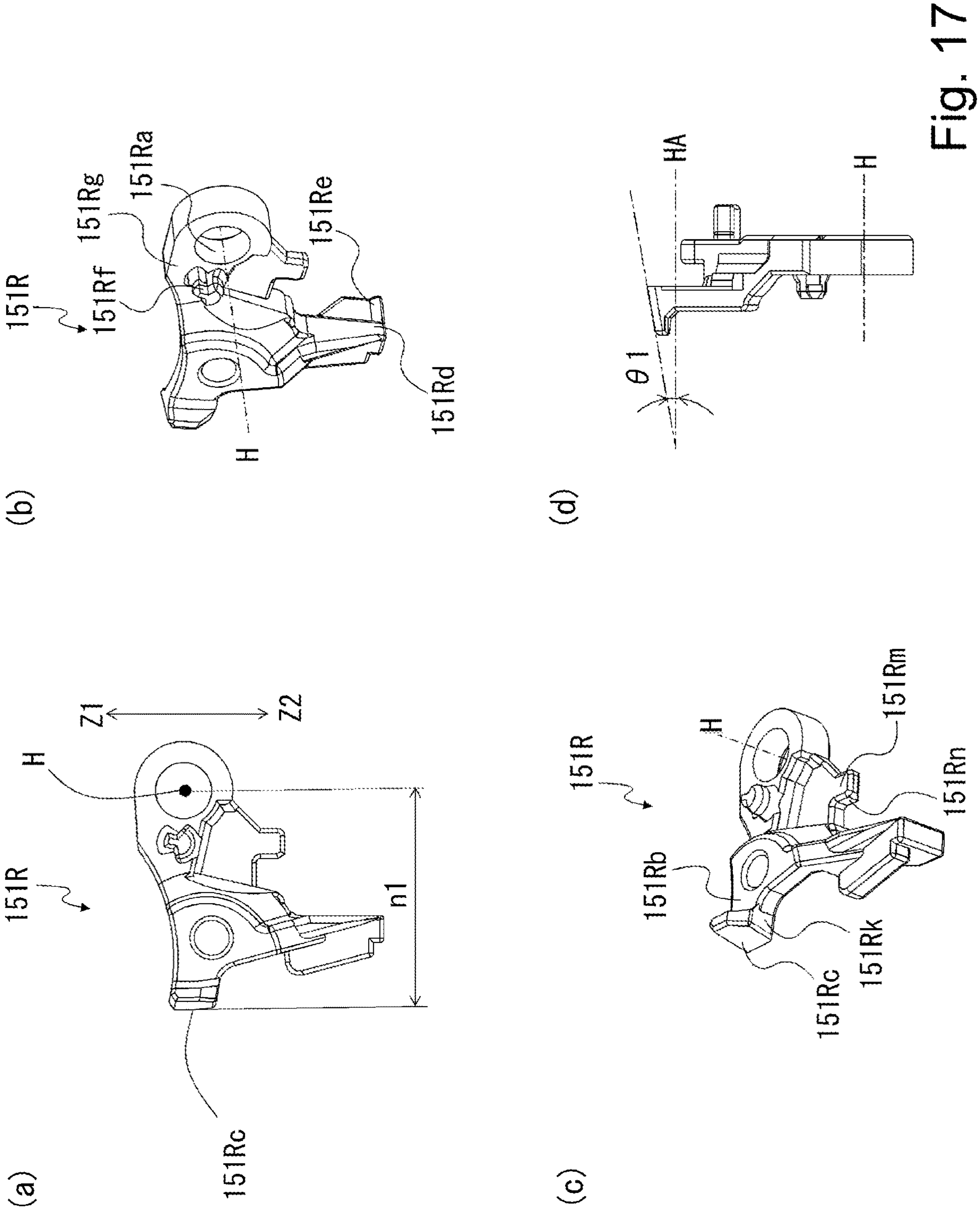
FIG. 17 is views of a spacing member R per se of in Embodiment 1.

Referring to Figure, the separation holding member 151R will be described in detail. Part (a) of FIG. 17 is a front view of the separation holding member 151R per se as viewed in the longitudinal direction of the process cartridge 100 from the drive-side, part (b) of FIG. 17 and part (c) of FIG. 17 are perspective views of the separation holding member 151R, and part (d) of FIG. 17 is a view of the separation holding member 151R as viewed in the direction of arrow Z2 in part (a) of FIG. 17 (vertical upward direction in the image forming state). The separation holding member 151R has an annular support receiving portion 151Ra, and has a separation holding portion 151Rb projecting from the support receiving portion 151Ra in the radial direction of the support receiving portion 151Ra. The free end of the separation holding portion 151Rb has a separation holding surface 151Rc including an arcuate shape centered on the separation holding swing axis H and inclined at an angle θ1 with respect to a line HA parallel to the separation holding swing axis H. The angle θ1 is set so as to satisfy Expression (1).

$$0^\circ \le \theta 1 \le 45^\circ \quad (1)$$

Further, the separation holding member 151R has a second restricted surface 151Rk adjacent to the separation holding surface 151Rc. Further, the separation holding member 151R has a second pressed portion 151Rd which projects in the Z2 direction from the support receiving portion 151Ra, and an arc shaped second pressed surface 151Re which projects from the second pressed portion 151Rd in the direction of the separation holding swing axis H of the support receiving portion 151Ra. Furthermore, the separation holding member 151R includes a main body portion 151Rf connected to the support receiving portion 151Ra, and the main body portion 151Rf has a spring hooked portion 151Rg projecting in the separation holding swing axis H direction of the support receiving portion 151Ra. Moreover, the main body portion 151Rf has a rotation preventing portion 151Rm which projects in the Z2 direction, and a rotation preventing surface 151Rn is provided in a direction facing the second pressed surface 151Re.

[Detailed Description of Force Applying Member R]

Figure 18:
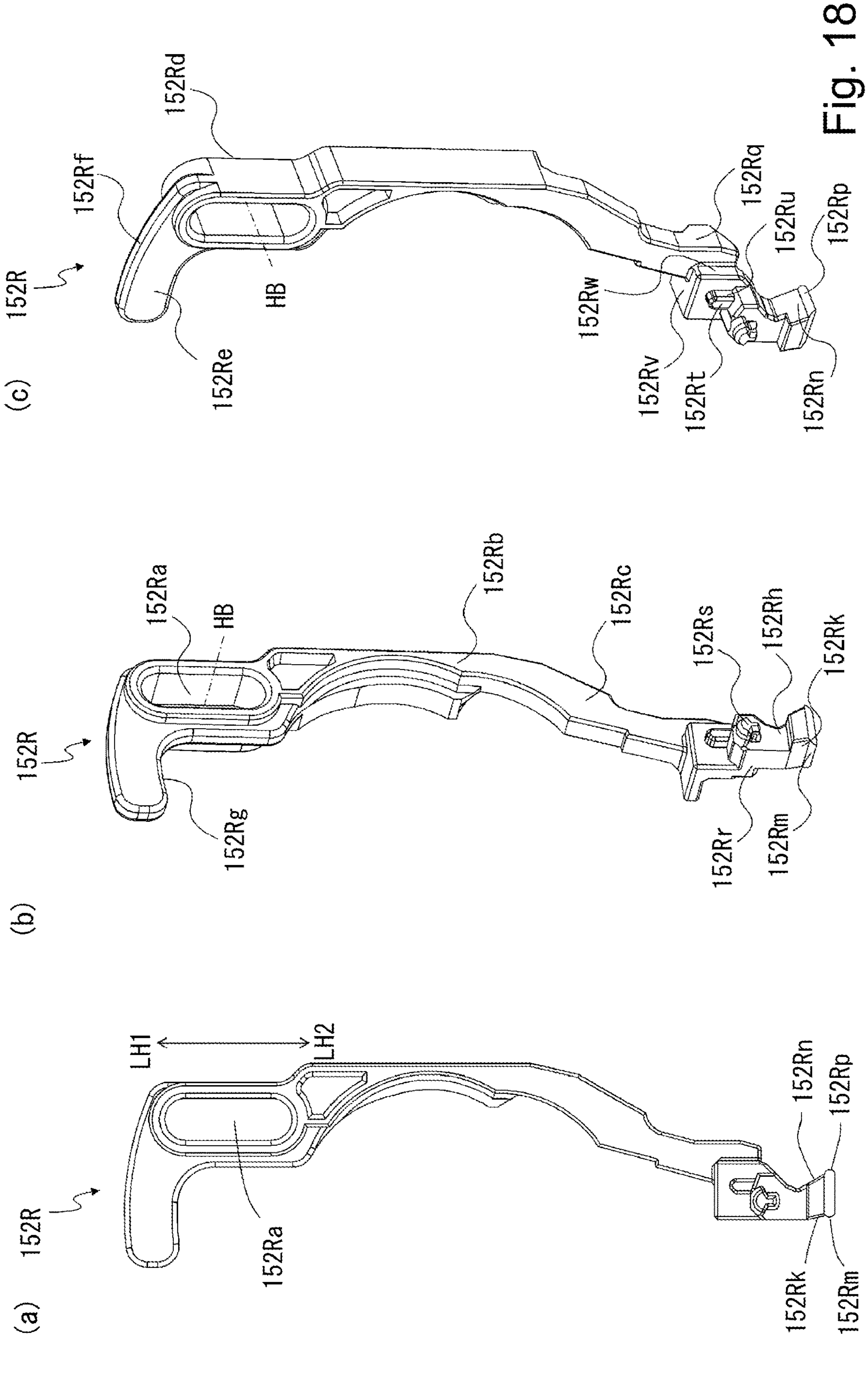
FIG. 18 is views of a force applying member R per se in Embodiment 1.

Referring to FIG. 18, the force applying member 152R will be described in detail. Part (a) of FIG. 18 is a front view of the force applying member 152R per se as viewed in the longitudinal direction of the process cartridge 100, and part (b) of FIG. 18 and part (c) of FIG. 18 are perspective views of the force applying member 152R per se. The force applying member 152R has an oblong support receiving portion 152Ra. Here, the longitudinal direction of the oblong shape of the oblong support receiving portion 152Ra is indicated by arrow LH, the upward direction is indicated by arrow LH1, and the downward direction is indicated by arrow LH2. In addition, the direction of the depth of the oblong support receiving portion 152Ra is HB.

The force applying member 152R is provided with a projecting portion 152Rh formed on the downstream side of the oblong support receiving portion 152Ra in the direction of the arrow LH2. The oblong support receiving portion 152Ra and the projecting portion 152Rh are connected by a main body portion 152Rb. On the other hand, the force applying member 152R has a pushed portion 152Re which projects in the direction of the arrow LH1 and in a direction substantially perpendicular to the direction of the arrow LH1, and is provided with an arc shaped pushed surface 152Rf on the downstream side thereof in the arrow LH1 direction and is provided with a push-restricting surface 152Rg on the upstream side. In addition, the force applying member 152R is provided with a first at-retraction restricting surface 152Rv extending from the body portion 152Rb toward an upstream side in the direction of the arrow LH2 from the projecting portion 152, and a second at-retraction restricting surface 152Rw extending substantially in parallel with a first pressing surface 152Rq adjacent to the first at-retraction restricting surface 152Rv.

The projecting portion 152Rh is provided with a first force receiving portion 152Rk and a second force receiving portion 152Rn which are arranged to face each other in a direction approximately perpendicular to the direction of the arrow LH2 at the end portion of the direction of the arrow LH2. The first force receiving portion 152Rk and the second force receiving portion 152Rn have a first force receiving surface 152Rm and a second force receiving surface 152Rp extending in the HB direction and having an arc shape, respectively. The projecting portion 152Rh has a spring hooked portion 152Rs and a locking portion 152Rt projecting in the HL direction, and the locking portion 152Rt has a locking surface 152Ru facing in the same direction as the first force receiving surface 152Rp.

Further, the force applying member 152R is provided with a first pressing surface 152Rq which is a part of the main body portion 152Rb and arranged upstream, in the direction of the arrow LH2, of the second force receiving portion 152Rn and which faces in the same direction as the second force receiving surface 152Rp. In addition, the force applying member 152R has a second pressing surface 152Rr which is perpendicular to the first retraction restricting surface 152Rv and is opposed to the first pressing surface 152Rq. When the process cartridge 100 is mounted in the image forming apparatus main assembly 170, the LH1 direction is substantially the same as the Z1 direction, and the LH2 direction is substantially the same direction as the Z2 direction. Also, the HB direction is substantially the same as the longitudinal direction of the process cartridge 100.

[Assembly of Separation and Contact Mechanism R]

Figure 19:
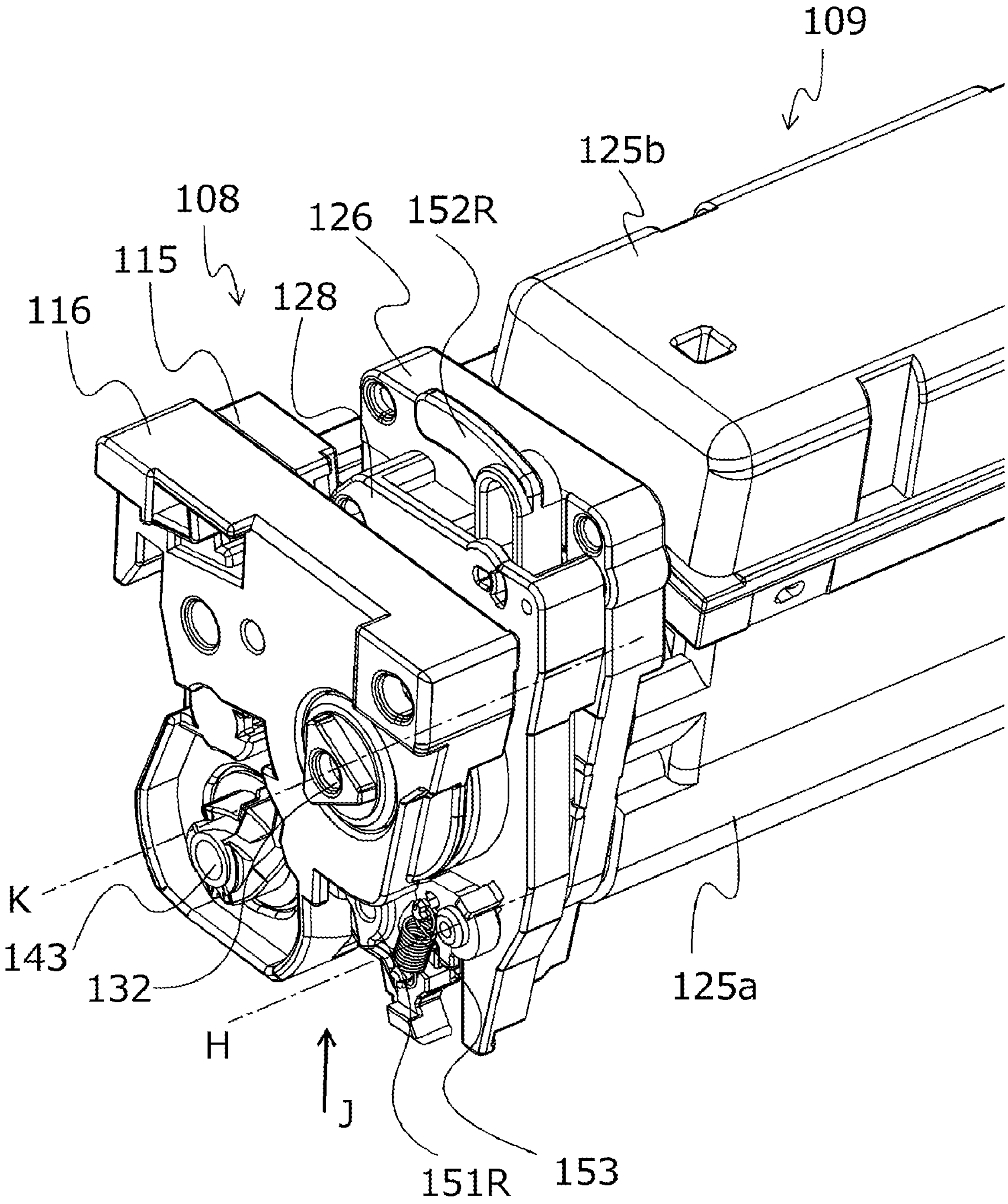
FIG. 19 is a partial sectional view after assembly of the spacing member R in Embodiment 1.

Referring to FIGS. 10 and 15 to 19, assembly of the separation and contact mechanism will be described. FIG. 19 is a perspective view of the process cartridge 100 after the separation holding member 151R is assembled, as viewed from the drive-side. As described above, as shown in FIG. 15, the developing unit 109 is rotatably supported with respect to the photosensitive drum 104 about the axis K by fitting the outer diameter portion of the cylindrical portion 128*b* of the development cover member 128 into the developing unit support hole 116*a* of the drive-side cartridge cover member 116. In addition, the development cover member 128 has a first cylindrical support portion 128*c* and a second support portion 128*k* which project in the direction of the swing axis K.

The outer diameter of the first support portion 128*c* fits to the inner diameter of the support receiving portion 151Ra of the separation holding member 151R to rotatably support the separation holding member 151R. Here, the swing center of the separation holding member 151R assembled to the development cover member 128 is referred to as the separation holding swing axis H. The development cover member 128 has a first retaining portion 128*d* which projects in the direction of the separation holding swing axis H. As shown in Figure As shown in FIG. 15, the movement of the separation holding member 151R assembled to the development cover member 128 in the separation holding swing axis H direction is restricted by the contact of the separation holding member 151R with the first retaining portion 128*d*.

In addition, the outer diameter of the second support portion 128*k* is fitted to the inner wall of the oblong support receiving portion 152Ra of the force applying member 152R to support the force applying member 152R rotatably and movably in the oblong direction. Here, the swing center of the force applying member 152R assembled to the development cover member 128 is defined as a force applying member swing axis HC. As shown in FIG. 15, the movement of the force applying member 152R assembled to the development cover member 128 in the direction of the force applying member swing axis HC is restricted by the contact of the second retaining portion 128*m* with the separation holding member 151R.

FIG. 10 is a cross-sectional view in which a part of the drive-side cartridge cover member 116 and a part of the development cover member 128 are partly omitted along a partial cross-sectional line CS so that the fitting portion between the oblong support receiving portion 151Ra of the force applying member 152R and the cylindrical portion 128*b* of the development cover member 128 can be seen. The separation and contact mechanism 150R is provided with a tension spring 153 as an urging means for urging the separation holding member 151R to rotate in the arrow B1 direction in the drawing about the separation holding swing axis H and urging the force applying member 152R in the arrow B3 direction. The arrow B3 direction is substantially parallel to the longitudinal direction LH2 direction (see FIG. 18) of the oblong support receiving portion 152Ra of the force applying member 152R. The tension spring 153 is provided between a spring hooked portion 151Rg provided on the separation holding member 151R and a spring hooked portion 152Rs provided on the force applying member 152R. The tension spring 153 applies force to the spring hooked portion 151Rg of the separation holding member 151R in the direction of arrow F2 in FIG. 10, thereby applying an urging force to rotate the separation holding member 151R in the direction of arrow B1. In addition, the tension spring 153 applies a force to the spring hooked portion 152Rs of the force applying member 152R in the arrow F1 direction, thereby applying an urging force to move the force applying member 152R in the arrow B3 direction.

An angle θ2 formed between a line GS connecting the spring hooked portion 151Rg of the separation holding member 151R and the spring hooked portion 152Rs of the force applying member 152R, and a line HS connecting the spring hooked portion 152Rs of the force applying member 152R and the swing axis HC of the force applying member, and is selected so as to satisfy the following formula (2), with the clockwise direction around the spring hooked portion 152Rs of the force applying member 152R being positive. By this, the force applying member 152R is urged to rotate in the arrow BA direction about the force applying member swing axis HC.

$$0° \leq \theta 2 \leq 90° \quad (2)$$

As shown in FIG. 15, the development drive input gear 132 is arranged such that the inner diameter of the cylindrical portion 128*b* of the development cover member 128 and the outer diameter of the cylindrical portion 32*b* of the development drive input gear 132 are fitted, and the portion 126*a* of the drive-side bearing 126 is fitted in a cylindrical portion (not shown) of the development driving input gear, by which, the driving force is transmitted to the developing roller gear 131, the toner feeding roller gear 133, and other gears.

In this embodiment, the mounting positions of the separation holding member 151R and the force applying member 152R is such that in the direction of the swing axis K, the separation holding member 151R is provided (outside in the longitudinal direction) the side on which the drive-side cartridge cover member 116 exists, with respect to the development cover member 128, and the force applying member 152R is disposed on the side (inner side in the longitudinal direction) on which the development drive input gear 132 exists, with respect to the development cover member 128. However, the such positions is not limiting, and the arrangement positions of the separation holding member 151R and the force applying member 152R may be exchanged, and the separation holding member 151R and the force applying member 152R may be provided on one side of the development cover member 128 in the swing axis K direction with as a reference. Further, the arrangement order of the separation holding member 151R and the force applying member 152R may be changed.

The development cover member 128 is fixed to the developing unit frame 125 by way of the drive-side bearing 126 to form the developing unit 109. Although the fixing method in this embodiment uses a fixing screw 145 and an adhesive (not shown) as shown in FIG. 15, the fixing method is not limited to such an example, and heat welding or resin material may be used.

Figure 20:
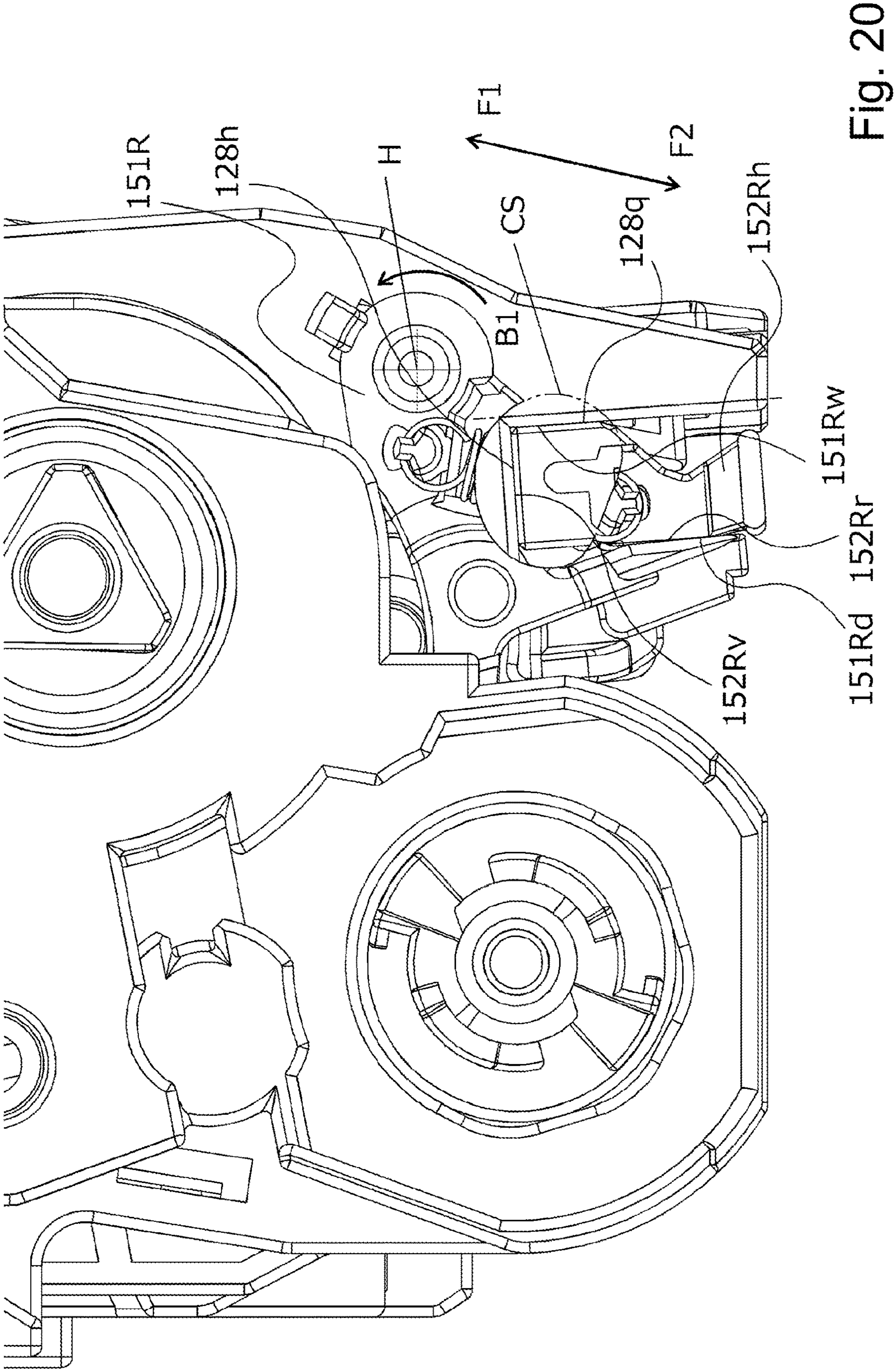
FIG. 20 is an enlarged view of a periphery of the spacing member R in the Embodiment 1.

Here, FIG. 20 is a cross-sectional view in which the neighborhood of the separation holding member 151R in FIG. 10 is enlarged, and a part of the tension spring 153 and the separation holding member 151R is partially omitted along a sectional line CS4, for better illustration. In the force applying member 152R, the force applying force of the tension spring 153 directed in the F1 direction in the drawing causes the first retracted restricting surface 152Rv of the force applying member 152R to come into contact with the first restricting surface 128*h* of the development cover member 128. In addition, the second at-retraction restricting surface 152Rw of the force applying member 152R contacts the second restricting surface 128*q* of the development cover member 128 to be positioned in place. This position is referred to as a retracted position (reference position) of the force applying member 152R. Further, the separation holding member 151R is rotated in the B1 direction about the separation holding swing axis H by the urging force of the tension spring 153 in the F2 direction, so that the second pressed portion 151Rd of the separation holding member 151R comes into contact with the second pressing surface 152Rr of the force applying member 152R, by which the rotation thereof is stopped. This position is referred to as the separation holding position (restriction position) of the separation holding member 151R.

Figure 21:
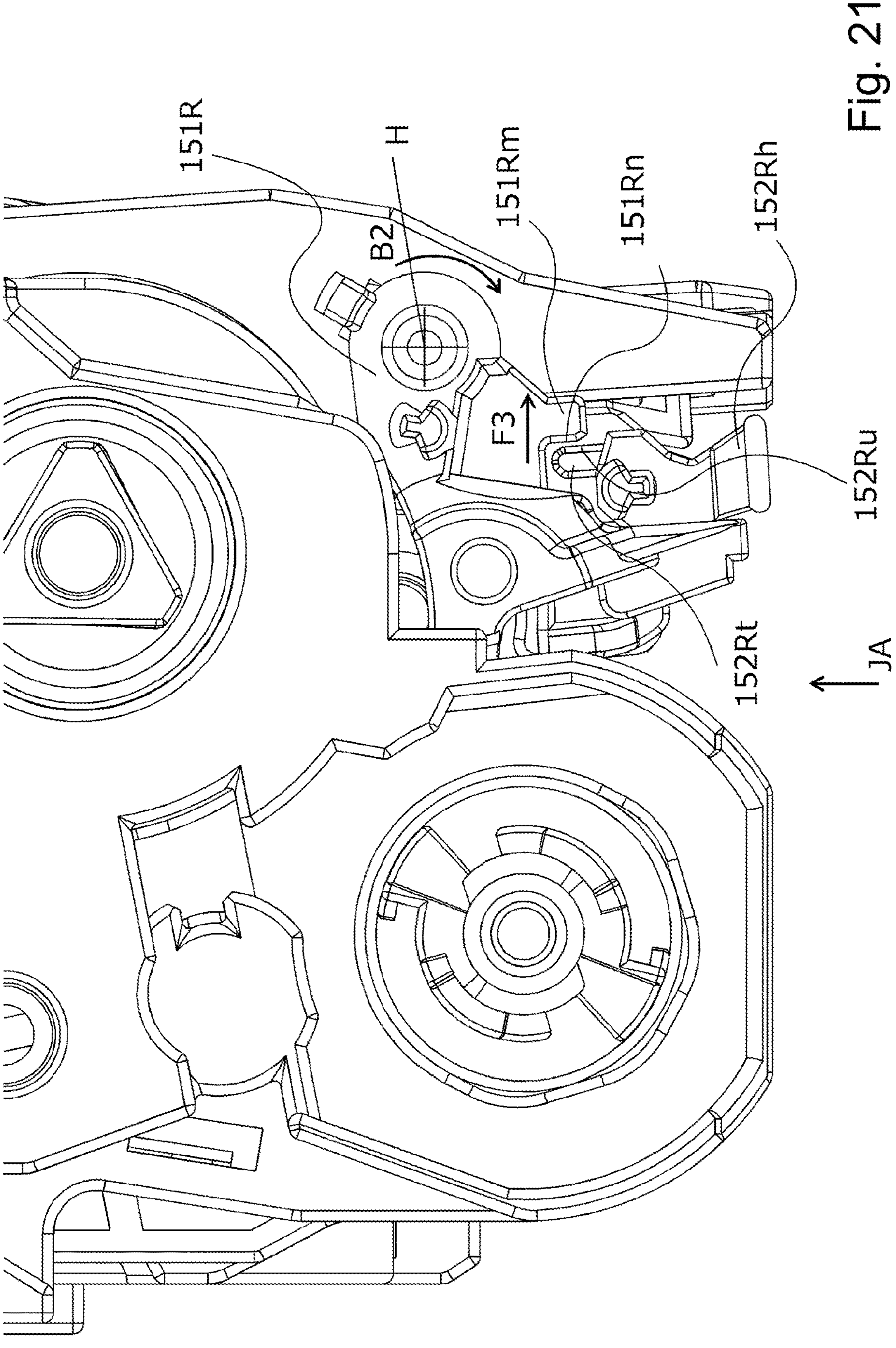
FIG. 21 is an enlarged view of a periphery of the spacing member R in Embodiment 1.

Furthermore, FIG. 21 is an enlarged view of the separation holding member 151R and the peripherals thereof in FIG. 10, with the tension spring 153 omitted, for better illustration. It is assumed here that the process cartridge 100 including the separation and contact mechanism 150R described in this embodiment drops off in the direction of JA in FIG. 21 during transportation. At this time, the separation holding member 151R receives a rotational force in the arrow B2 direction about the separation holding swing axis H due to its own weight. When the separation holding member 151R begins to rotate in the direction B2 for the reason described above, the rotation preventing surface 151Rn of the separation holding member 151R abuts against the locking surface 152Ru of the force applying member 152R, and the separation holding member 151R receives the force in the F3 direction in the drawing so as to suppress rotation in the B2 direction. By this, the rotation of the separation holding member 151R in the B2 direction during distribution can be suppressed, and the separation state between the photosensitive drum 104 and the developing unit 109 can be prevented from being impaired.

In this embodiment, the tension spring 153 is used as the urging means for urging the separation holding member 151R to the separation holding position and for urging the force applying member 152R to the retracted position, but the urging means is not limited to such an example. For example, a torsion coil spring, a leaf spring, or the like may be used as urging means to urge the force applying member 152R to the retracted position and the separation holding member 151R to the separation holding position. Further, the material of the urging means may be metal, mold, or the like, as long as it has elasticity and can urge the separation holding member 151R and the force applying member 152R. As described above, the developing unit 109 provided with the separation and contact mechanism 150R is integrally coupled with the drum unit 108 by the drive-side cartridge cover member 116 as described above (state of FIG. 19).

Figure 22:
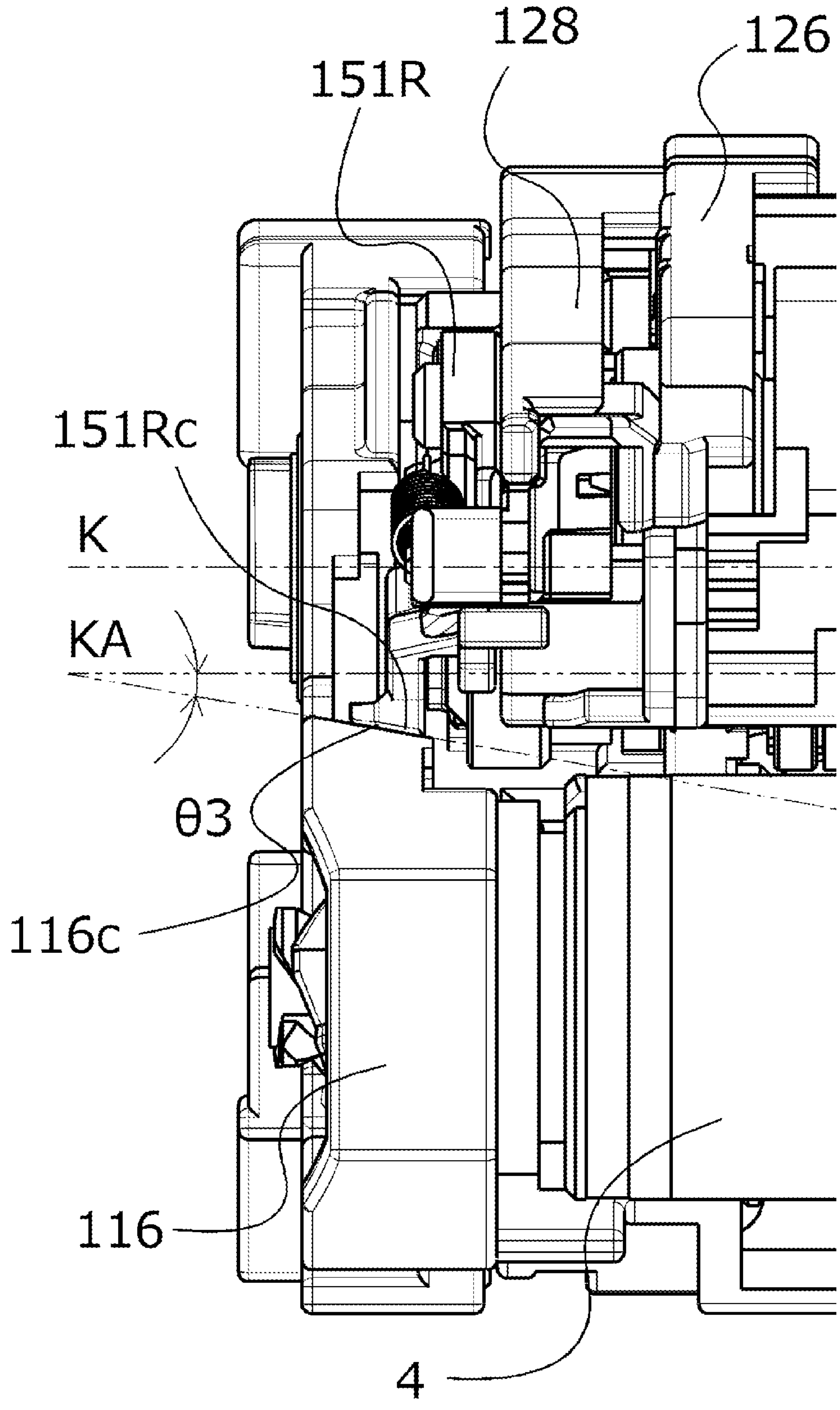
FIG. 22 is a bottom view of a drive-side of the process cartridge of Embodiment 1.

FIG. 22 is an illustration as viewed in the direction of arrow J in FIG. 19. As shown in FIG. 15, the drive-side cartridge cover member 116 of this embodiment has a contact surface 116*c*. The contact surface 116*c* is formed with an inclination angle θ3 with respect to the swing axis K, as shown in FIG. 22. The angle θ3 is preferably the same as the angle θ1 forming the separation holding surface 151Rc of the separation holding member 151R, but the angle θ3 is not limited to such an angle. Further, as shown in FIGS. 15 and 19 when the drive-side cartridge cover member 116 is assembled to the developing unit 109 and the drum unit 108, the contact surface 116*c* faces the separation holding surface 151Rc of the separation holding member 151R placed at the separation holding position and contacts the separation holding surface 151Rc by the urging force of the development pressure spring 134, which will be described hereinafter. The structure is such that when the engagement surface 116Rc and the separation holding surface 151Rc are brought into contact with each other, the developing unit 109 is positioned so that the developing roller 106 of the developing unit 109 and the photosensitive drum 104 are spaced by a gap P1. Thus, the state in which the developing roller 106 (developing member) is spaced from the photosensitive drum 104 by the gap P1 by the separation holding member 151R is referred to as a separated position (retracted position) of the developing unit 109 (see part (a) of FIG. 34.

Figure 24:
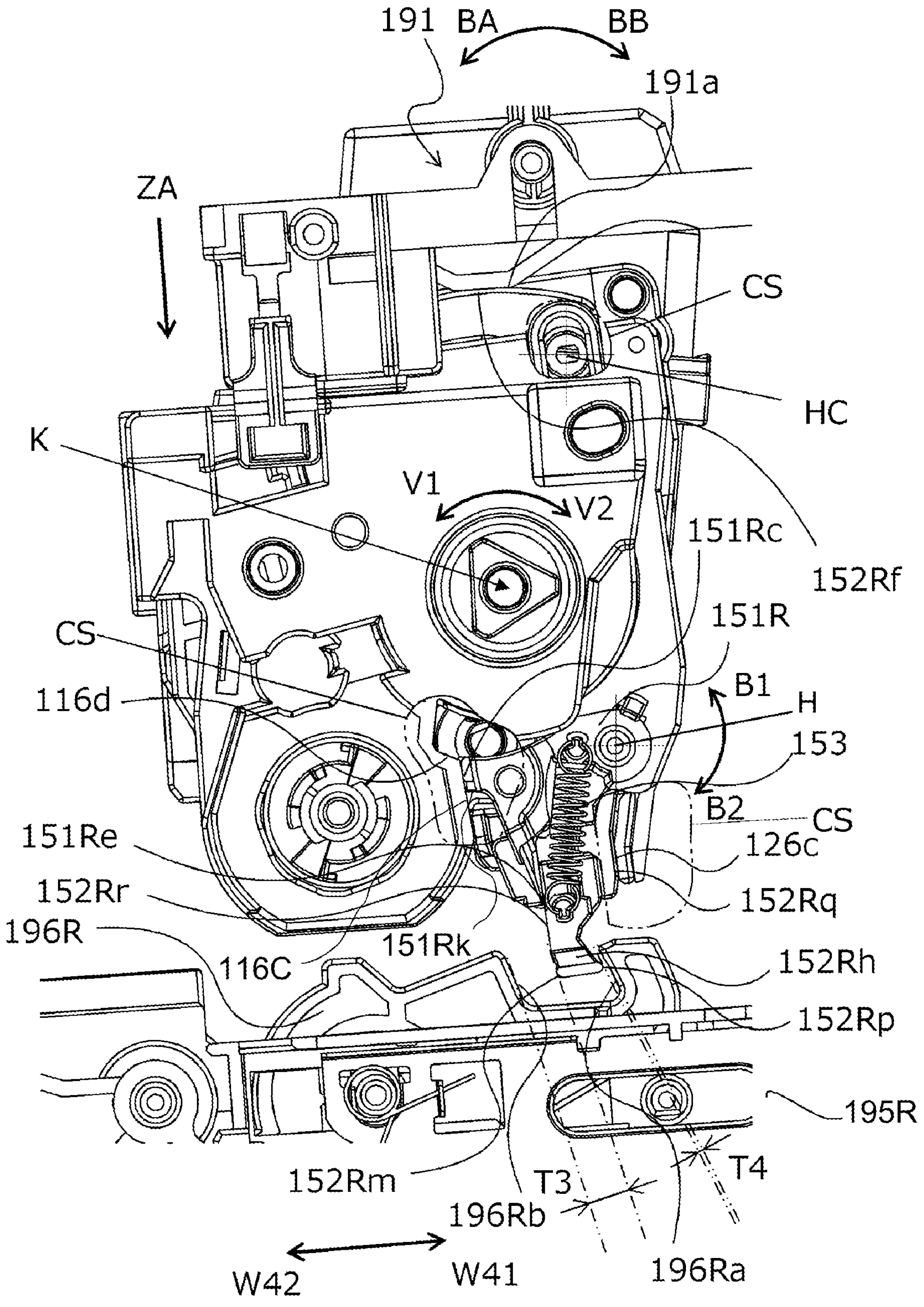
FIG. 24 is an illustration showing the operation of the developing unit in the main assembly of the image forming apparatus according to the Embodiment 1.
Figure 25:
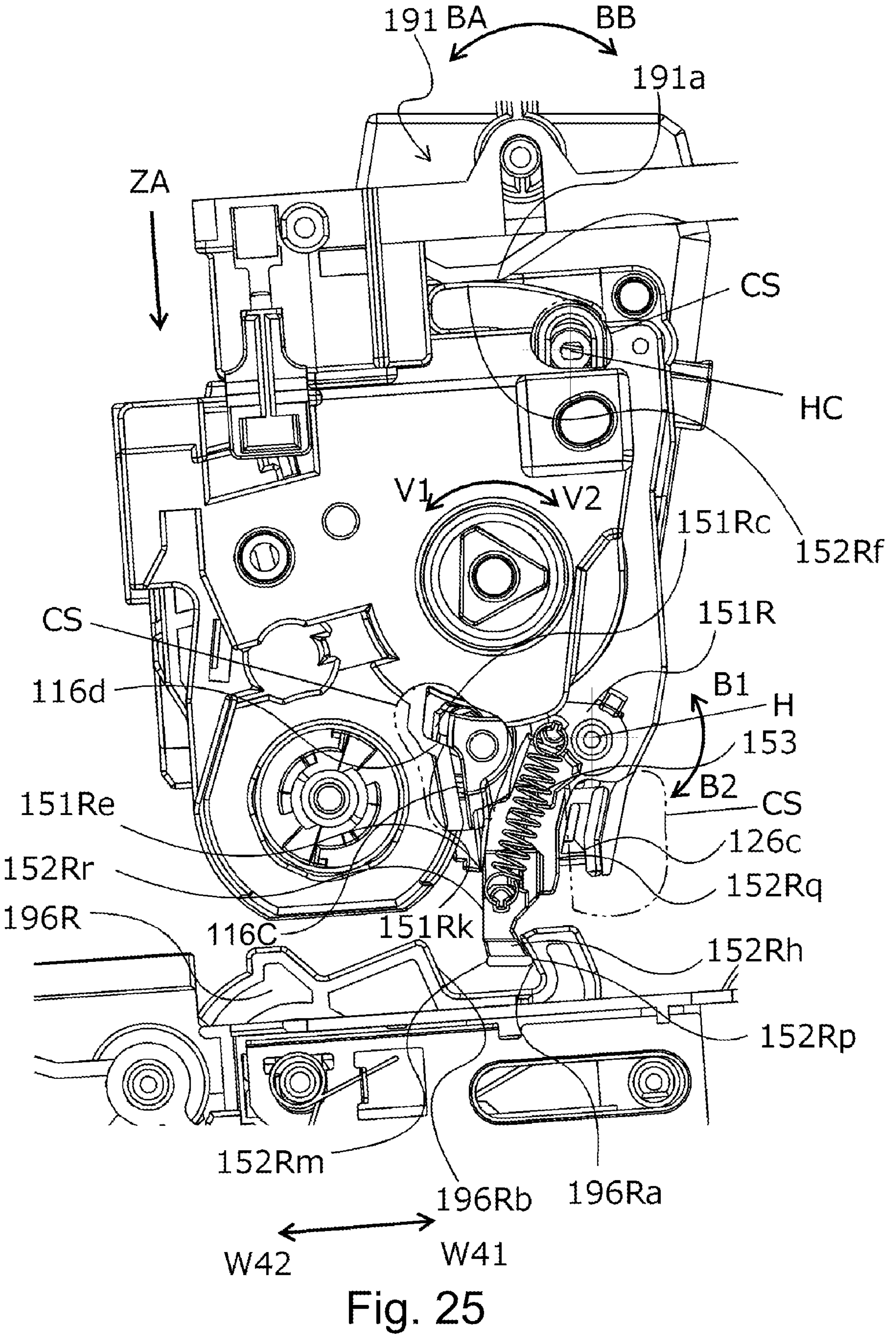
FIG. 25 is an illustration showing the operation of the developing unit in the main assembly of the image forming apparatus according to the Embodiment 1.

Here, referring to FIGS. 24 and 25, the separation state and contact state of the process cartridge 100 will be described in detail. FIGS. 24 and 25 are side views of the process cartridge 100 mounted inside the image forming apparatus main assembly 170 as viewed from the drive-side. FIG. 24 shows a state in which the developing unit 109 is separated from the photosensitive drum 104. FIG. 25 shows a state in which the developing unit 109 is in contact with the photosensitive drum 104.

First, in a state in which the separation holding member 151R is positioned at the separation holding position and the developing unit 109 is positioned at the separation position, the pushed portion 152Re of the force applying member 152R is pushed in the ZA direction, so that the projected portion 152Rh of the force applying member 152R projects from the process cartridge 100. The second pressed surface 151Re of the separation holding member 151R is in contact with the second pressing surface 152Rr of the force applying member 152R by the tension spring 153 as described above. Therefore, when the second force receiving portion 152Rn is pressed in the direction of arrow W42, the force applying member 152R rotates in the direction of arrow BB about the force applying member swing axis HC to rotate the separation holding member 151R in the direction of arrow B2. When the separation holding member 151R rotates in the arrow B2 direction, the separation holding surface 151Rc is separated from the contact surface 116*c*, and the developing unit 109 can rotate in the arrow V2 direction about the pivot axis K from the separation position. That is, the developing unit 109 rotates in the V2 direction from the separated position, so that the developing roller 106 of the developing unit 109 comes into contact with the photosensitive drum 104. Here, the position of the developing unit 109 in which the developing roller 106 and the photosensitive drum 104 contact with each other is referred to as a contact position (developing position) (state shown in FIG. 25). The position in which the separation holding surface 151Rc of the separation holding member 151R separates from the contact surface 116*c* is referred to as a separation release position (allowing position). When the developing unit 109 is positioned at the contact position, the second restricted surface 151Rk of the separation holding member 151R comes into contact with the second restricting surface 116*d* of the drive-side cartridge cover member 116, thereby maintaining the separation holding member 151R in the separation release position.

In addition, the drive-side bearing 126 is provided with a first pressed surface 126*c* which is a surface perpendicular to the swing axis K. Since the drive-side bearing 126 is fixed to the developing unit 109, when the developing unit 109 is in the contact position and the first force receiving portion 152Rk of the force applying member 152R is pressed in the direction of the arrow 41, by the first pressing surface 152Rq contacting the first pressed surface 126*c*, the developing unit 109 rotates in the direction of the arrow V1 about the swing axis K and moves to the separated position (state shown in FIG. 24). Here, the direction in which the first pressed surface 126*c* moves when the developing unit 109 moves from the contact position to the separated position is indicated by an arrow W41 in FIGS. 24 and 25. The direction opposite to the arrow W41 is the arrow W42, and the arrows W41 and W42 are substantially horizontal directions (X1 and X2 directions). As described above, the second force receiving surface 152Rp of the force applying member 152R assembled to the developing unit 109 is positioned upstream of the first pressed surface 126*c* of the drive-side bearing 126 in the direction of the arrow W41. Further, the first pressed surface 126*c* and the second force receiving surface 151Re of the separation holding member 151R are arranged at positions where at least parts thereof overlap in the W1 and W2 directions. The operation of the separation and contact mechanism 150R inside the image forming apparatus main assembly 170 will be described in detail below.

[Mounting of Process Cartridge to Image Forming Apparatus]

Figure 23:
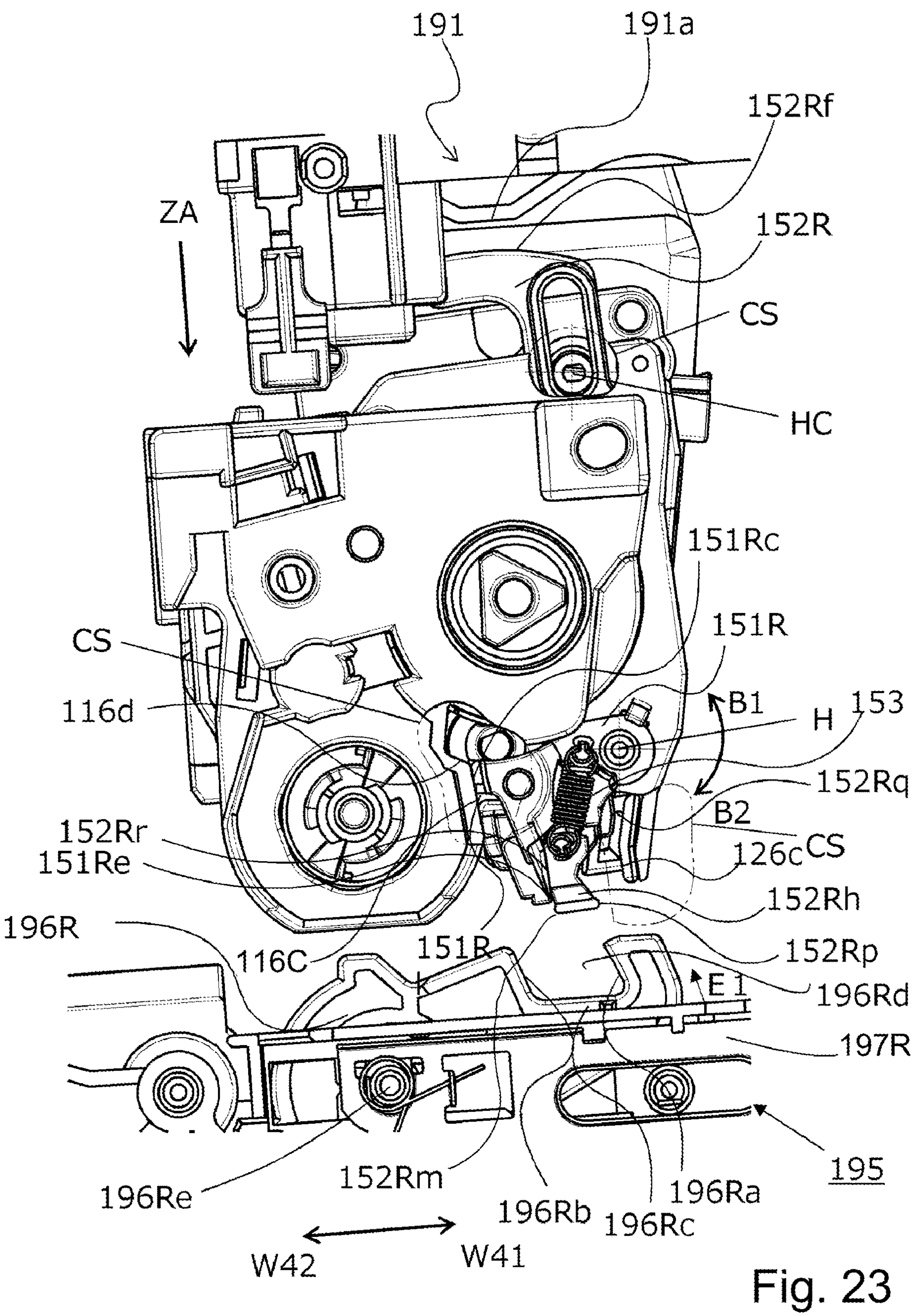
FIG. 23 is an illustration showing operation of the developing unit in the main assembly of the image forming apparatus according to the Embodiment 1.

Referring to FIGS. 12, 23 and 24, the description will be made as to an engaging operation of the separation and contact mechanism 150R of the process cartridge 100 with the development separation control unit 195 of the image forming apparatus main assembly 170 when the process cartridge 100 is mounted into the image forming apparatus main assembly 170. For better illustration, these Figures are cross-sectional views in which a part of the development cover member 128 and a part of the drive-side cartridge cover member 116 are omitted along cross-sectional lines CS1 and CS2.

FIG. 23 shows the process cartridge 100 as viewed from the drive-side with omission other than the process cartridge 100, the cartridge pressing unit 121 and the separation control member 196R, at the time when the process cartridge 100 is mounted on the cartridge tray 171 (not shown) of the image forming apparatus M and the cartridge tray 171 is inserted into the first mounting position.

As described above, the image forming apparatus main assembly 170 of this embodiment has the separation control member 196R corresponding to each process cartridge 100 as described above. The separation control member 196R is arranged closer to the lower surface side of the image forming apparatus main assembly 170 than the separation holding member 151R when the process cartridge 100 is positioned at the first inner position and the second inner position. The separation control member 196R includes a first force applying surface 196Ra and a second force applying surface 196Rb which face each other with a space 196Rd therebetween and which project toward the process cartridge 100. The first force applying surface 196Ra and the second force applying surface 196Rb are connected by way of a connecting portion 196Rc on the lower side of the image forming apparatus main assembly 170. In addition, the separation control member 196R is rotatably supported by the control metal plate 197 around a rotation center 196Re. The separation control member 196R is always urged in the E1 direction by an urging spring. Further, the separation control member 196R is structured to be movable in the W41 and W42 directions by structuring the control metal plate 197 to be movable in the W41 and W42 directions by a control mechanism (not shown).

In interrelation with the transition of the front door 11 of the image forming apparatus main assembly 170 from the open state to the closed state as described above, the cartridge pressing unit 121 lowers in the direction of the arrow ZA, and the first force application portion 121*a* abuts against the pushed surface 152Rf of the force applying member 152R. Thereafter, when the cartridge pressing unit 121 is lowered to a predetermined position, which is the second mounting position, the projecting portion 152Rh of the force applying member 152R projects downward in the Z2 direction of the process cartridge 100 (state shown in FIG. 24). This position is referred to as a projecting position of the force applying member 152R. When this operation is completed, a gap T4 is formed between the first force applying surface 196Ra of the separation control member 196R and the first force receiving surface 152Rp of the force applying member 152R, and a gap T3 is formed between the second force applying surface 196Rb the second force receiving surface 152Rp, as shown in FIG. 24. And, it is positioned at the second mounting position where the force applying member 152R does not act on the separation control member 196R.

This position of the separation control member 196R is referred to as a home position. At this time, the first force receiving surface 152Rp of the force applying member 152R and the first force applying surface 196Ra of the separation control member 196R are arranged so as to partially overlap with each other in the W1 and W2 directions. Similarly, the second force receiving surface 152Rp of the force applying member 152R and the second force applying surface 196Rb of the separation control member 196R are arranged so as to partially overlap with each other in the W1 and W2 directions.

[Abutment Operation of Developing Unit]

Figure 26:
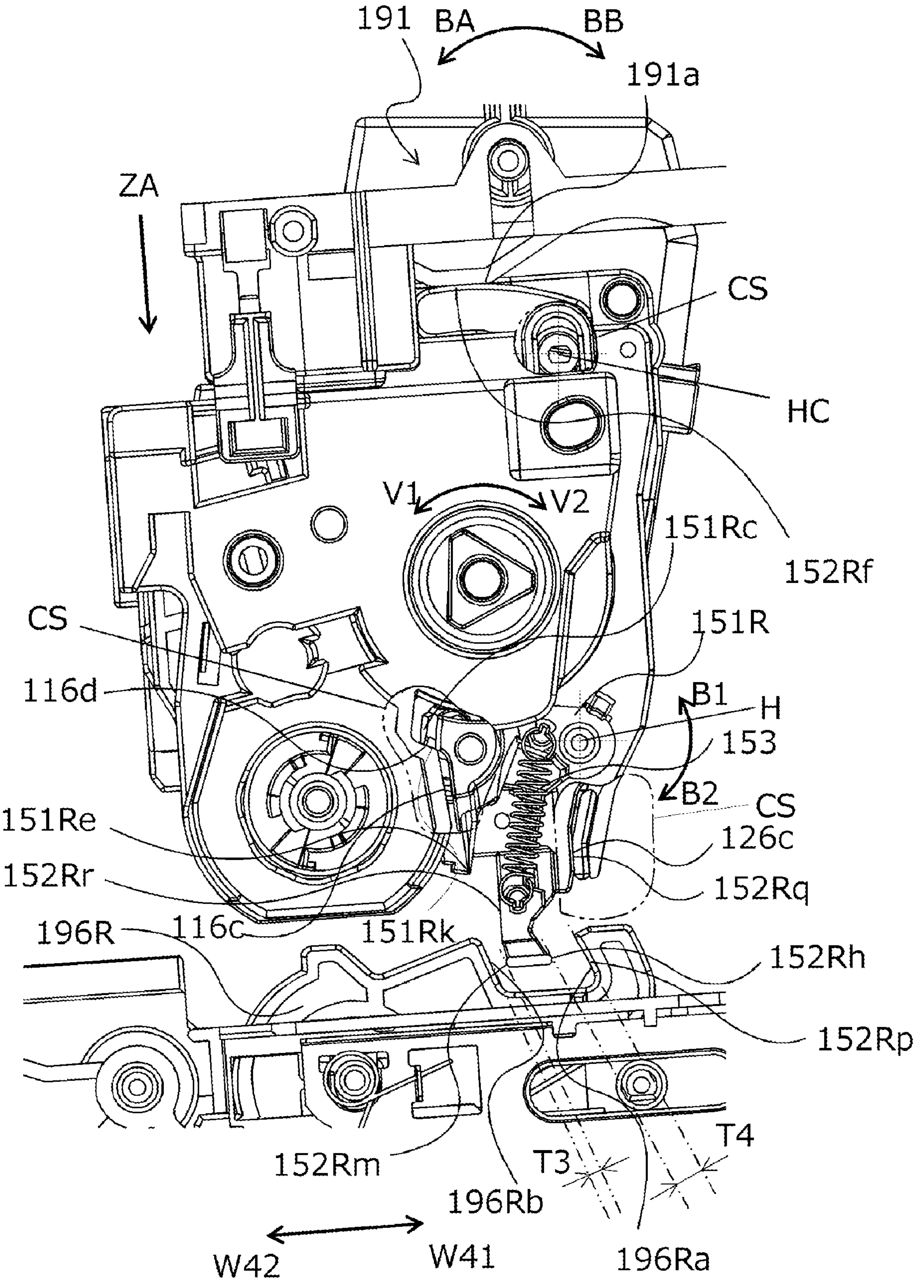
FIG. 26 is an illustration showing the operation of the developing unit in the main assembly of the image forming apparatus according to the Embodiment 1.

FIGS. 24 to 26, the operation of bringing the photosensitive drum 104 and the developing roller 106 into contact with each other by the separation and contact mechanism 150R will be described in detail. These Figures are cross-sectional views in which, for the sake of better illustration, a part of the development cover member 128, a part of the drive-side cartridge cover member 116, and a part of the drive-side bearing 126 are omitted, for better illustration, along partial cross-sectional lines CS1, CS2, and CS3.

In this embodiment, the development input coupling 32 receives a driving force from the image forming apparatus main assembly 170 in the direction of arrow V2 in FIG. 24, and the developing roller 106 rotates. That is, the developing unit 109 having the development input coupling 32 receives a torque about the swing axis K in the direction of the arrow V2 from the image forming apparatus main assembly 170. As shown in FIG. 24, when the developing unit 109 is in the separated position and the separation holding member 151R is in the separation holding position, even if the developing unit 109 receives this torque and the urging force of the developing pressure spring 134, which will be described hereinafter, the separation holding surface 151Rc of the separation holding member 151R contacts the contact surface 116*c* of the drive-side cartridge cover member 116, so that the attitude of the developing unit 109 is maintained at the separation position.

The separation control member 196R of this embodiment is structured to be movable from the home position in the direction of arrow W42 in FIG. 24. When the separation control member 196R moves in the W42 direction, the second force applying surface 196Rb of the separation control member 196R and the second force receiving surface 152Rp of the force applying member 152R are brought into contact with each other, so that the force applying member 152R rotates about the force applying member swing axis HC in the direction of arrow BB. Further, as the force applying member 152R rotates, the second pressing surface 152Rr of the force applying member 152R rotates the separation holding member 151R in the B2 direction in contact with the second pressed surface 151Re of the separation holding member 151R. Then, the separation holding member 151R is rotated by the force applying member 152R to the separation release position where the separation holding surface 151Rc and the contact surface 116*c* are separated from each other. Here, the position of the separation control member 196R that moves the separation holding member 151R to the separation release position shown in FIG. 25 is referred to as the first position.

In this manner, when the separation holding member 151R is moved to the separation release position by the separation control member 196R, the developing unit 109 is rotated in the direction V2 by the torque received from the image forming apparatus main assembly 170 and the developing pressure spring 134, which will be described hereinafter, so that it moves to the contact position where the roller 106 and the photosensitive drum 104 are in contact with each other (state shown in FIG. 25). At this time, the separation holding member 151R urged in the direction of the arrow B1 by the tension spring 153 is maintained at the separation release position by the contact of the second restricted surface 151Rk with the second regulating surface 116*d* of the drive-side cartridge cover member 116. Thereafter, the separation control member 196R moves in the W41 direction and returns to the home position. At this time, the force applying member 152R is rotated in the BA direction by the tension spring 153, and the first pressing surface 152Rq of the force applying member 152R and the first pressed surface 126*c* of the drive-side bearing 126 are brought into contact with each other (state of FIG. 26). By this, the above-described gaps T3 and T4 are formed again, and it is brought to a position where the separation control member 196R does not act on the force applying member 152R. The transition from the state of FIG. 25 to the state of FIG. 26 is performed immediately.

As described above, in the structure of this embodiment, by the movement of the separation control member 196R from the home position to the first position, the force applying member 152R is rotated so that the separation holding member 151R can be moved from the separation holding position to the separation release position. This enables the developing unit 109 to move from the spaced position to the contact position in which the developing roller 106 and the photosensitive drum 104 contact each other. The position of the separation control member 196R in FIG. 26 is the same as that in FIG. 24.

[Separating Operation of Developing Unit].

Figure 27:
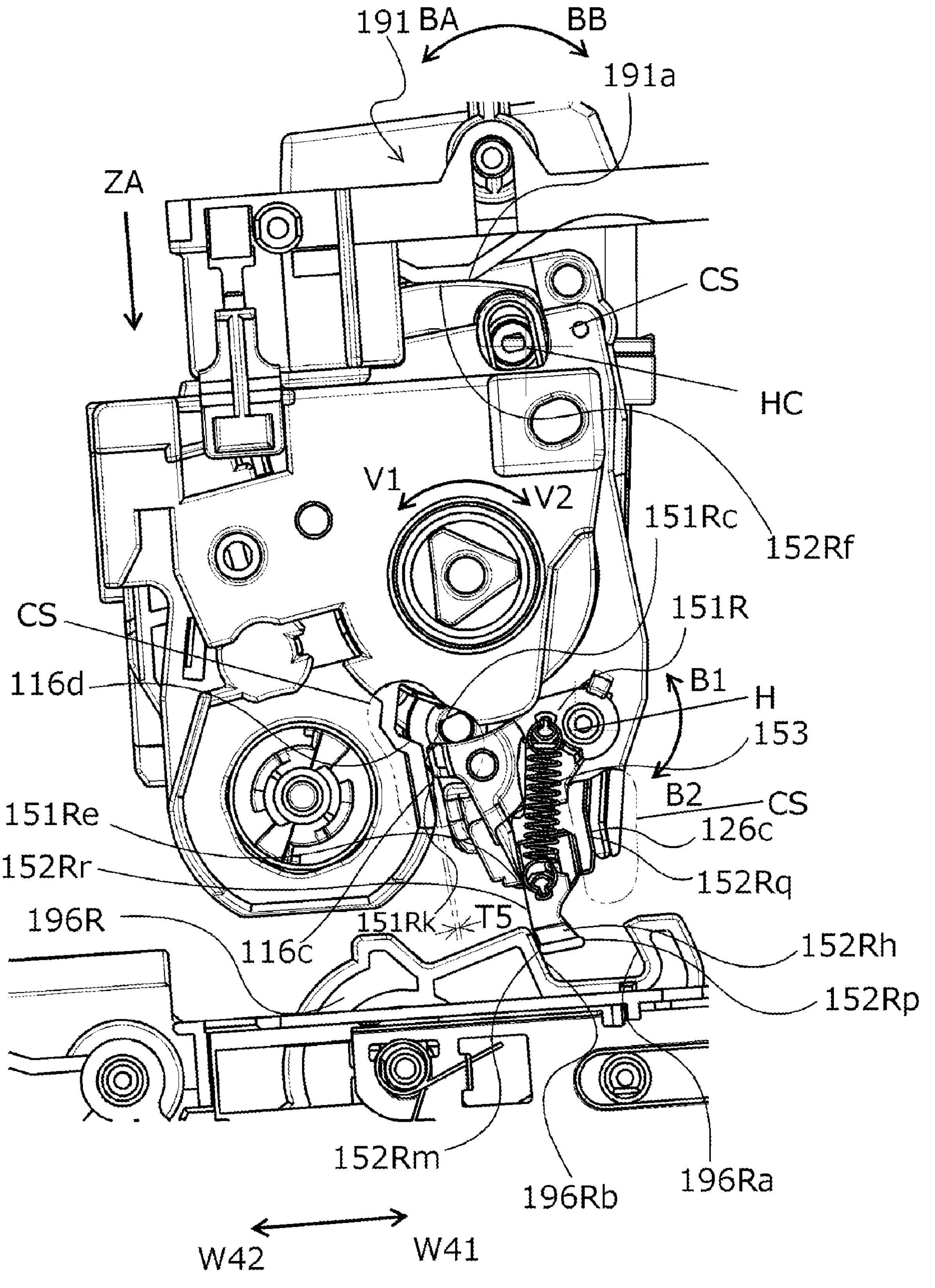
FIG. 27 is an illustration showing the operation of the developing unit in the main assembly of the image forming apparatus according to the Embodiment 1.

Referring to FIGS. 26 and 27, the operation of moving the developing unit 109 from the contact position to the separated position by the separation and contact mechanism 150R will be described in detail. These Figures are cross-sectional views in which, a part of the development cover member 128, a part of the drive-side cartridge cover member 116, and a part of the drive-side bearing 126 are omitted, for better illustration, along the sectional line CS.

The separation control member 196R in this embodiment is structured to be movable from the home position in the direction of arrow W41 in FIG. 26. When the separation control member 196R moves in the W41 direction, the second force applying surface 196Rb and the first force receiving surface 152Rm of the force applying member 152R come into contact with each other, so that the force applying member 152R rotates in the direction of the arrow BB about the force applying member swing axis HC. Then, by the first pressing surface 152Rq of the force applying member 152R being brought into contact with the first pressed surface 126*c* of the drive-side bearing 126, the developing unit 109 is rotated in the direction of the arrow V1 about the swing axis K from the contact position (state in FIG. 27). At this time, the pushed surface 152Rf of the force applying member 152R has an arc shape, and the center of this arc is arranged so as to align with the swing axis K. By this, when the developing unit 109 moves from the contact position to the separated position, the force applied from the cartridge pressing unit 121 to the pushed surface 152Rf of the force applying member 152R is directed in the direction of the swing axis K, and therefore, the operation can be performed without hindering the rotation in the direction of arrow V1. In the separation holding member 151R, the second restricted surface 151Rk of the separation holding member 151R and the second regulating surface 116*d* of the drive-side cartridge cover member 116 are separated from each other, and the separation holding member 151R rotates in the arrow B1 direction by the urging force of the tension spring 153. By this, the separation holding member 151R rotates until the second pressed surface 151Re comes into contact with the second pressing surface 152Rr of the force applying member 152R, and with the contact operation, it shifts to the separation holding position. When the separation control member 196R moves the developing unit 109 from the contact position toward the separation position and the separation holding member 151R is positioned at the separation holding position, a gap T5 is provided between the separation holding surface 151Rc and the contact surface 116*c* as shown in FIG. 27. Here, the position shown in FIG. 27 in which the developing unit 109 is rotated from the contact position toward the separation position so that the separation holding member 151 can be moved to the separation holding position is referred to as the second position of the separation control member 196R.

Thereafter, when the separation control member 196R moves in the direction of arrow W42 and returns from the second position to the home position, the developing unit 109 is rotated in the direction of the arrow V2 by the torque received from the image forming apparatus main assembly 170 and a development pressure spring 134, which will be described hereinafter, while maintaining the separation holding member 151R at the separation holding position, and the separation holding surface 151Rc and the contact surface 116*c* are brought into contact with each other. In other words, the developing unit 109 is maintained at the spaced position by the separation holding member 151R, and the developing roller 106 and the photosensitive drum 104 are spaced from each other with the gap P1 therebetween (the state shown in FIGS. 24 and 34(*a*)). By this, the above-described gaps T3 and T4 are provided again, and the separation control member 196R is positioned at a position where it does not act on the force applying member 152R (state shown in FIG. 24). The transition from the state of FIG. 27 to the state of FIG. 24 is carried out immediately.

As described above, in this embodiment, by the separation control member 196R moving from the home position to the second position, the separation holding member 151R is moved from the separation release position to the separation holding position. And, by the separation control member 196R returning from the second position to the home position, the developing unit 109 maintains the separation position by the separation holding member 151R.

[Detailed Description of the Separation Holding Member 151L]

Figure 28:
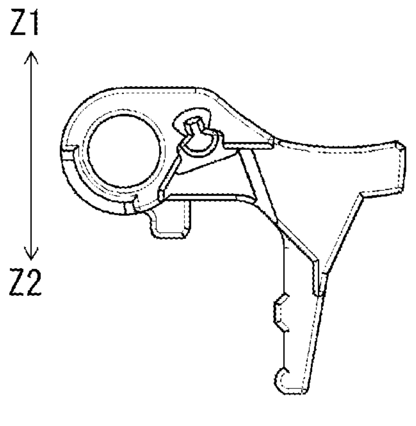
FIG. 28 is views of a spacing member L per se in Embodiment 1.
Figure 28:
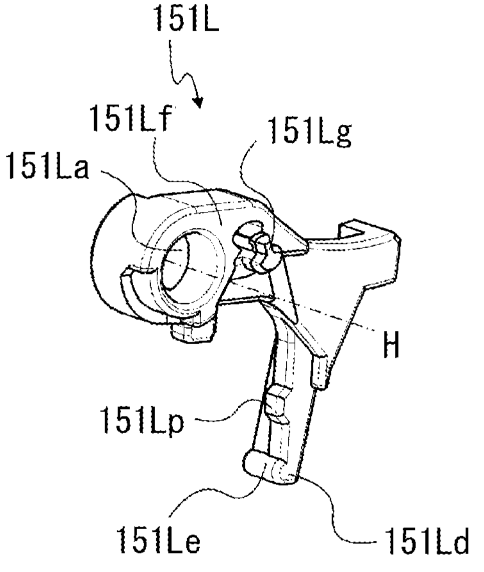
Figure 28:
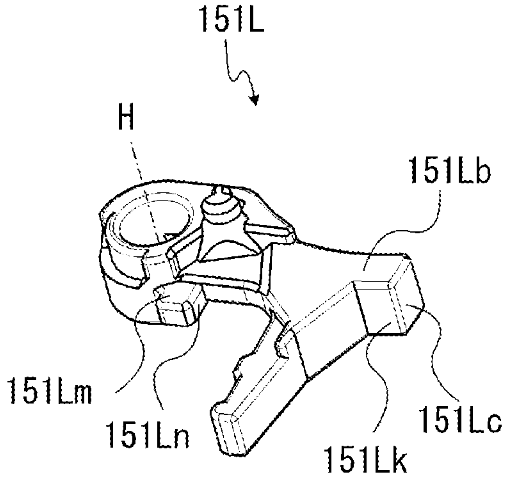

Referring to Figure, the separation holding member 151L will be described in detail. Part (a) of FIG. 28 is a front view of the separation holding member 151L per se as viewed in the longitudinal direction of the process cartridge 100 on the drive-side, and part (b) of FIG. 28 and part (c) of FIG. 28 are perspective views of the separation holding member 151L per se. The separation holding member 151L is provided with an annular support receiving portion 151La, and is provided with a separation holding portion 151Lb projecting from the support receiving portion 151La in the radial direction of the support receiving portion 151La. The free end of the separation holding portion 151Lb has an arc-shaped separation holding surface 151Lc centered on the separation holding swing axis H. In addition, the separation holding member 151L has a second restricted surface 151Lk adjacent to the separation holding surface 151Lc. Further, the separation holding member 151L is provided with a second pressed portion 151Ld which projects in the Z2 direction beyond the support receiving portion 151La, and is provided with an arc-shaped second pressed surface 151Le which projects from the second pressed portion 151Ld in the separation holding swing axis (H) direction of the support receiving portion 151La. Further, the separation holding member 151L has a main body portion 151Lf connected to the support receiving portion 151La, and the main body portion 151Lf is provided with a spring hooked portion 151Lg projecting in the separation holding swing axis (H) direction of the support receiving portion 151La. Furthermore, the main body portion 151Lf is provided with a rotation prevention portion 151*m* projecting in the Z2 direction, and a rotation preventing surface 151Ln thereof is provided in a direction facing the second pressed surface 151Le.

[Detailed Description of Force Applying Member L]

Figure 29:
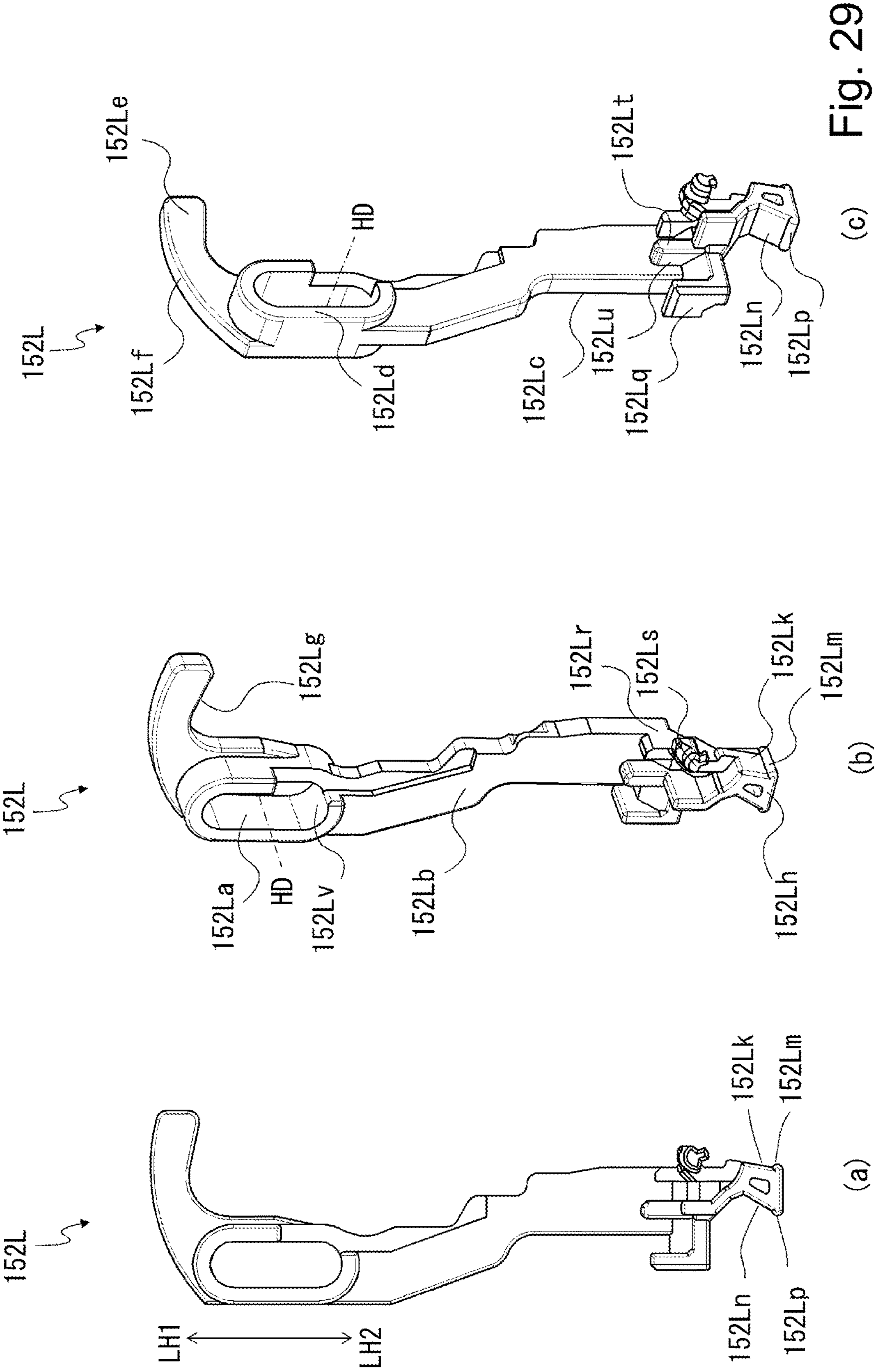
FIG. 29 is views of a force applying member L per se in Embodiment 1.

Referring to FIG. 29, The force applying member 152L will be described in detail. Part (a) of FIG. 29 is a front view of the force applying member 152L per se as viewed in the longitudinal direction of the process cartridge 100, and part (b) of FIG. 29 and part (c) of FIG. 29 are perspective views of the force applying member 152L per se. The force applying member 152L has an oblong support receiving portion 152La. Here, the longitudinal direction of the oblong shape of the support receiving portion 152La is indicated by arrow LH, the upward direction is indicated by arrow LH1, and the downward direction is indicated by arrow LH2. In addition, the direction in which the oblong support receiving portion 152La is formed is defined as HD. The force applying member 152L is provided with a projecting portion 152Lh formed downstream of the oblong support receiving portion 152La in the direction of the arrow LH2. The oblong support receiving portion 152La and the projecting portion 152Lh are connected by the main body portion 152Lb. On the other hand, the force applying member 152L is provided with a pushed portion 152Le which projects in the direction of the arrow LH1 and in a direction substantially perpendicular to the direction of the arrow LH1 and is provided with an arc-shaped pushed surface 152Lf on a downstream side in the arrow LH1 direction and a pushing restricting surface 152Lg. Further, the force applying member 152L is provided with a first retraction restricting surface 152Lv which is a part of the oblong support receiving portion 152La and which is located on the downstream side in the direction of the arrow LH2.

The projecting portion 152Lh is provided with a first force receiving portion 152Lk and a second force receiving portion 152Ln which are provided opposite to each other in a direction approximately perpendicular to the direction of the arrow LH2 at a terminal portion in the direction of the arrow LH2. The first force receiving portion 152Lk and the second force receiving portion 152Ln have a first force receiving surface 152Lm having an arc shape and a second force receiving surface 152Lp, respectively, the first force receiving surface 152Lm and the second force receiving surface 152Lp extending in the HD direction. In addition, the projecting portion 152Lh is provided with a spring hooked portion 152Ls projecting in the HB direction and a locking portion 152Lt, and the locking portion 152Lt has a locking surface 152Lu facing in the same direction as the second force receiving surface 152Lp.

Further, the force applying member 152L is a part of the main body portion 152Lb, is disposed on the upstream side of the second force receiving portion 152Ln in the direction of the arrow LH2, and has a first pressing surface 152Lq facing in the same direction as the second force receiving surface 152Lp. Further, the force applying member 152L is provided with a second pressing surface 152Lr which is a part of the main body portion 152Lb and which faces in the same direction as the first force receiving surface 152Lm, the second pressing surface 152Lr being disposed on the upstream side of the first force receiving portion 152Lk in the direction of the arrow LH2. When the process cartridge 100 is mounted in the image forming apparatus main assembly 170, the LH1 direction is substantially the same direction as the Z1 direction, and the LH2 direction is substantially the same direction as the Z2 direction. Also, the HB direction is substantially the same as the longitudinal direction of the process cartridge 100.

[Assembly of Separation and Contact Mechanism L]

Figure 30:
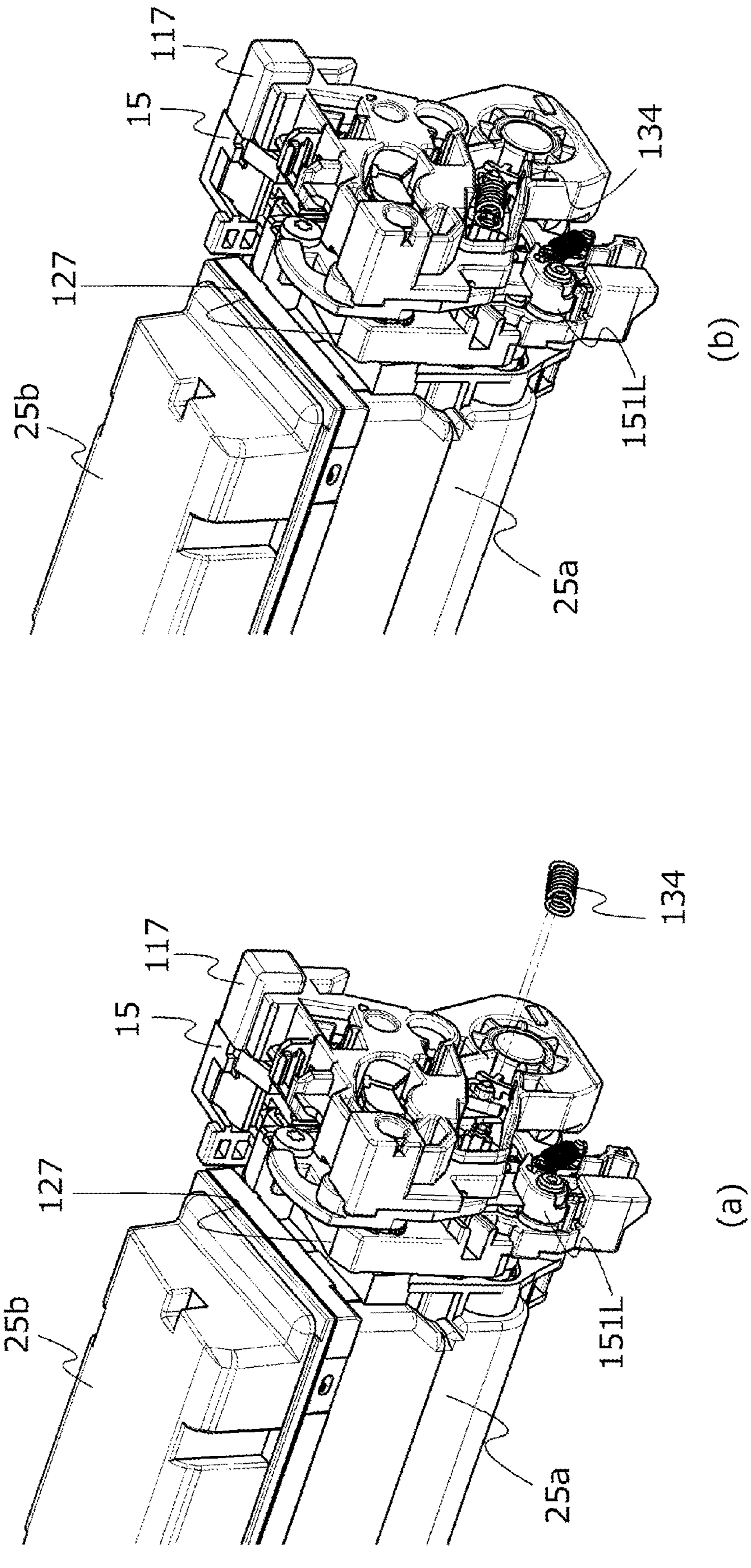
FIG. 30 is assembly perspective views after assembly of a developing pressing spring and the spacing member L in the Embodiment 1.

Referring to FIGS. 16 and 29 to 35, the assembly of the separating mechanism will be described. FIG. 30 is a perspective view of the process cartridge 100 after the separation holding member 151L is assembled, as viewed from the drive-side. As described above with FIG. 16, the developing unit 109 is supported rotatably relative to the photosensitive drum 104 about the driving axis K by fitting the outer diameter portion of the cylindrical portion 127*a* of the non-drive-side bearing 127 into the developing unit support hole 117*a* of the non-drive-side cartridge cover member 117. In addition, the non-drive-side bearing 127 is provided with a first cylindrical support portion 127*b* and a second support portion 127*e* which project in the direction of the swing axis K.

The outer diameter of the first support portion 127*b* is fitted to the inner diameter of the support receiving portion 151La of the separation holding member 151L to rotatably support the separation holding member 151L. Here, the swing center of the separation holding member 151L assembled to the non-drive-side bearing 127 is referred to as the separation holding swing axis H. The non-drive-side bearing 127 has a first retaining portion 127*c* projecting in the direction of the separation holding swing axis H. As shown in FIG. 16, the movement of the separation holding member 151L assembled to the non-drive-side bearing 127 in the direction of the spacing holding swing axis H is restricted by the contact of the first retaining portion 127*c* with the separation holding member 151L.

Further, the outer diameter of the second support portion 127*e* is fitted to the inner wall of the oblong support receiving portion 152La of the force applying member 152L to support the force applying member 152L rotatably and movably in the oblong direction. Here, the swing center of the force applying member 152L assembled to the non-drive-side bearing 127 is referred to as the force applying member swing axis HC. As shown in FIG. 16, the movement of the force applying member 152L assembled to the non-drive-side bearing 127 in the direction of the force applying member swing axis HE is restricted by the contact of the second retainer 127*f* with the separation holding member 151L.

Figure 31:
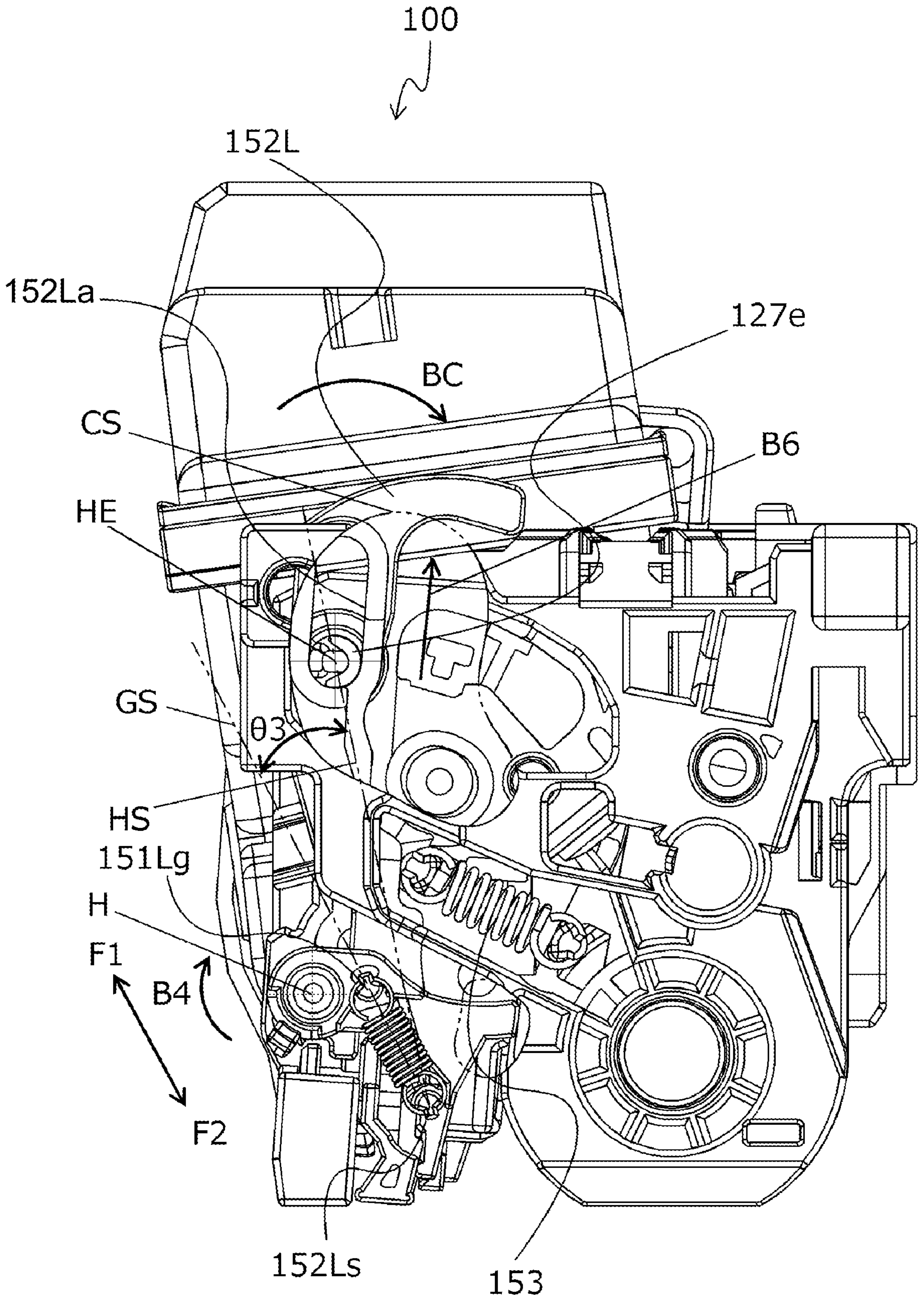
FIG. 31 is a partial cross-sectional view after assembly of the spacing member L in Embodiment 1.

FIG. 31 is a view of the process cartridge 100 after the assembly of the separation holding member 151L as viewed in the separation holding swing axis (H) direction. It is a sectional view in which a part of the non-drive-side cartridge cover member 117 is partially cut out along a partial cross-sectional line CS so that the fitting portion between the oblong support receiving portion 151La of the force applying member 152L and the cylindrical portion 127*e* of the non-drive-side bearing 127 can be seen. Here, the non-drive-side separation and contact mechanism 150L is provided with a tension spring 153 as an urging means for urging the separation holding member 151L to rotate in the direction of arrow B1 about the separation holding swing axis H and for urging the force applying member 152L in the direction of arrow B3. The arrow B3 direction is substantially parallel to the longitudinal direction LH2 direction (see FIG. 29) of the oblong support receiving portion 152La of the force applying member 152L. The tension spring 153 is stretched between a spring hooked portion 151Lg provided on the separation holding member 151L and a spring hooked portion 152Ls provided on the force applying member 152L. The tension spring 153 applies force in the direction of arrow F2 in FIG. 31 to the spring hooked portion 151Lg of the separation holding member 151L, thereby applying an urging force to rotate the separation holding member in the direction of arrow B1. In addition, the tension spring 153 applies a force, in the arrow F1 direction, to the spring hooked portion 152Ls of the force applying member 152L, thereby applying an urging force to move the force applying member 152L in the arrow B3 direction.

An angle formed between a line GS connecting the spring hooked portion 151Lg of the separation holding member 151L and the spring hooked portion 152Ls of the force holding member 152L, and a line HS connecting the spring hooked portion 152Ls of the force applying member 152L and the force applying member swing axis HE is selected so as to satisfy the following formula (3), with the counter-clockwise direction about the spring hooked portion 152Ls of the force applying member 152L being the positive direction. By this, the force applying member 152L is urged to rotate in the BA direction in the about the force applying member swing axis HE as the center of rotation.

$$0° \leq θ3 \leq 90° \quad (3).$$

In this embodiment, the separation holding member 151L and force applying member 152L are mounted on the side (outside in the longitudinal direction) of the non-drive-side bearing 127 on which the non-drive-side cartridge cover member 117 is disposed in the direction of the swing axis K as shown in FIG. 29. However, the position is not limited to such an example, and they may be disposed on the developing unit frame (125) side (inner side in longitudinal direction) of the non-drive-side bearing 127, or the separation holding member 151L and the force applying member 152L may be disposed with the non-drive-side bearing 127 interposed therebetween. In addition, the arrangement order of the separation holding member 151L and the force applying member 152L may be exchanged. The non-drive-side bearing 127 is fixed to the developing unit frame 125 to form the developing unit 109. The fixing method in this embodiment uses fixing screws 145 and an adhesive agent (not shown) as shown in FIG. 16, but the fixing method is not limited to such an example, and another connecting method is satisfactory, such as heat welding, resin material.

Figure 32:
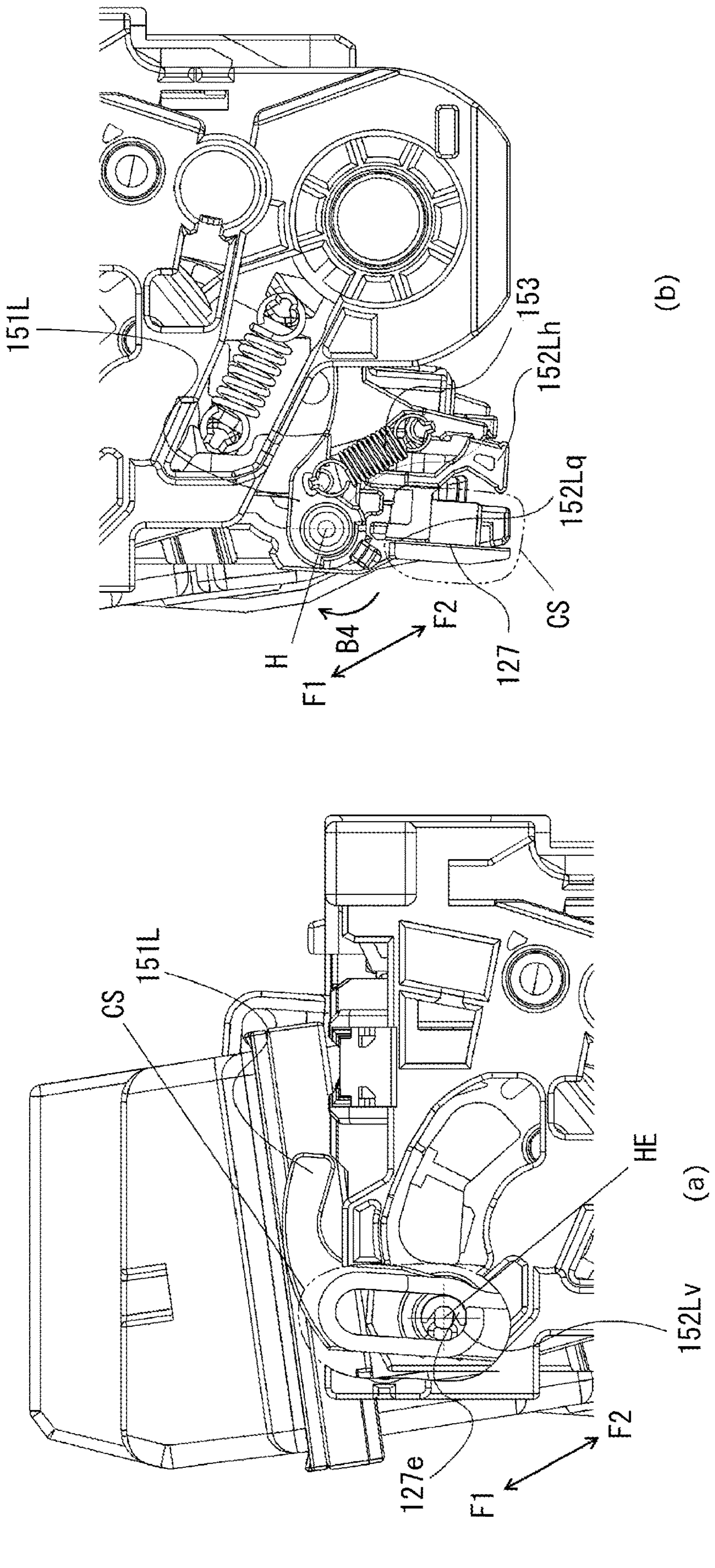
FIG. 32 is enlarged views of a periphery of the separation holding member L and the force applying member L in the Embodiment 1.

Here, part (a) of FIG. 32 and part (b) of FIG. 32 are views in which the force applying member pivot shaft HE and the separation holding member 151L in FIG. 31 are enlarged, and the non-drive-side cartridge cover member 117 and the a tension spring 153 and the separation holding member 151L are partially cut out along a sectional line CS for better illustration. The force applying member 152L brings the first retracted restricting surface 152Lv of the force applying member 152L in to contact with the second support portion 127*e* of the non-drive-side bearing 127, by the urging force of the tension spring 153 in the direction of the arrow F1. In addition, as shown in part (b) of FIG. 32, the first pressing surface 152Lq of the force applying member 152L contacts the first pressed surface 127*h* of the non-drive-side bearing 127 and is positioned. This position is referred to as a retracted position (reference position) of the force applying member 152L. Further, the separation holding member 151L is rotated in the arrow B1 direction about the separation holding swing axis H by the urging force of the tension spring 153 in the arrow F2 direction, and it is positioned by the contact surface 151Lp of the separation holding member 151L contacting the second pressing surface 152Lr of the force applying member 152L. This position is referred to as the separation holding position (restriction position) of the separation holding member 151L. When the force applying member 152L moves to the projecting position which will be described hereinafter, the second pressed surface 151Le of the force applying member 151L comes into contact with the second pressing surface 152Lr of the force applying member 152L, so that the force applying member 152L can be positioned at the separation holding position.

Figure 33:
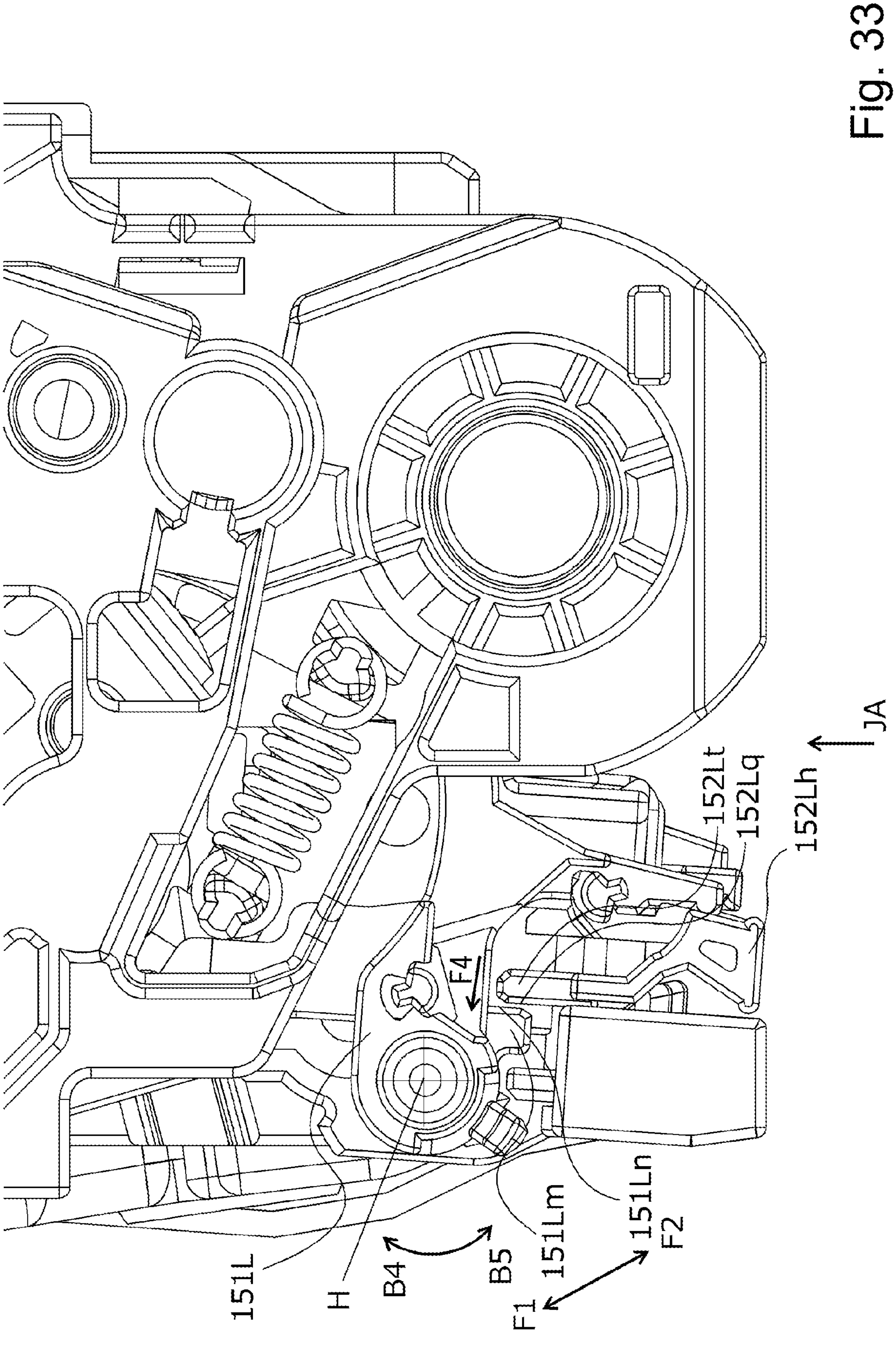
FIG. 33 is an enlarged view of the periphery of the spacing member in Embodiment 1.

FIG. 33 is an enlarged view of the separation holding member 151L and the surroundings thereof in FIG. 31, omitting the tension spring 153, for better illustration. It is assumed that the process cartridge 100 including the non-drive-side separation and contact mechanism 150L is dropped off in the direction of arrow JA in FIG. 33 during transportation. At this time, the separation holding member 151L receives a force for rotation in the arrow B2 direction about the separation holding swing axis H by its own weight. For the reason described above, when the separation holding member 151L begins to rotate in the arrow B2 direction, the rotation preventing surface 151Ln of the separation holding member 151L contacts the locking surface 152Lu of the force applying member 152L, and the separation holding member 151L receives a force in the direction of the arrow F4 for suppressing rotation in the arrow B2 direction. By this, it is possible to constrain the separation holding member 151L from rotating in the direction of the arrow B2 during transportation, thereby preventing impairment of the separation state between the photosensitive drum 104 and the developing unit 109.

In this embodiment, the tension spring 153 is used as the urging means for urging the separation holding member 151L to the separation holding position and the force applying member 152L to the retracted position, but is not limited to such an example. For example, a torsion coil spring, a leaf spring, or the like may be used as urging means to urge the force applying member 152L to the retracted position and the separation holding member 151L to the separation holding position. The material of the urging means may be metal, mold, or the like, as long as it has elasticity and can urge the separation holding member 151L and the force applying member 152L.

As described above, the developing unit 109 provided with the non-drive-side separation and contact mechanism 150L is integrally coupled with the drum unit 108 by the non-drive-side cartridge cover member 117 as described above (state of FIG. 30). As shown in FIG. 16, the non-drive-side cartridge cover 117 of this embodiment has a contact surface 117*c*. The contact surface 117*c* is a surface parallel to the swing axis K. In addition, as shown in FIGS. 16 and 30 when the non-drive-side cartridge cover member 117 is assembled to the developing unit 109 and the drum unit, the contact surface 117*c* faces the holding surface 151Lc of the separation holding member 151L positioned at the separation holding position. Here, the process cartridge 100 is provided with a developing pressure spring 134 as an urging member for bringing the developing roller 106 into contact with the photosensitive drum 104. The development pressure spring 134 is stretched between the spring hooked portion 117*e* of the non-drive-side cartridge cover member 117 and the spring hooked portion 127*k* of the non-drive-side bearing 127. By the urging force of the developing pressure spring 134, the separation holding surface 151Lc of the separation holding member 151L and the contact surface 117*c* of the non-drive-side cartridge cover member 117 contact with each other. Then, when the contact surface 117*c* and the separation holding surface 151Lc contact each other, the attitude of the developing unit 109 is determined such that the developing roller 106 of the developing unit 109 and the photosensitive drum 104 are spaced from each other by the gap P1. Thus, the state where the developing roller 106 is spaced from the photosensitive drum 104 by the gap P1 by the separation holding member 151L is referred to as a spaced position (retracted position) of the developing unit 109 (see part (a) of FIG. 34).

Figure 34:
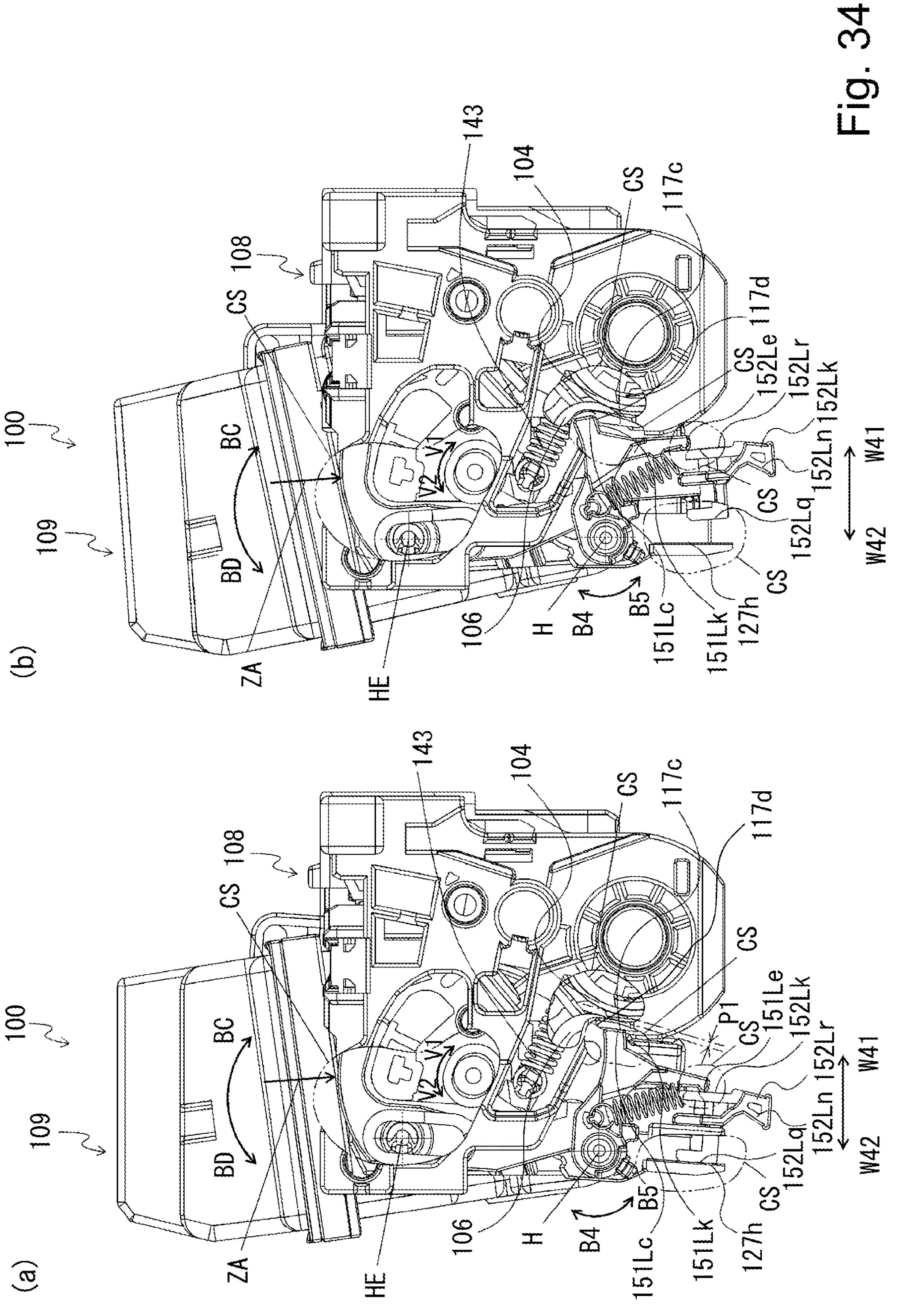
FIG. 34 is side views of the drive-side of the process cartridge of Embodiment 1 in the state of being mounted in the apparatus main assembly.

Referring to FIG. 34, The separated state and contact state of the process cartridge 100 will be described in detail. FIG. 34 is a side view of the process cartridge 100 mounted inside the image forming apparatus main assembly 170 as viewed from the non-drive-side. Part (a) of FIG. 34 shows a state in which the developing unit 109 is spaced from the photosensitive drum 104. FIG. 34B shows a state in which the developing unit 109 is in contact with the photosensitive drum 104.

First, in a state in which the separation holding member 151L is positioned at the separation holding position and the developing unit 109 is positioned at the separation position, by the pushed portion 152Le of the force applying member 152L being pushed in the direction of the arrow ZA, the projection 152Lh of the force applying member 152L projects from the process cartridge 100 (state shown in part (a) of FIG. 34). This position is referred to as the projecting position of the force applying member 152L. The second pressed surface 151Le of the separation holding member 151L is in contact with the second pressing surface 152Lr of the force applying member 152L by the tension spring 153 as described above. Therefore, when the second force receiving portion 152Ln is pressed in the direction of arrow W42, the force applying member 152L rotates in the direction of arrow BD about the force applying member swing axis HE to rotate the separation holding member 151L in the direction of arrow B5. When the separation holding member 151L rotates in the arrow B5 direction, the separation holding surface 151Lc is separated from the contact surface 117*c*, and the developing unit 109 becomes rotatable in the arrow V2 direction about the swing axis K from the separation position. That is, the developing unit 109 rotates in the V2 direction from the separated position, so that the developing roller 106 of the developing unit 109 comes into contact with the photosensitive drum 104. Here, the position of the developing unit 109 in which the developing roller 106 and the photosensitive drum 104 are in contact with each other is referred to as a contact position (developing position) (state shown in part (b) of FIG. 34). A position where the separation holding surface 151Lc of the separation holding member 151L is separated from the contact surface 117*c* is referred to as a separation release position (permitting position). When the developing unit 109 is positioned at the contact position, the second restricted surface 151Lk of the separation holding member 151L contacts the second regulating surface 117*d* of the drive-side cartridge cover member 116, thereby maintaining the separation holding member 151L in the separation release position.

In addition, the non-drive-side bearing 127 of this embodiment has a first pressed surface 127*h* which is a surface perpendicular to the swing axis K. The non-drive-side bearing 127 is fixed to the developing unit 109, and therefore, when the first force receiving portion 152Lk of the force applying member 152L is pressed in the direction of the arrow 41 while the developing unit 109 is in the contact position, the first pressing surface 152Lq is brought into contact with the first pressed surface 127*h*, so that the developing unit 109 rotates in the direction of the arrow V1 about the swing axis K and moves to the separated position (state in part (a) of FIG. 34). Here, the direction in which the first pressed surface 127*h* moves when the developing unit

109 moves from the contact position to the spaced position is indicated by an arrow W41 in part (a) of FIG. 34 and part (b) of FIG. 34. The direction opposite to the arrow W41 is the arrow W42 direction, and the directions of the arrows W41 and W42 are substantially horizontal directions (X1 and X2 directions). The second force receiving surface 152Lp of the force applying member 152L assembled to the developing unit 109 as described above is placed upstream of the first pressed surface 127*h* of the non-drive-side bearing 127 in the direction of the arrow W41. Further, the first pressed surface 127*h* and the second force receiving surface 151Le of the separation holding member 151L are arranged at positions by which at least parts thereof overlap with each other in the W1 and W2 directions. The operation of the non-drive-side separation and contact mechanism 150L inside the image forming apparatus main assembly 170 will be described below.

[Mounting of Process Cartridge to Image Forming Apparatus]

Figure 35:
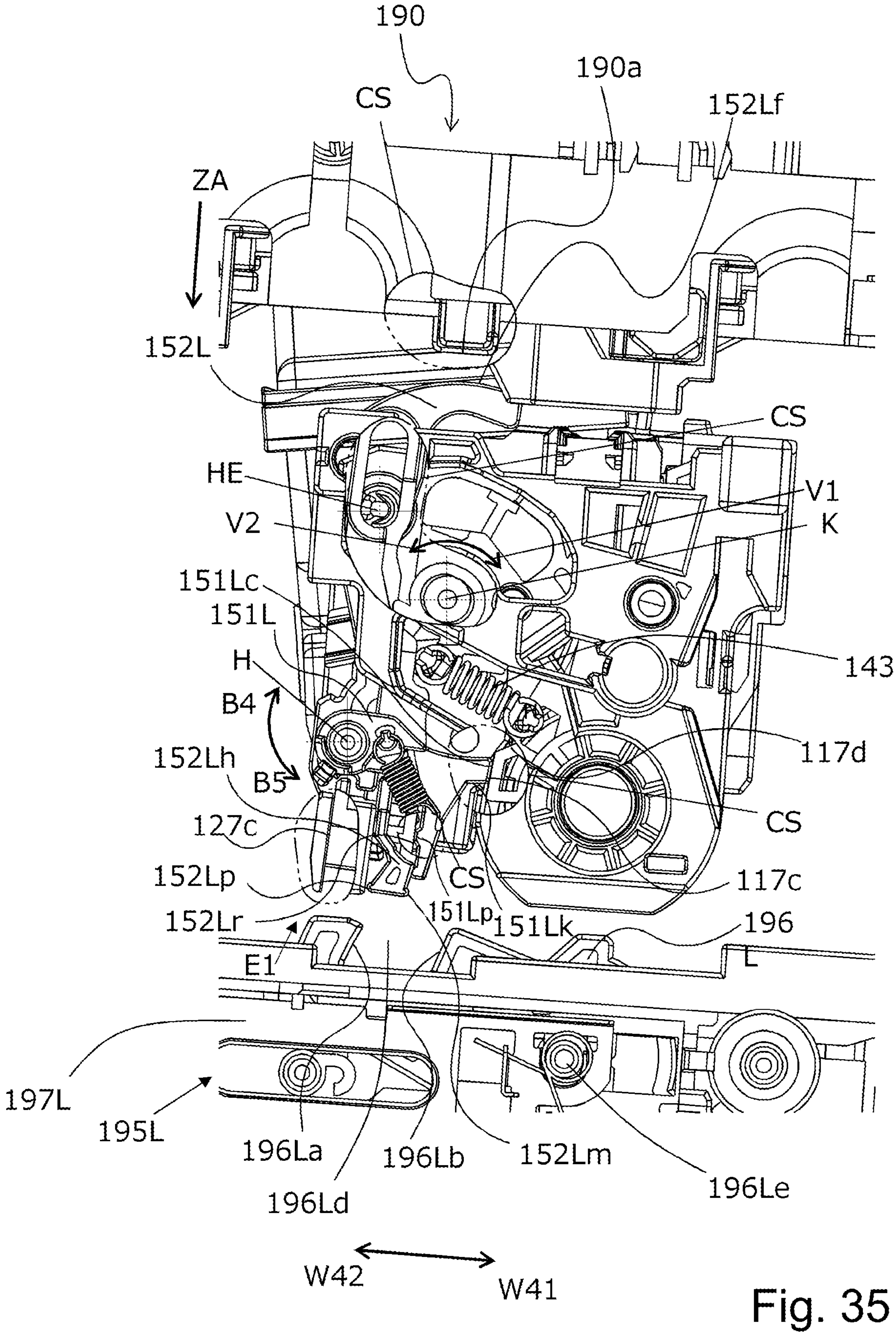
FIG. 35 is an illustration showing the process cartridge in the main assembly of the image forming apparatus according to the Embodiment 1.
Figure 36:
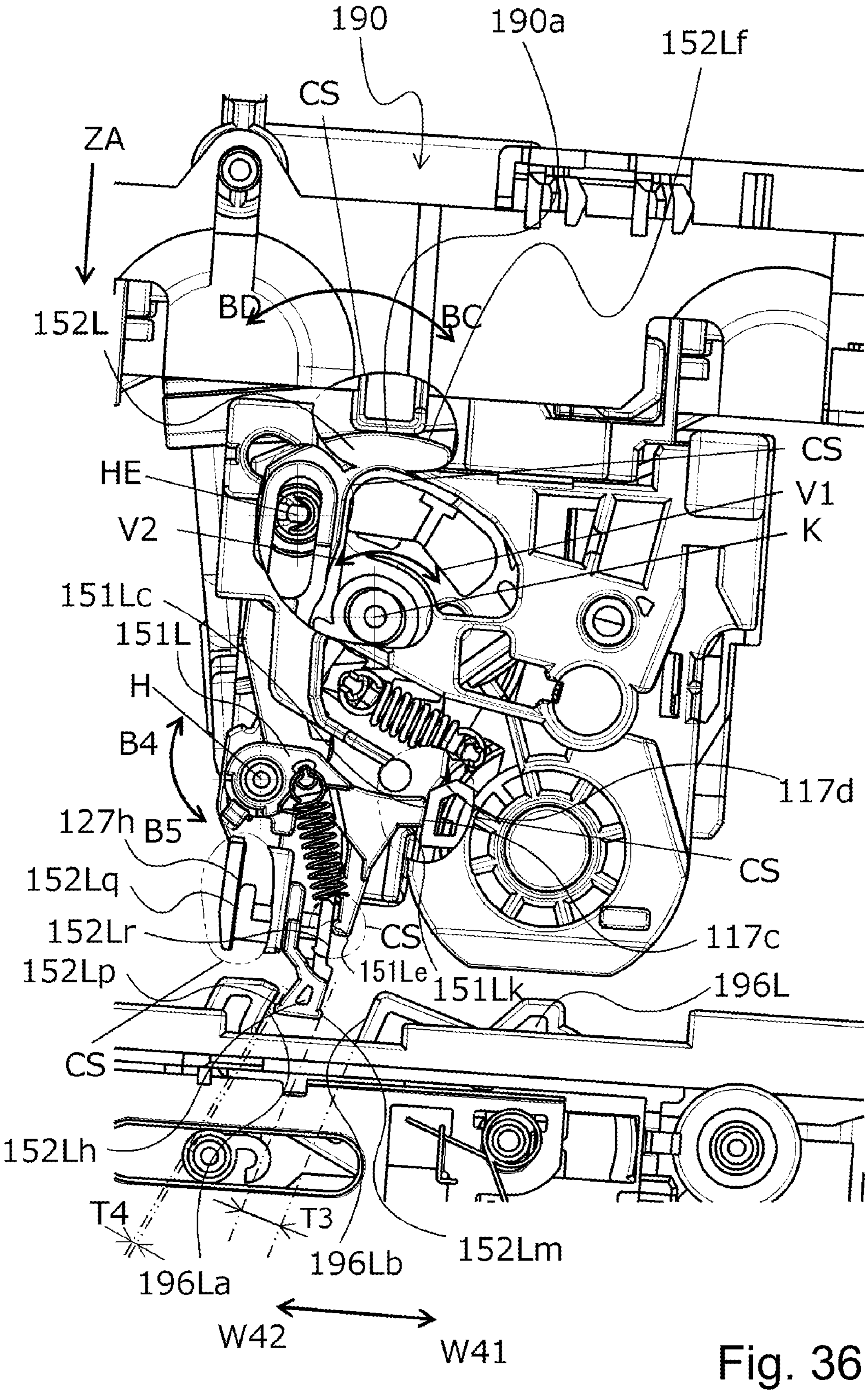
FIG. 36 is an illustration showing operation of the developing unit in the main assembly of the image forming apparatus in Embodiment 1.

Referring to FIGS. 35 and 36, engagement operation between the separation and contact mechanism 150R of the process cartridges 100Y and 100K and the development separation control unit 196 of the image forming apparatus main assembly 170 at the time when the process cartridge 100 is mounted in the image forming apparatus main assembly 170 will be described. For better illustration, these Figures are cross-sectional views in which a part of the development cover member 128 and a part of the non-drive-side cartridge cover member 117 are omitted along a partial cross-sectional line CS. FIG. 3 is a view of the process cartridge 100 as viewed from the drive-side, at the time when the process cartridge 100 is mounted on the cartridge tray 171 (not shown) of the image forming apparatus M and the cartridge tray 171 has been inserted into the first mounting position, in which the parts other than the process cartridge 100, the cartridge pressing unit 121 and the separation control member 196L are omitted.

As described above, the image forming apparatus main assembly 170 of this embodiment has the separation control members 196L corresponding to respective process cartridges 100 as described above. The separation control member 196L is disposed closer to the lower surface side of the image forming apparatus main assembly 170 than the separation holding member 151L when the process cartridge 100 is positioned at the first inner position and the second inner position. The separation control member 196L projects toward the process cartridge 100 and is provided with a first force applying surface 196La and a second force applying surface 196Lb facing each other with a space 196Rd therebetween. The first force applying surface 196Ra and the second force applying surface 196Rb are connected with each other by way of a connecting portion 196Rc on the lower surface side of the image forming apparatus main assembly 170. The separation control member 196R is supported by the control metal plate 197 rotatably about a rotation center 196Re. The separation member 196R is always urged in the E1 direction by an urging spring. In addition, the separation control member 196R is structured to be movable in the W41 and W42 directions by the control metal plate 197 which is movable in the W41 and W42 directions by a control mechanism (not shown).

As described above, in interrelation with the transition of the front door 11 of the image forming apparatus main assembly 170 from the open state to the closed state, the cartridge pressing unit 121 descends in the direction of the arrow ZA, so that the first force application portion 121*a* is brought into contact with the pushed surface 152Lf of the force applying member 152L. Thereafter, when the cartridge pressing unit 121 is lowered to the predetermined position, which is the second mounting position, the force applying member 152Lh moves to the projecting position downward in the Z2 direction of the process cartridge 100 (state shown in FIG. 36). When this operation is completed, as shown in FIG. 36, the gap T4 is formed between the first force applying surface 196La of the separation control member 196L and the first force receiving surface 152Lp of the force applying member 152L, and the gap T3 is formed between the second force applying surface 196Lb and the second force receiving surface 152Lp. Then, it is positioned at the second mounting position where the separation control member 196L does not act on the force applying member 152L. This position of the separation control member 196L is referred to as a home position. At this time, the first force receiving surface 152Lp of the force applying member 152L and the first force applying surface 196La of the separation control member 196L are arranged so as to partially overlap in the W1 and W2 directions. Similarly, the second force receiving surface 152Lp of the force applying member 152L and the second force applying surface 196Lb of the separation control member 196L are arranged so as to partially overlap in the W1 and W2 directions.

[Contacting Operation of Developing Unit]

Figure 37:
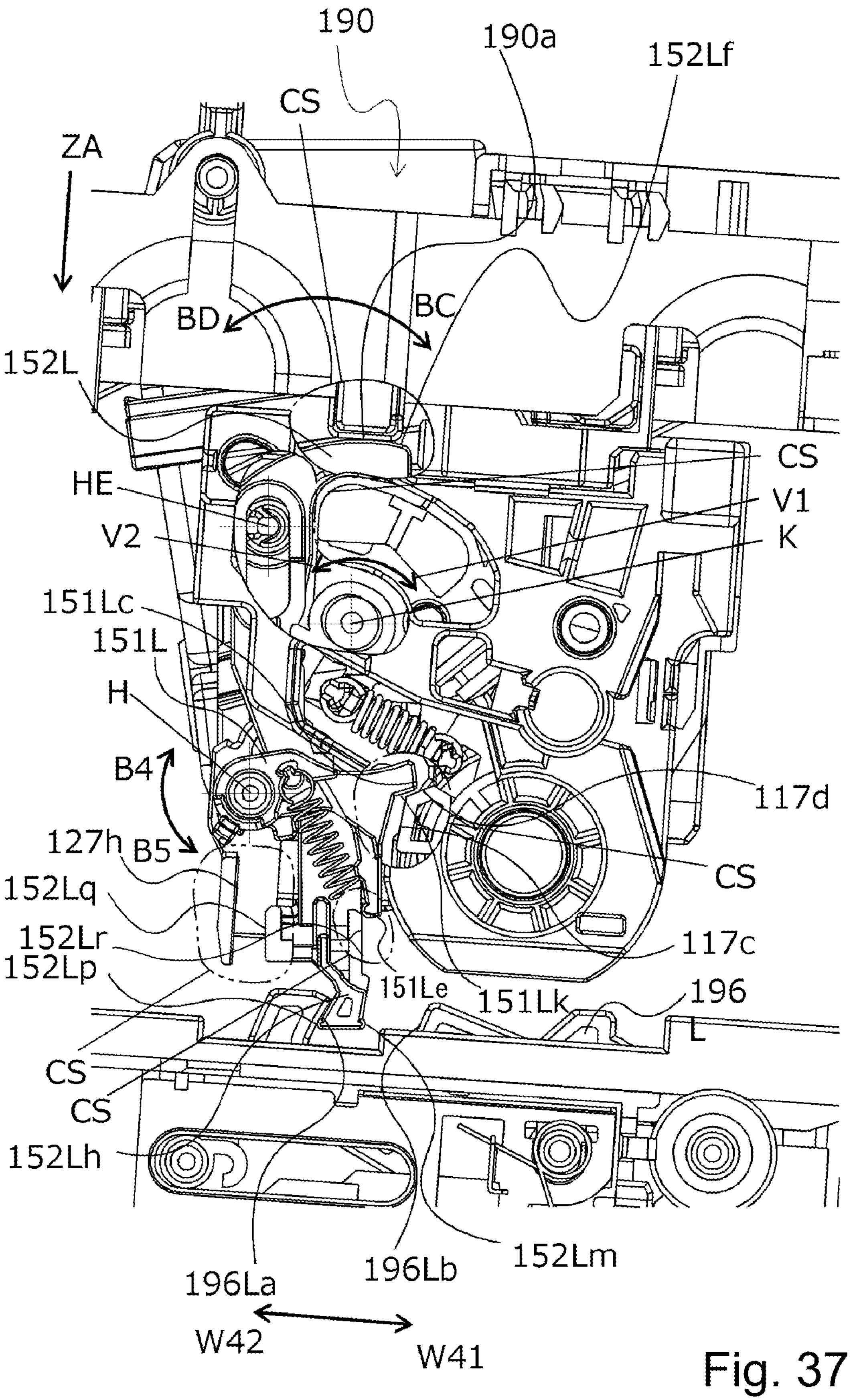
FIG. 37 is an illustration showing the operation of the developing unit in the main assembly of the image forming apparatus in Embodiment 1.
Figure 38:
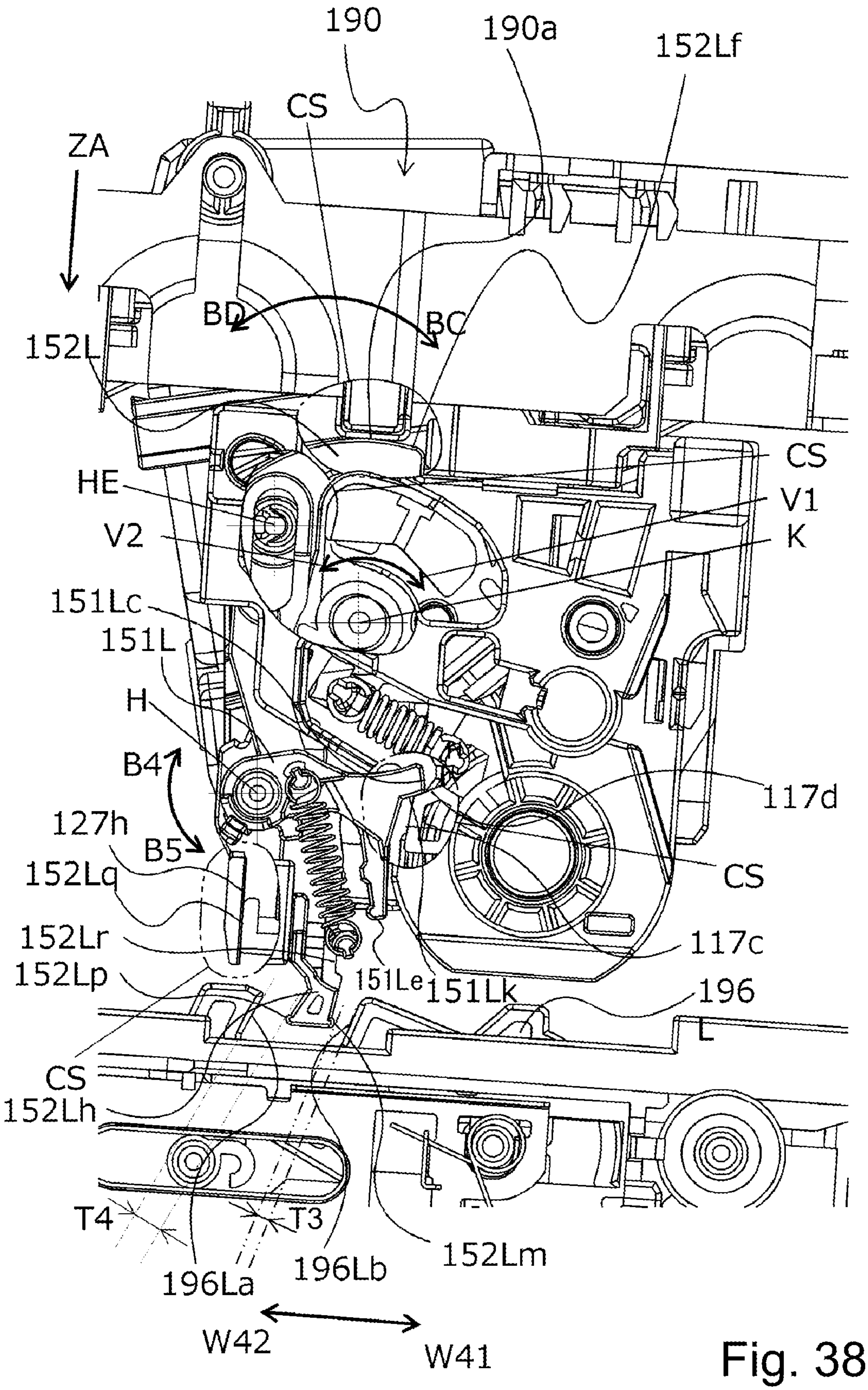
FIG. 38 is an illustration showing the operation of the developing unit in the main assembly of the image forming apparatus in Embodiment 1.

FIGS. 36 to 38, the operation of contact between the photosensitive drum 104 and the developing roller 106 by the non-drive-side separation and contact mechanism 150L will be described in detail. These Figures are sectional views, in which, a part of the development cover member 128, a part of the non-drive-side cartridge cover member 117, and a part of the non-drive-side bearing 127 are omitted along a partial cross-sectional line CS, for the sake of better illustration.

As described above, the development input coupling 32 receives a driving force from the image forming apparatus main assembly 170 in the direction of the arrow V2 in FIG. 24. That is, the developing unit 109 provided with the development input coupling 32 receives torque in the direction of the arrow V2 from the image forming apparatus main assembly 170 about the swing axis K. Further, the developing unit 109 is urged also in the direction of the arrow V2 by the urging force of the developing pressure spring 134 described above. As shown in FIG. 36, when the developing unit 109 is in the separated position and the separation holding member 151L is in the separation holding position, even if the developing unit 109 receives this torque and the urging force of the developing pressure spring 134, the holding surface 151Lc of the separation holding member 151L contacts the contact surface 117*c* of the non-drive-side cartridge cover member 117, so that the attitude of the developing unit 109 is maintained at the separated position (state shown in FIG. 36).

The separation control member 196L of this embodiment is structured to be movable in the direction of arrow W41 in FIG. 36 from the home position. When the separation control member 196L moves in the W41 direction, the second force applying surface 196Lb of the separation control member 196L and the second force receiving surface 152Lp of the force applying member 152L come into contact with each other, so that the force applying member 152L is rotated in the direction of BD about the force applying member swing axis HD. Further, as the force applying member 152L rotates, the separation holding member 151L is rotated in the B5 direction, while the second pressing surface 152Lr of the force applying member 152L is in contact with the second pressed surface 151Le of the separation holding member 151L. Then, the separation holding member 151L is rotated by the force applying member 152L to the separation release position where the separation holding surface 151Lc and the contact surface 117*c* are separated from each other. Here, the position of the separation control member 196L where the separation holding member 151L is moved to the separation release position shown in FIG. 37 is referred to as the first position.

When the separation holding member 151L is moved to the separation release position by the separation control member 196L, the developing unit 109 is rotated in the direction V2 by the torque received from the image forming apparatus main assembly 170 and the urging force of the developing pressure spring 134 to the contact position (state in FIG. 37) where the developing roller 106 and the photosensitive drum 104 contacts each other. At this time, the separation holding member 151L, which is urged in the arrow B4 direction by the tension spring 153, is maintained in the separation release position by the contact of the second restricted surface 151Lk with the second regulating surface 117*d* of the non-drive-side cartridge cover member 117. Thereafter, the separation control member 196L moves in the W42 direction and returns to the home position. At this time, the force applying member 152L is rotated in the BC direction by the tension spring 153, and the state shifts to a state in which the first pressing surface 152Lq of the force applying member 152L is in contact with the first pressed surface 127*h* of the non-drive-side bearing 127 (state of FIG. 38). By this, the above-described gaps T3 and T4 are formed again, and the separation control member 196L is in the position where it does not act on the force applying member 152L. The transition from the state shown in FIG. 37 to the state shown in FIG. 38 is performed immediately. The position of the separation control member 196L in FIG. 38 is the same as in FIG. 36.

As described above, in the structure of this embodiment, the separation control member 196L is moved from the home position to the first position, thereby rotating the force applying member 152L and moving the separation holding member 151L from the separation holding position to the separation release position. This makes it possible that the developing unit 109 to move from the separated position to the contact position where the developing roller 106 and the photosensitive drum 104 contact each other.

[Separating Operation of Developing Unit]

Figure 39:
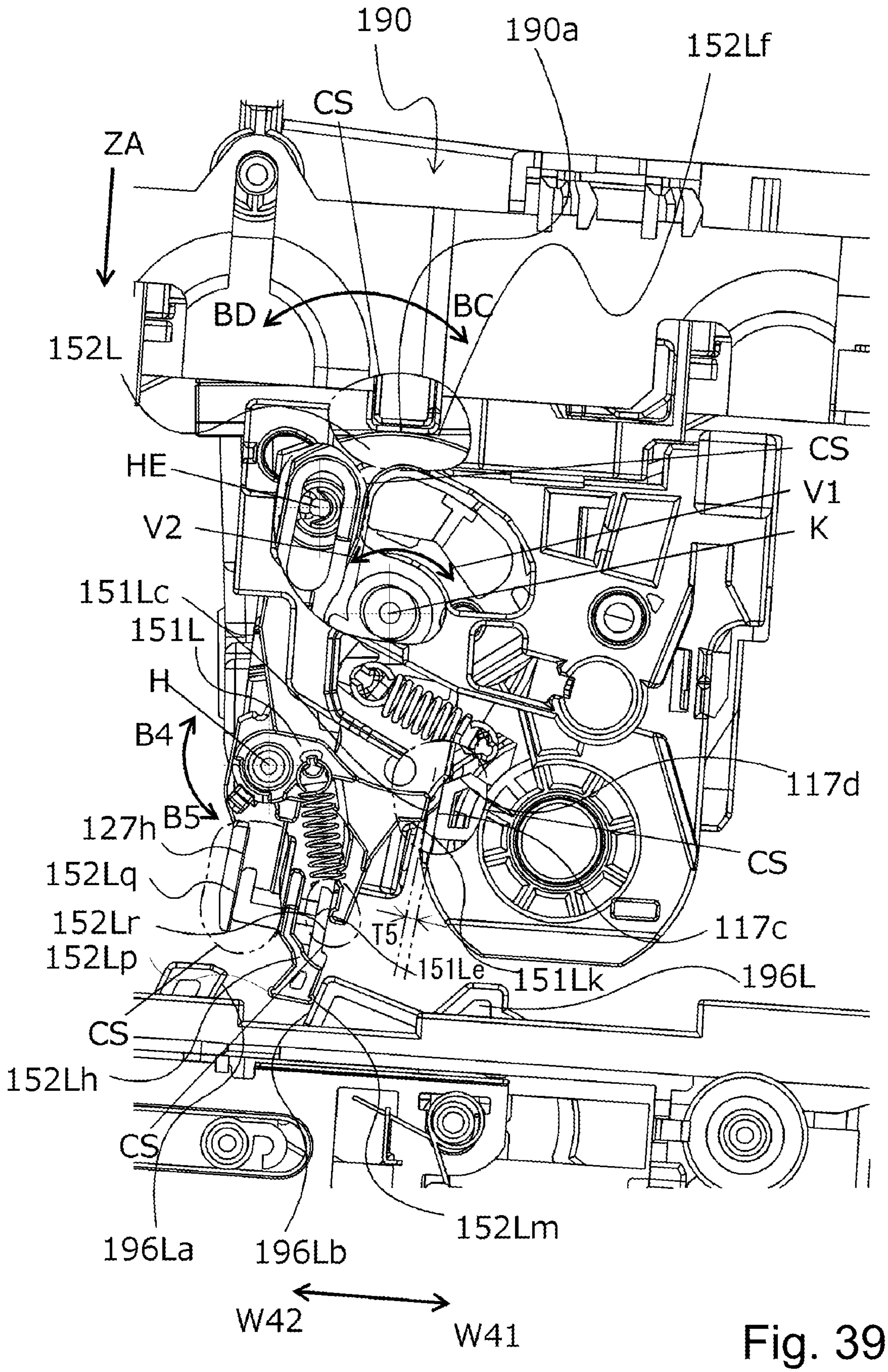
FIG. 39 is an illustration showing the operation of the developing unit in the main assembly of the image forming apparatus in Embodiment 1.

Referring to FIGS. 38 and 39, the movement of the developing unit 109 from the contact position to the separation position will be described in detail. FIG. 39 is a cross-sectional view in which, for the sake of better illustration, a part of the development cover member 128, a part of the non-drive-side cartridge cover member 117, and a part of the non-drive-side bearing 127 are omitted along a partial cross-sectional line CS.

The separation control member 196L in this embodiment is structured to be movable in the direction of arrow W42 in FIG. 38 from the home position. When the separation control member 196L moves in the W42 direction, the second force applying surface 196Lb and the first force receiving surface 152Lm of the force applying member 152L come into contact with each other, so that the force applying member 152L rotates about the arrow BC around the force applying member swing axis HD. Since the first pressing surface 152Lq of the force applying member 152L is in contact with the first pressed surface 127*h* of the non-drive-side bearing 127, the developing unit 109 rotates from the contact position in the direction of the arrow V1 about the pivot axis K (state in FIG. 39). At this time, the pushed surface 152Lf of the force applying member 152L has the arc shape, and the center of the arc is aligned with the swing axis K. By this, when the developing unit 109 moves from the contact position to the separated position, the force received by the pushed surface 152Lf of the force applying member 152L from the cartridge pressing unit 121 is directed in the direction of the swing axis K, the operation is not hindered in the rotation of the developing unit 109 in the direction of arrow V1. As regards the separation holding member 151L, the second restricted surface 151Lk of the separation holding member 151L and the second regulating surface 117*d* of the non-drive-side cartridge cover member 117 are separated from each other, so that the separation holding member 151L is rotated in the arrow B4 direction by the urging force of the tension spring 153. By this, the separation holding member 151L rotates until the second pressed surface 151Le comes into contact with the second pressing surface 152LR of the force applying member 152L, and by the contact, it moves to the separation holding position. When the developing unit 109 is moved by the separation control member 196L from the contact position toward the separation position and the separation holding member 151L is placed at the separation holding position a gap T5 is formed between the separation holding surface 151Lc and the contact surface 117*c* as shown in FIG. 39. Here, the position at which the separation holding member 151 can move to the separation holding position by rotating the developing unit 109 from the contact position toward the separation position is referred to as a second position of the separation control member 196L.

Thereafter, when the separation control member 196L moves in the direction of the arrow W41 and returns from the second position to the home position, the developing unit 109 rotates, while the separation holding member 151L is maintained at the separation holding position, in the direction of arrow V2 by the torque received from the image forming apparatus main assembly 170 and the urging force of the development pressure spring 134, so that the separation holding surface 151Lc and the contact surface 117*c* are brought into contact with each other. In other words, the developing unit 109 is maintained at the separated position by the separation holding member 151L, and the developing roller 106 and the photosensitive drum 104 are spaced by the gap P1 (the state shown in FIG. 36 and part (a) of FIG. 34). By this, the above-described gaps T3 and T4 are formed again, and the separation control member 196L is positioned at a position where it does not act on the force applying member 152L (state shown in FIG. 36). The transition from the state of FIG. 39 to the state of FIG. 36 is carried out immediately.

As described above, in the structure of this embodiment, the movement of the separation control member 196L from the home position to the second position, the separation holding member 151L is moved from the separation release position to the separation holding position. By the separation control member 196L returning from the second position to the home position, the developing unit 109 becomes in the state of being maintained at the separation position by the separation holding member 151L.

So far, the operations of the separation mechanisms provided on the drive-side of the process cartridges 100Y and 100K and the operations of the separation mechanism provided on the non-drive-side have been described separately, but in this embodiment, they operate in interrelation with each other. More particularly, when the developing unit 109 is placed at the separated position by the separation holding member 151R, the developing unit 109 is placed at the separation position by the separation holding member 151L at substantially the same time, and the same applies to the contact position. Specifically, the separation control member 121R and the separation control member 121L described in FIGS. 23 to 27 and 35 to 39 are integrally moved by a coupling mechanism (not shown). By this, the timing at which the separation holding member 151R of the drive-side is positioned at the separation holding position is substantially the same as the timing at which, the separation holding member 151L of the non-drive-side is positioned at the separation holding position, and timing at which the separation holding member 151R is positioned at the separation release position is substantially the same as the timing at which the separation holding member 151L is positioned at the separation release position. These timings may differ between the drive-side and the non-drive-side, but it is desirable that at least the timings of placing at the separation release position are the same in order to save the time elapse from the start of the printing job by the user to the output of the print. In this embodiment, the separation member swinging axes H of the separation holding member 151R and the separation holding member 151L are coaxial with each other, but this is not inevitable, and it will suffice if the timings of positioning at the separation release position are substantially the same. Similarly, the force applying member swing axis HC of the force applying member 152R and the force applying member swing axis HE of the force applying member 152L do not coincide with each other, but this is not inevitable, and it will suffice if the timings of positioning at the separation release position are substantially the same, as described above.

As described above, the drive-side and the non-drive-side have the same separation and contact mechanisms, and they operate substantially simultaneously, by which even if the process cartridge 100 is twisted or deformed in the longitudinal direction, variations in the amount of spacing along the longitudinal direction can be suppressed because the amount of spacing between the photosensitive drum 104 and developing roller 106 can be controlled at both ends in the longitudinal direction.

Further, according to this embodiment, by moving the separation control member 196R (L) between the home position, the first position, and the second position in one direction (directions of arrows W41 and W42), the contact state and spaced state between the developing roller 106 and the photosensitive drum 104 can be controlled. Therefore, it is possible to keep the developing roller 106 in contact with the photosensitive drum 104 only when image forming operation is performed, and keep the developing roller 106 spaced from the photosensitive drum 104 when image forming operation is not performed. Therefore, even if the image forming apparatus is left for a long period of time without image formation, the developing roller 106 and the photosensitive drum 104 are not deformed, and stable image formation can be performed.

Further, according to this embodiment, the force applying member 152R(L) which acts on the separation holding member 151R(L) to rotate and move can be positioned at the retracted position by the urging force of the tension spring 153 or the like. Therefore, when the process cartridge 100 is outside the image forming apparatus main assembly 170, the process cartridge 100 does have a part projecting from the outermost shape of the body, and therefore, the size of the process cartridge 100 can be reduced.

Similarly, the force applying member 152R(L) can be positioned at the retracted position by the urging force of the tension spring 153 or the like, and therefore, when the process cartridge 100 is mounted to the main assembly 170 of the image forming apparatus, the mounting operation can be completed by moving it in only direction. Therefore, it is not necessary to move the process cartridge 100 (tray 171) vertically. Therefore, the size of the image forming apparatus main assembly 170 can be reduced without requiring additional space.

Further, according to this embodiment, when the separation control member 196R(L) is positioned at the home position, no load is applied from the process cartridge 100 to the separation control member 196R(L). For this reason, the rigidity required for the separation control member 196R(L) and the mechanism for operating the separation control member 196R(L) can be reduced, and the size can be reduced. In addition, the load on the sliding portion of the mechanism for operating the separation control member 196R(L) is also reduced, and therefore, it is possible to suppress the wear of the sliding portion and the generation of abnormal noise.

Furthermore, according to this embodiment, the developing unit 109 can maintain the separated position only by the separation holding member 151R(L) of the process cartridge 100. Therefore, by reducing the number of parts which causes variation in the amount of spacing between the developing roller 106 and the photosensitive drum 104, the tolerance of parts can be eased and the amount of separation can be minimized. Since the amount of separation can be reduced, in the image forming apparatus main assembly 170, the area occupied by the developing unit 109 when the developing unit 109 moves between the contact position and the separated position becomes smaller, and the image forming apparatus can be downsized correspondingly. In addition, since the space for the developer container 29 of the developing unit 109 which moves between the contact position and the separated position can be increased, it is possible to place a compact and large capacity process cartridge 100 in the image forming apparatus main assembly 170.

Further, according to this embodiment, the force applying member 152R(L) can be positioned at the retracted position when the process cartridge 100 is mounted, and the developing unit 109 can be maintained at the separated position only by the separation holding member 151R(L) of the process cartridge 100. Therefore, when the process cartridge 100 is mounted to the image forming apparatus main assembly 170, the mounting operation can be completed by moving the process cartridge 100 in only one direction. Therefore, it is not necessary to move the process cartridge 100 (tray 171) vertically. Therefore, the size of the image forming apparatus main assembly 170 can be reduced without requiring additional space. In addition, since the spacing amount can be reduced, when the process cartridge 100 is placed in the image forming apparatus main assembly 170, the area occupied by the developing unit 109 when the developing unit 109 moves between the contact position and the spaced position becomes smaller, the size of the image forming apparatus can be reduced. In addition, since the space for the developer container 29 of the developing unit 109 which moves between the contact position and the separated position can be increased, it is possible to place a compact and large-capacity process cartridge 100 in the image forming apparatus main assembly 170.

[Details of Layout of Separation and Contact Mechanism]

Figure 40:
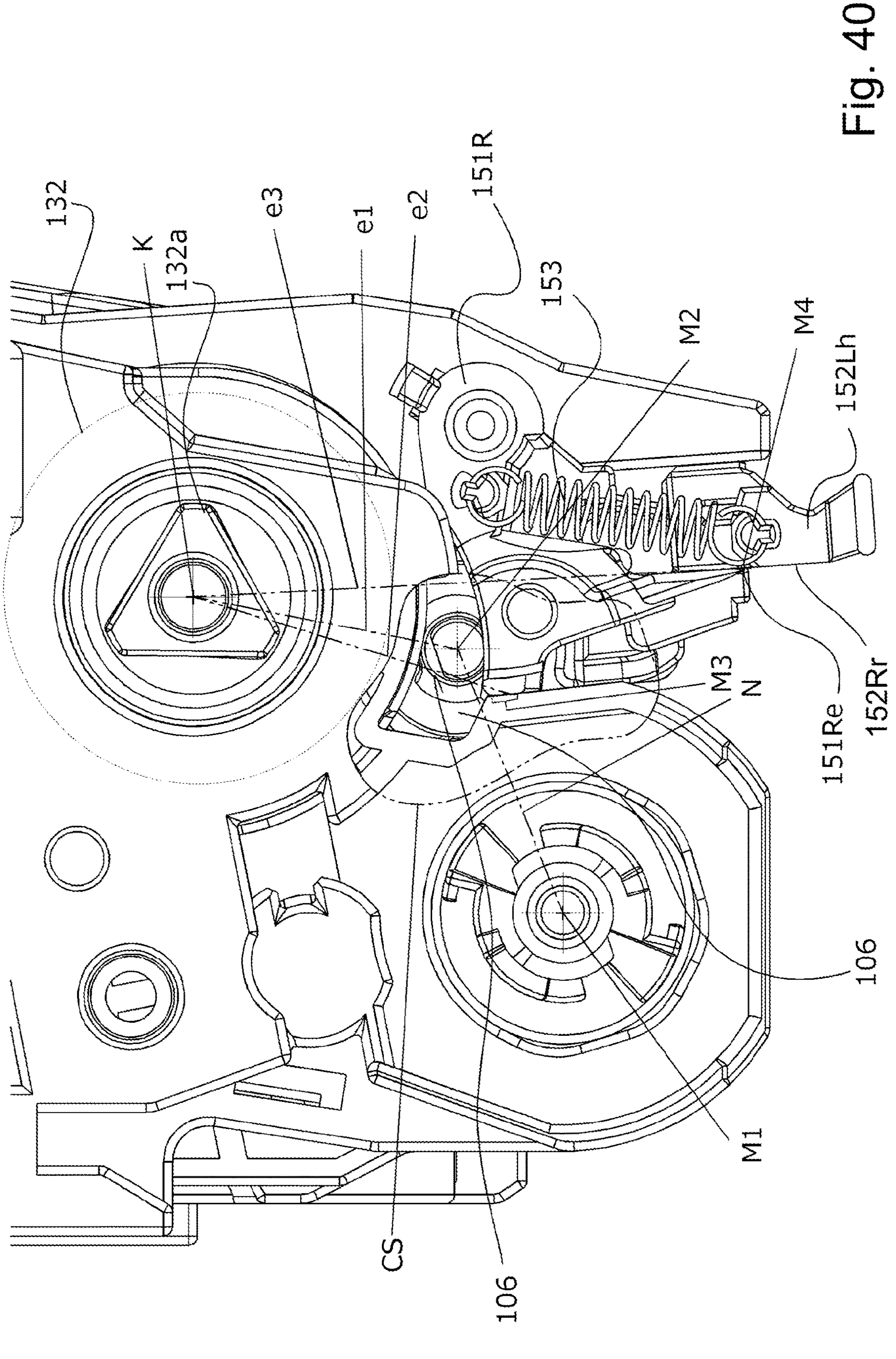
FIG. 40 is an illustration showing the arrangement of the separation holding member R and the force applying member in the Embodiment 1.
Figure 41:
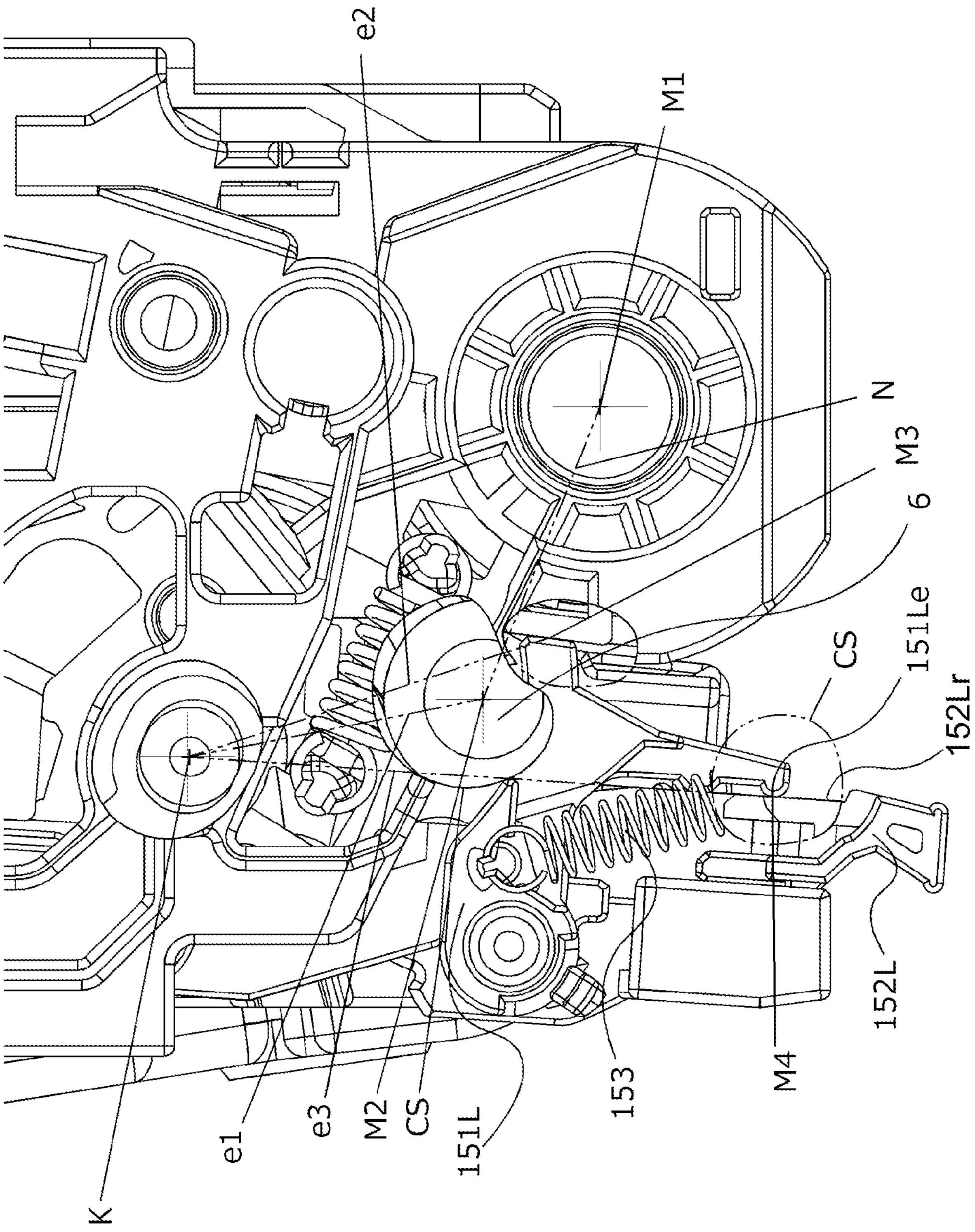
FIG. 41 is an illustration showing the arrangement of the separation holding member and the force applying member in Embodiment 1.

Referring to FIGS. 40 and 41, the arrangement of the separation and contact mechanisms R and L in this embodiment will be described in detail. FIG. 40 is an enlarged view of the separation holding member 151R and the surroundings thereof when the process cartridge 100Y is viewed from the drive-side along the swing axis K (photosensitive drum axial direction) of the developing unit 109. In addition, it is a cross-sectional view in which a part of the development cover member 128 and a part of the drive-side cartridge cover member 116 are omitted along a cross-sectional line CS for better illustration. FIG. 41 is an enlarged view of the separation holding member 151R and the surroundings thereof when the process cartridge 100 is viewed from the non-drive-side along the swing axis K (photosensitive drum axis direction) of the developing unit 109. In addition, it is a cross-sectional view in which a part of the development cover member 128 and a part of the drive-side cartridge cover member 116 are omitted along a partial cross-sectional line CS for better illustration. Regarding the arrangement of the separation holding member and the force applying member described below, there is no distinction between the drive-side and the non-drive-side, except for the portion that will be described in detail hereinafter, and therefore, the description will be made only as to the drive-side.

As shown in FIG. 40, a point M1 is the rotation center of the photosensitive drum 104, a point M2 is the rotation center of the developing roller 106, and a line N is a line passing through the points M1 and M2. In addition, a contact area between the separation holding surface 151Rc of the separation holding member 151R and the contact surface 116*c* of the drive-side cartridge cover member 116 is indicated by M3, and a contact area between the second pressed surface 151Re of the separation holding member 151R and the second pressing surface 152Rr of the force applying member 152R is indicated by M4. Further, a distance between the swing axis K of the developing unit 109 and the point M2 is distance e1, a distance between the swing axis K and the area M3 is distance e2, and a distance between the swing axis K and the point M4 distance e3.

In the structure of this embodiment, the following positional relationship is satisfied when the developing unit 109 is at the separated position and the force applying member 152R(L) is at the projecting position. That is, as viewed along the axial direction of the swing axis K (the axial direction of the photosensitive drum) shown in FIG. 40, at least a part of the contact area M3 between the separation holding member 151R and the drive-side cartridge cover member is disposed in an area on the opposite side of the area where the center of the development coupling 32 (swing axis K) exists, with a line N passing through the center of the drum 104 and the center of the developing roller 106 interposed therebetween. In other words, the separation holding surface 151Rc of the separation holding member 151R is arranged such that the distance e2 is longer than the distance e1.

By arranging the separation holding member 151R and the separation holding surface 151Rc in this manner, when the position of the separation holding surface 151Rc varies due to tolerance of parts or the like, variations in the attitude of the separation position of the developing unit 109 can be suppressed. In other words, the influence of variations in the separation holding surface 151Rc on the spacing amount (gap) P1 (see part (a) of FIG. 34) between the developing roller 106 and the photosensitive drum 104 can be minimized, and the developing roller 106 can be spaced from the photosensitive drum 104 with high precision. Further, there is no need to provide an extra space for retracting the developing unit 109 when it is in the separated position, which leads to downsizing of the image forming apparatus main assembly 170.

Further, the first force receiving portion 152Rk (Lk) and the second force receiving portion 152Rn (Ln), which are the force receiving portions of the force applying member 152R (L), are disposed on the opposite side of the side in which the rotation center of the development coupling 32 is provided with the extension of the line N interposed therebetween. As described above, the force receiving portions 152Rk (Lk) and 152Rn (Ln) are arranged at the ends in the longitudinal direction. Further, as shown in FIG. 15 (FIG. 16), a cylindrical portion 128*b* (127*a*), which is a support portion for the developing unit 109, is provided at the end portion in the longitudinal direction. Therefore, by placing the force receiving portions 152Rk (Lk) and 152Rn (Ln) on the opposite side of the line N from the cylindrical portion 128*b* (127*a*) (that is, the swing axis K) of the developing unit 109, functional portions can be arranged efficiently. In other words, the size of the process cartridge 100 and the image forming apparatus M can be reduced.

In addition, the force receiving portions 152Rk, 152Rn are arranged at the longitudinal drive-side ends. Further, as shown in FIG. 15, a development drive input gear 132 which receives drive from the image forming apparatus main assembly 170 and drives the developing roller 106 is provided at the drive-side end in the longitudinal direction. As shown in FIG. 40, the force applying members 152Rk and 152Rn are arranged on the opposite side of the side in which the rotation center K of the development drive input gear 132 (development coupling portion 132*a*) indicated by the broken line is provided, with an extension of the line N interposed therebetween. With this arrangement, the functional portions can be arranged efficiently. In other words, the size of the process cartridge 100 and the image forming apparatus M can be reduced.

Further, the contact portion between the separation holding member 151R and the force applying member 152R is disposed such that the distance e3 is longer than the distance e1. By this, the separation holding member 151R and the drive-side cartridge cover member 116 can be contacted with each other with a lighter force. In other words, the spacing between the developing roller 106 and the photosensitive drum 104 can be stably performed.

[Details of Connecting Members]

Next, a detailed description will be made as to a structure in which the photosensitive drums 104 of the process cartridges 100M and 100C and the developing roller 106 of the developing unit 109 are spaced from each other and contacted with each other. As described above, the developing unit 109 of the process cartridge 100Y, the developing unit 109 of the process cartridge 100M, and the developing unit 109 of the process cartridge 100C are connected by the connecting member 201.

Figure 42:
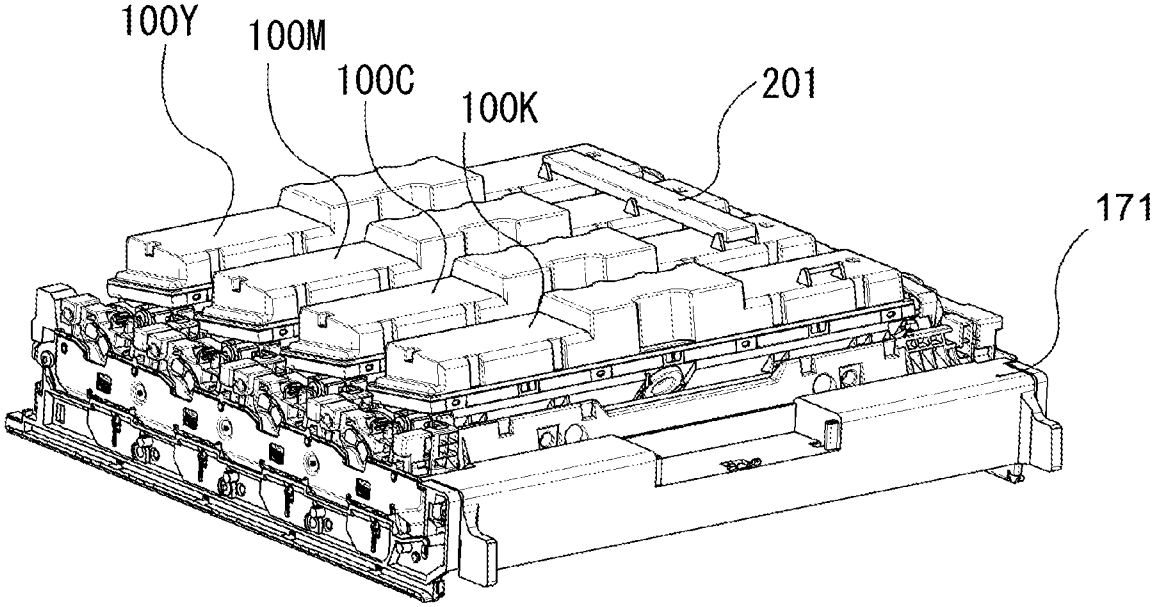
FIG. 42 is perspective views of the process cartridge and tray with the front door closed in Embodiment 1.
Figure 42:
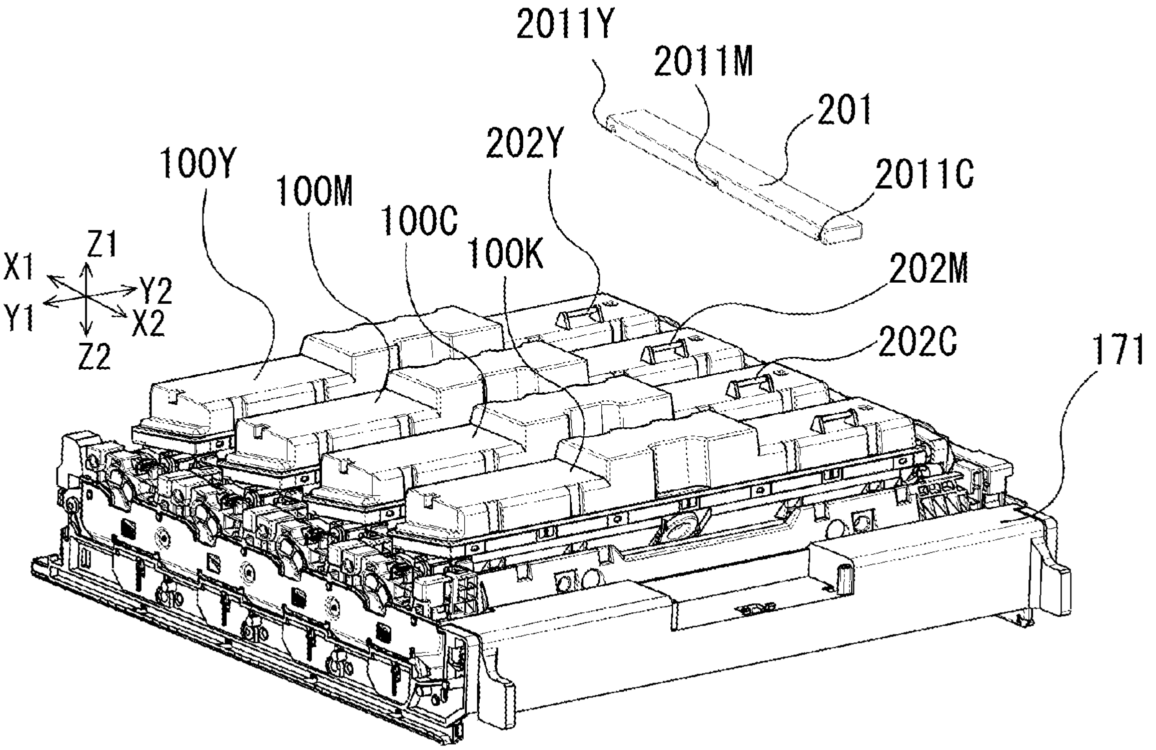

First, referring to FIG. 42, the structure of the connecting member will be described. Part (a) of FIG. 42 is a perspective view of the process cartridge 100 and the tray 171 wherein the process cartridge 100 is mounted on the tray 171, the connecting member 201 is dismountably mounted to the process cartridges 100Y, 100M, and 100C, and the front door closed. Since the position and attitude of the process cartridge 100 are fixed as described above in the state of part (a) of FIG. 42, the position of the swing axis K of the developing unit 109 of the process cartridge 100 is fixed. Part (b) of FIG. 42 is a perspective view of the same state as part (a) of FIG. 42 but is a view before the connecting member 201 is mounted.

As shown in FIG. 42, the connecting member 201 is provided (removably mounted) on the upper portion of the process cartridges 100Y, 100M and 100C. Support shafts 202Y, 202M and 202C extend substantially parallel to the axial direction of the photosensitive drums, and are provided on tops of the developing units 109Y, 109M and 109C, respectively. The connecting member 201 is a plate-shaped member provided with three grooves (engaging portions/connecting portions) 2011Y, 2011M, and 2011C which are open downward. The connecting member 201 is supported rotatably with respect to the support shafts 202Y, 202M and 202C by engagement (connect) between groove portions 2011Y, 2011M, and 2011C and the support shafts (engaged portions/connected portions) 202Y, 202M and 202C provided on the developing units 109Y, 109M and 109C, respectively. At this time, a line connecting the support shafts 202Y, 202M and 202C and a line connecting the swing shafts KY, KM and KC of the process cartridges 100Y, 100M and 100C are parallel to each other, and the distance between support shaft 202Y and the support shaft 202M is made equal to the swing axis KY of the process cartridge 100Y and the swing axis KM of the process cartridge 100M. In addition, and the distance between support shaft 202M and the support shaft 202C is made equal to the swing axis KM of the process cartridge 100M and the swing axis KC of the process cartridge 100C. That is, a parallel linkage mechanism is formed by the swing shafts KY, KM, KC and the support shafts 202Y, 202M, 202C which are joints of link.

After the process cartridge 100 is mounted on the tray 171 as described above, the connecting member 201 is mounted downward (Z2 direction in part (b) of FIG. 42 from above. At that time, the grooves 2011Y, 2011M, and 2011C of the above-described connecting member are fitted to the support shafts 202Y, 202M, and 202C of the process cartridge 100, respectively. At this time, a retaining portion may be provided in the groove portion 2011 so that the connecting member does not drop off the process cartridge 100.

Figure 43:
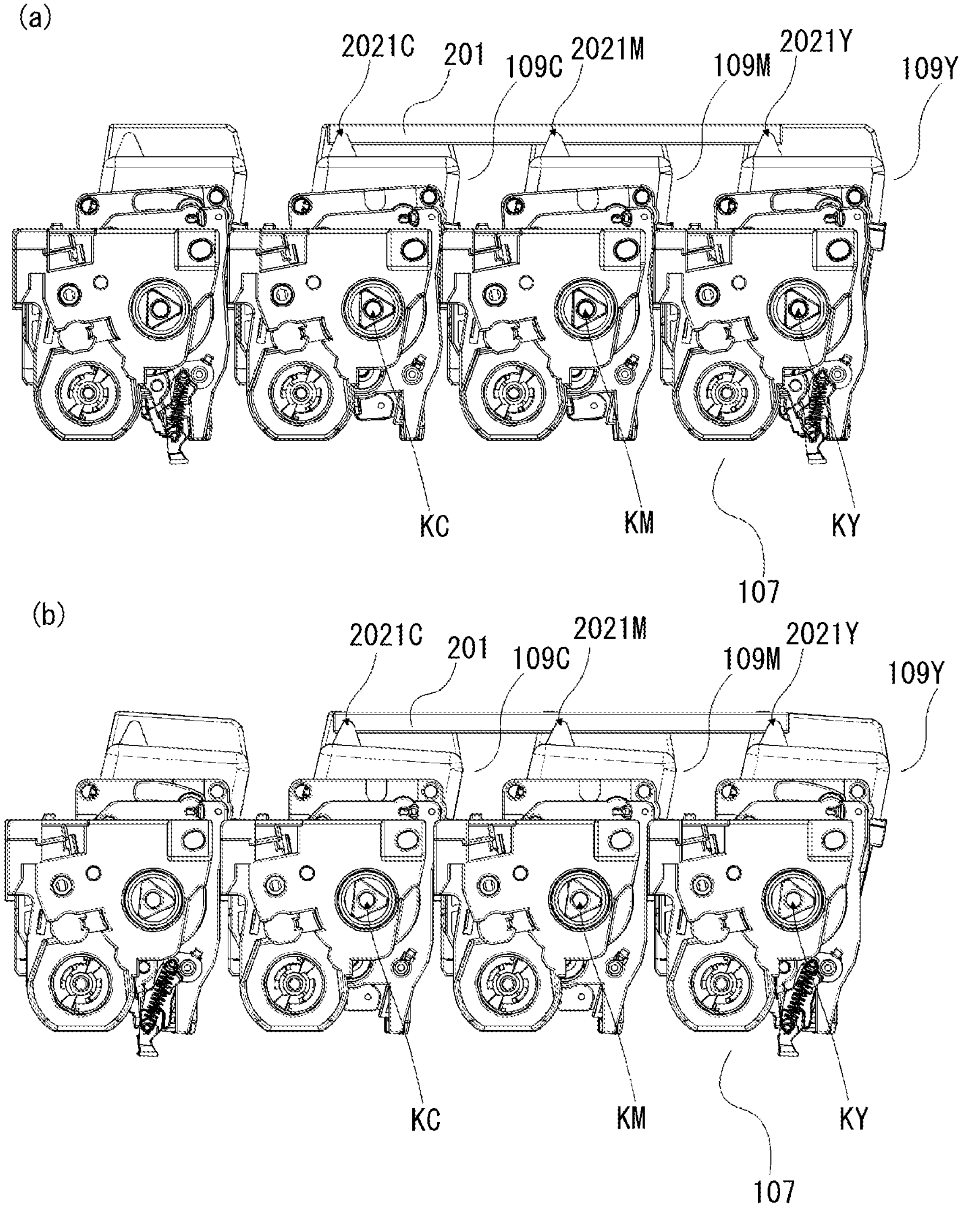
FIG. 43 is side views of a drive-side of the process cartridge with the front door closed in Embodiment 1.

Next, referring to part (a) of FIG. 43 and part (b) of FIG. 43, the separating and contacting operations of the process cartridges 100M and 100C will be described. Part (a) of FIG. 43 and part (b) of FIG. 43 are drive-side side view of the process cartridges, wherein the connecting member 201 is mounted on the process cartridge 100Y, the process cartridge 100M and the process cartridge 100C, the process cartridges 100Y, 100M, 100C and 100K are mounted on the tray 171, and the front door is closed. Part (a) of FIG. 43 shows a state in which the photosensitive drums 104 and the developing rollers 106 are spaced from each other, and part (b) of FIG. 43 shows a state in which the photosensitive drums 104 and the developing rollers 106 are in contact with each other. In the states of part (a) of FIG. 43 and part (b) of FIG. 43, as described above, a parallel linkage mechanism is formed by the swing shafts KY, KM, and KC and the support shafts 202Y, 202M, and 202C as joints, and the swing attitudes of the swing axes KY, KM, and KC of 109Y, 109M, and 109C are kept the same. That is, when the developing unit 109Y of the process cartridge 100Y including the separation and contact mechanism 150 is at the separated position as shown in part (a) of FIG. 43, the developing units 109M and 109C are also at the separated position. As the attitude of the developing unit 109Y shifts from the separated position to the contact position, the attitudes of the developing units 109M and 109C also shift from the separated position to the contact position, resulting in the state shown in part (b) of FIG. 43. The same applies when the attitude of the developing unit 109Y shifts from the contact position to the separation position.

Figure 44:
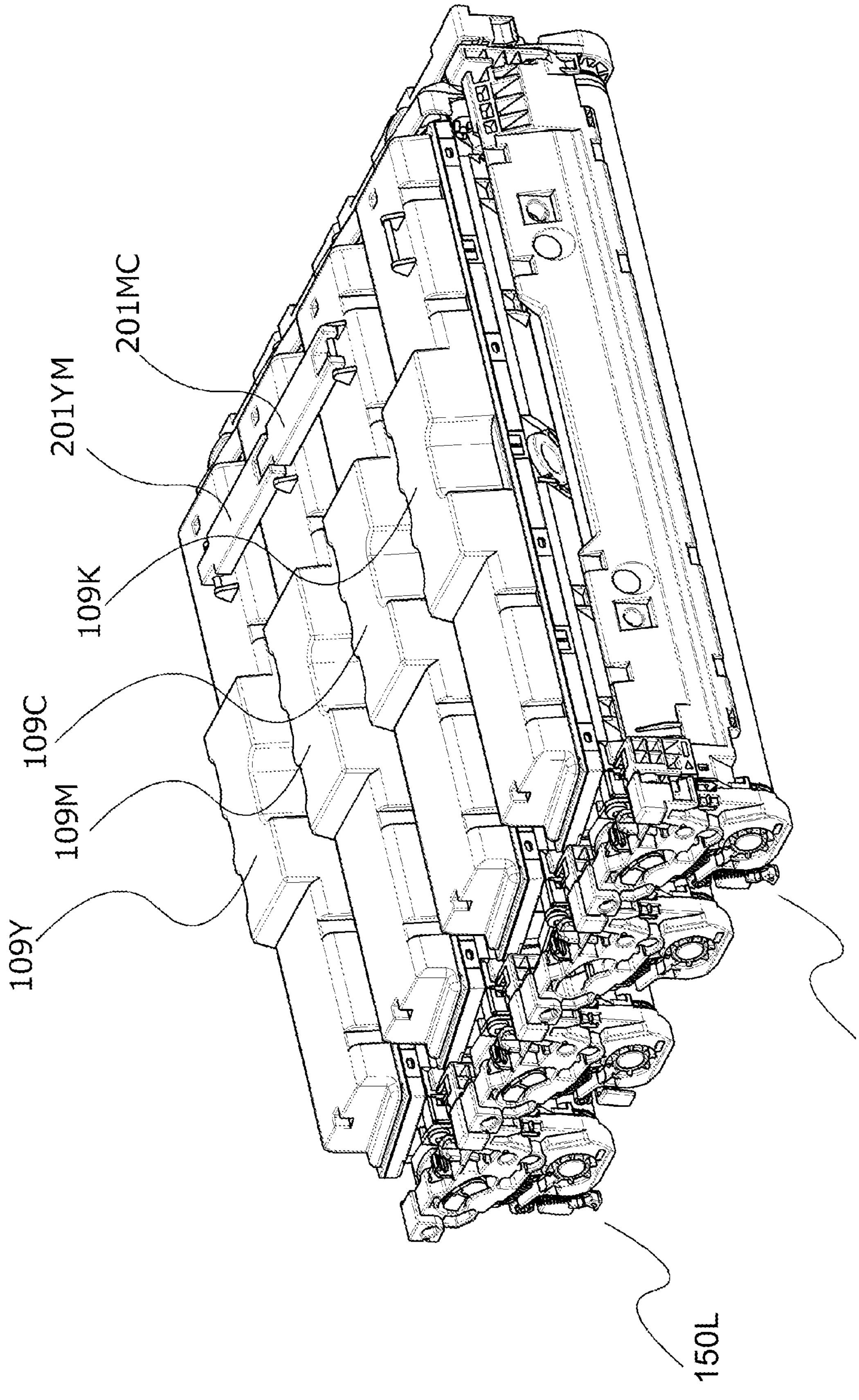
FIG. 44 is a perspective view of the process cartridge with the front door closed in Embodiment 1.

In this embodiment, the connecting member 201 is one parallel link rotatably supported by the support shafts 202Y, 202M, and 202C, but as shown in FIG. 44, it may comprise two links which are rotatably supported on two supporting shafts, respectively. FIG. 44 is a perspective view of the process cartridges 100Y, 100M, 100C and 100K inside the main assembly with the front door closed. Grooves 2011Y1 and 2011M1 of connecting member 201YM are rotatably supported by support shafts 202Y and 202M, respectively, and grooves 2011M2 and 2011C1 of connecting member 201MC are rotatably supported by support shafts 202M and 202C, respectively. The connecting member 201YM is rotatably supported by the support shafts 202Y and 202M, and therefore, the distance between the support shafts 202Y and 202M is kept constant. In addition, as described above, when the main assembly front door is closed, the positions of the swing shafts KY, KM, and KC are fixed. Therefore, because of the action of the connecting member 201YM, a parallel linkage mechanism is established by the swing shafts KY and KM of the process cartridges 100Y and 100M and the support shafts 202Y and 202M as joints, and the swing attitudes of the developing units 109Y and 109M about the swing shafts KY and KM are kept the same. Similarly, because of the action of the connecting member 201MC, the swing attitudes of the developing units 109M and 109C about the swing shafts KM and KC are kept the same. As described above, the swing attitudes of the developing units 109Y, 109M, and 109C about the swing axes KY, KM, and KC are kept the same, and therefore, the developing units 109M and 109C are moved in interrelation with the separation and contact operations of the developing unit 109Y.

Figure 45:
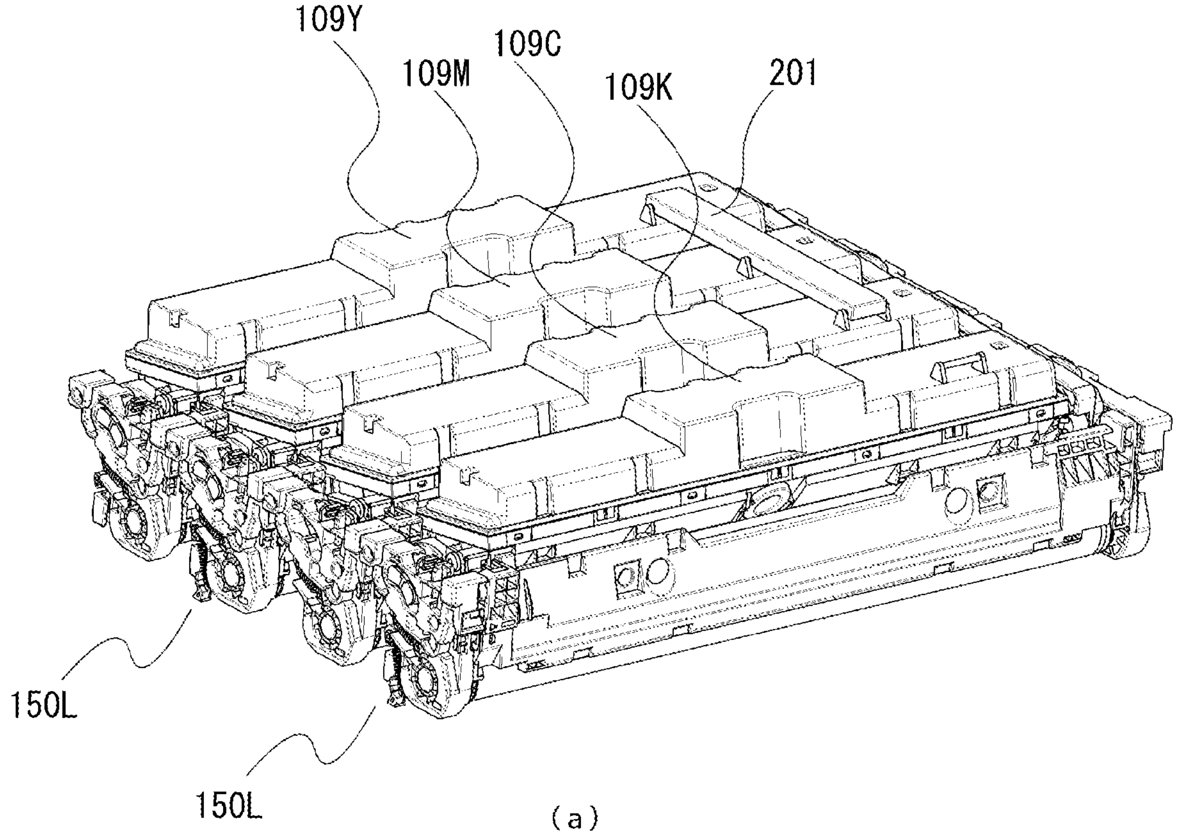
FIG. 45 is perspective views of the process cartridge with the front door closed in Embodiment 1.
Figure 45:
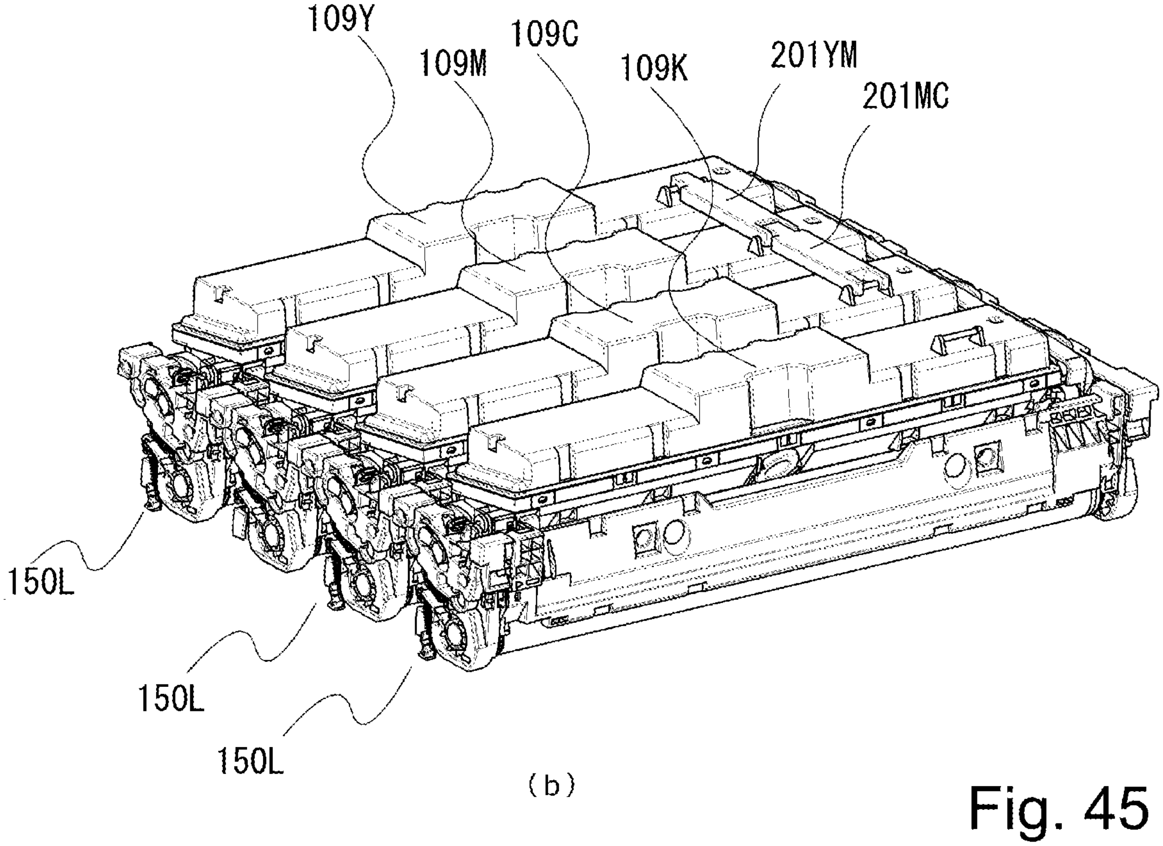

In this embodiment, the process cartridge having the separation and contact mechanism 150 among the process cartridges 100Y, 100M, and 100C is the process cartridge 100Y, but the present invention is not limited to such an example. In addition, two process cartridges may be provided with the separation and contact mechanism 150. FIG. 45 is a perspective view of the process cartridges 100Y, 100M, 100C and 100K inside the main assembly with the front door closed. For example, as shown in part (a) of FIG. 45, only the process cartridge 100M may have the separation and contact mechanism 150. Similarly, as shown in part (b) of FIG. 45, only the process cartridges 100Y and 100C may have the separation and contact mechanism 150. Here, part (a) of FIGS. 45 and 45(*b*) show the non-drive-side separation and contact mechanism 150L. In addition, although not shown, only the process cartridge 100C may have the separation and contact mechanism 150. Only the process cartridges 100Y and 100M may have the separation and contact mechanism 150. Only the process cartridges 100M and 100C may have the separation and contact mechanism 150. In any of the above-described cases, it will suffice if the connecting member 201 is rotatably connected to the developing unit or units of the process cartridge or cartridges which do not have all the separation and contact mechanism and to the developing unit or units of the process cartridge or cartridges which have the separation and contact mechanism. For example, in part (b) of FIG. 45, although connecting members 201YM and 201MC are provided, it will suffice if either one of them is provided.

Figure 46:
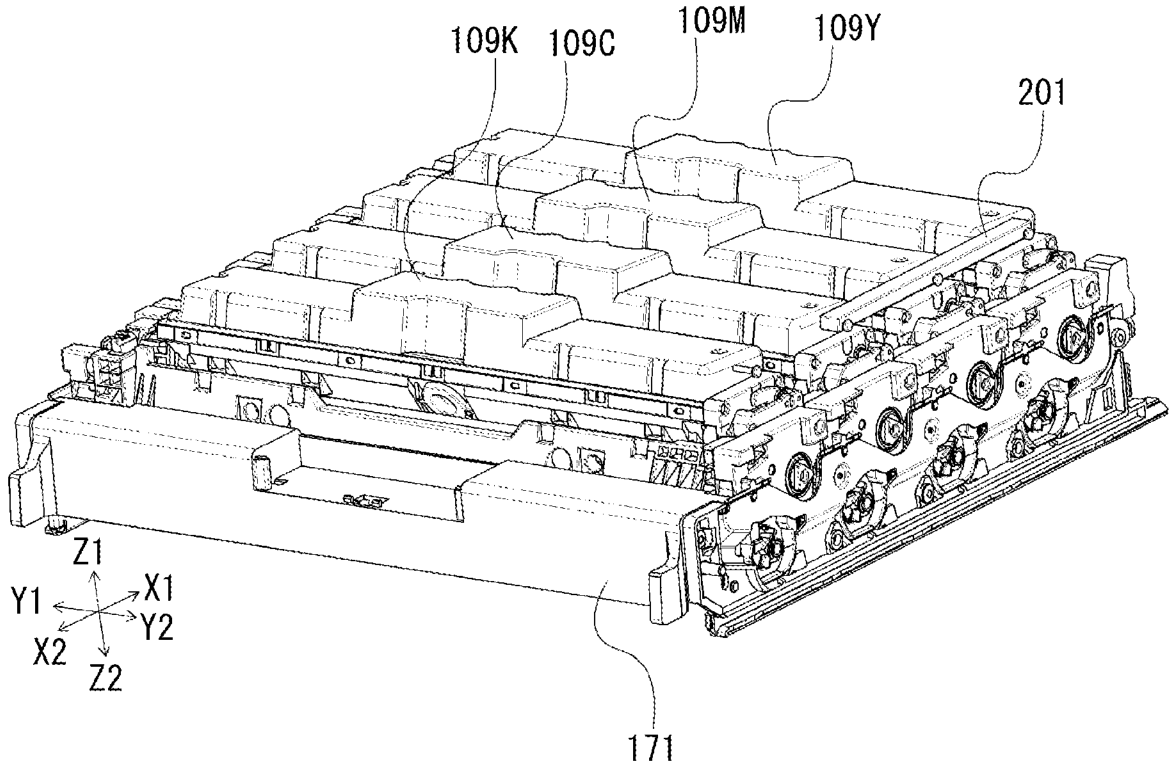
FIG. 46 is perspective views of the process cartridge with the front door closed in Embodiment 1.
Figure 46:
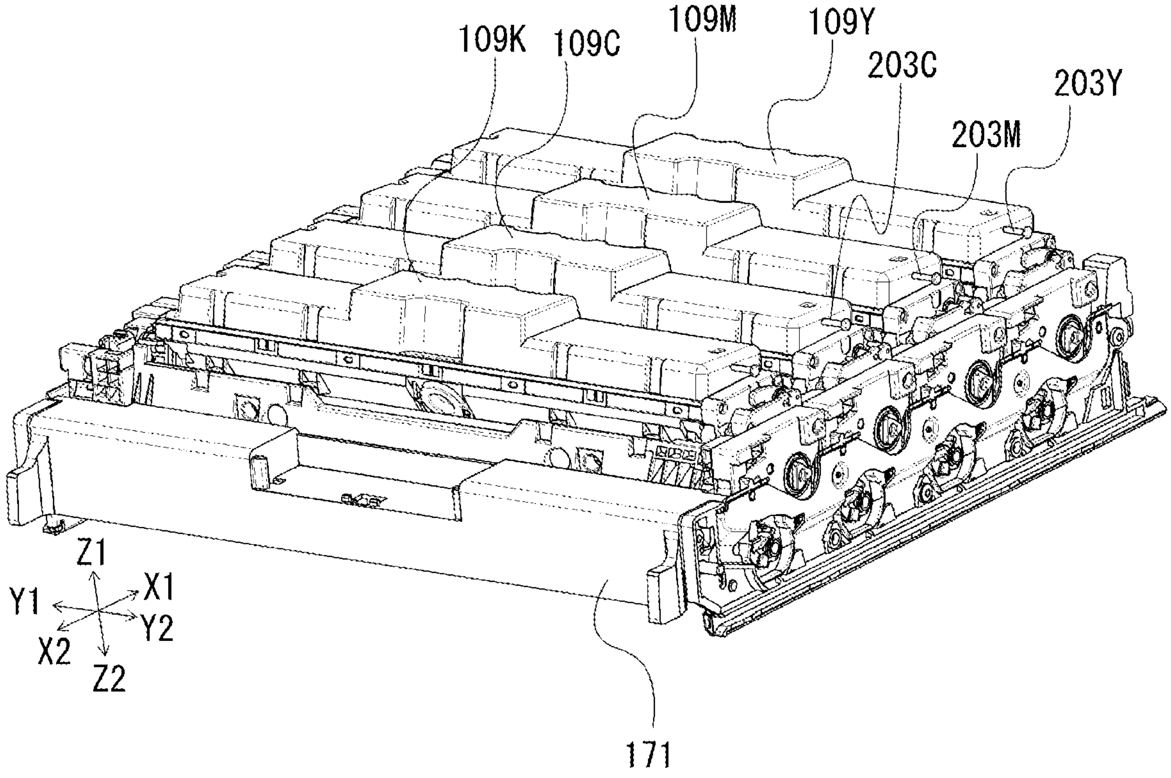

Also, in this embodiment, the support shaft is provided at the top part of the developing unit, but this is not the only possibility. Part (a) of FIG. 46 is a perspective view of the connecting member and the process cartridge in a state where the connecting member 201 and the process cartridge 100 are mounted on the tray 171 and the front door is closed. Part (b) of FIG. 46 shows the same state as part (a) of FIG. 46, but the connecting member 201 is not shown. As shown in part (a) of FIG. 46 and part (b) of FIG. 46, support shafts 203Y, 203M and 203C may be provided on the side surfaces of developing units 109Y, 109M and 109C. In addition, in this embodiment, one support shaft 203Y, one support shaft 203M, and one support shaft 203C are on the drive-side (the side including the driving structure) of respective developing unit in the longitudinal direction of the process cartridge, but the present invention is not limited to such an example. For example, each developing unit may have one supporting shaft provided on the non-drive-side (the end in the Y2 direction in part (a) of FIG. 43 and part (b) of FIG. 43), or may be provided with one on each side.

Figure 47:
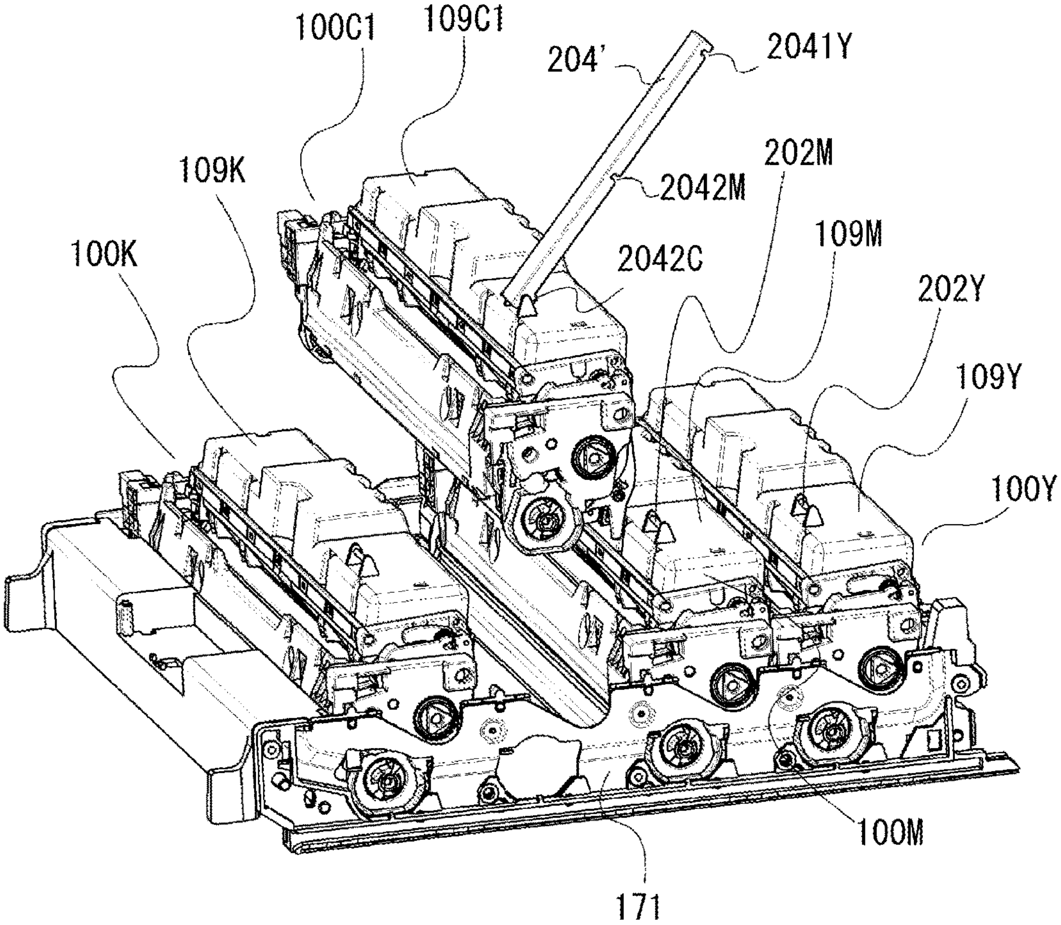
FIG. 47 is perspective views of the process cartridge and tray in Embodiment 1 (modification).
Figure 47:
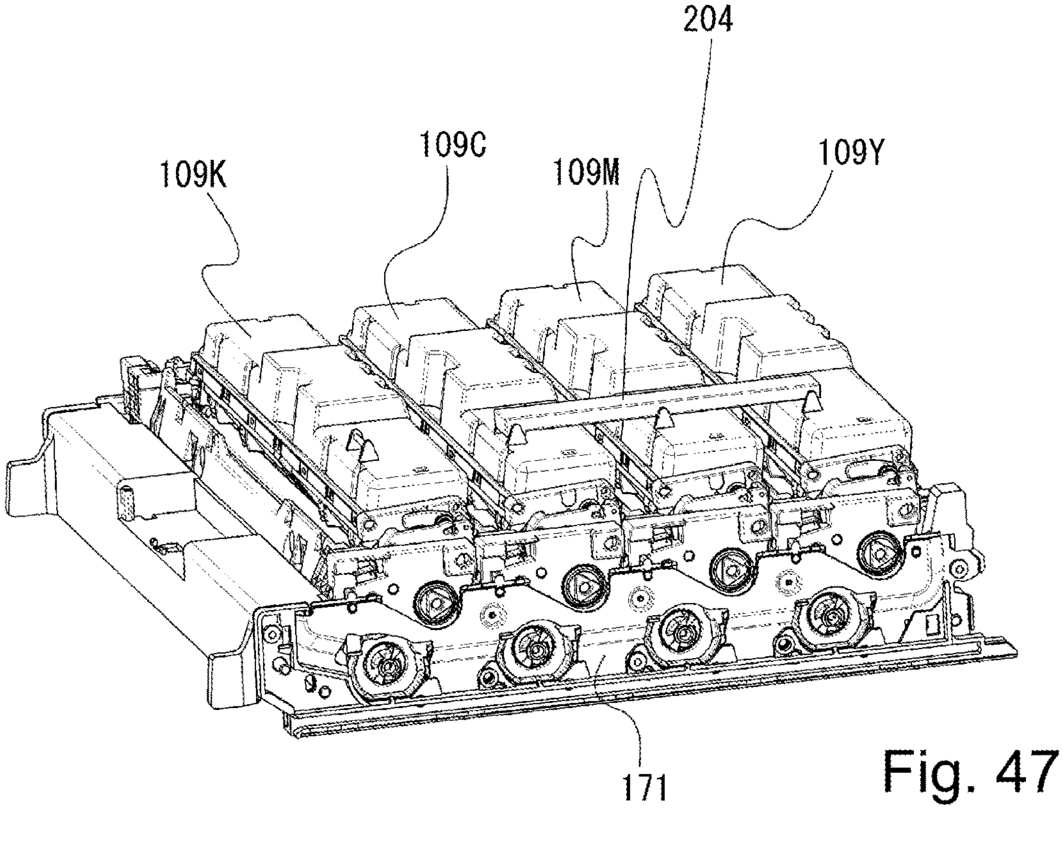

In this embodiment, the user assembles the connecting member 201 to the process cartridges 100Y, 100M, and 100C mounted on the tray 171, but this is not the only one option. Part (a) of FIG. 47 and part (b) of FIG. 47 are perspective views of the process cartridges 100Y, 100M, 100C1 and 100K and the tray 171. As shown in part (a) of FIG. 47, the connecting member 204 is provided on the process cartridge 100C1 and is rotatably supported by the support shaft 202*c*. As shown in part (a) of FIG. 47, the process cartridges 100Y, 100M, and 100K are first mounted on the tray 171, and then the process cartridge 100C1 is mounted on the tray 171, and a groove portion 2041Y and a groove portion 2041M of the connecting member 204 are engaged with the support shafts 202Y and 202M of the process cartridges 100Y and 100M, respectively, as shown in part (b) of FIG. 47. However, the connecting member 204 is not provided limitedly on the process cartridge 100C1, and may be provided on the process cartridge 100Y or the process cartridge 100M.

Figure 48:
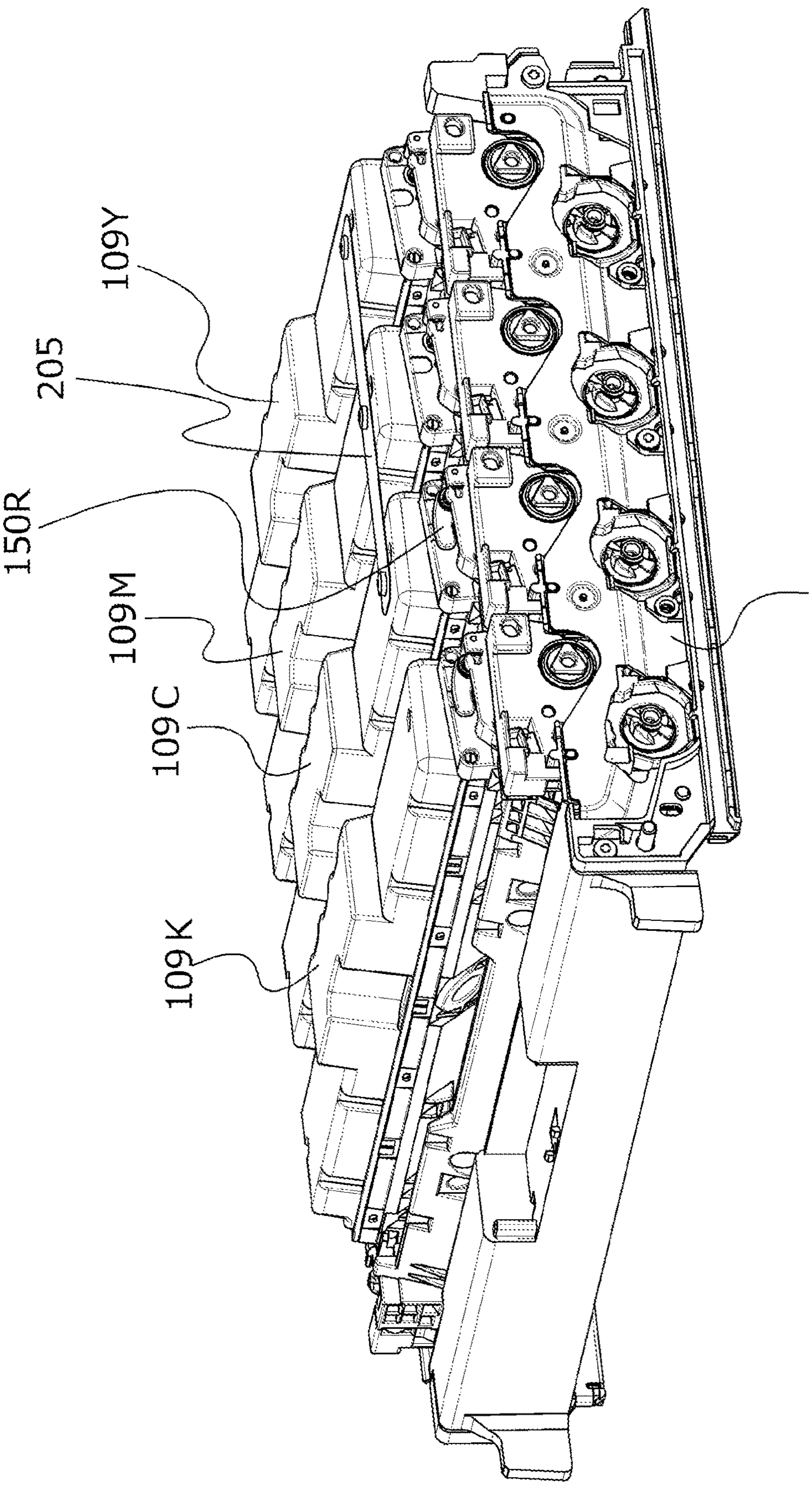
FIG. 48 is a perspective view of the process cartridge and tray in Embodiment 1 (modification).

In this embodiment, the connecting member 201 is rotatably supported by the support shafts 202Y, 202M, and 202C provided on the process cartridges 100Y, 100M, and 100C, but the present invention is not limited to such an example. FIG. 48 is a perspective view of a state in which the process cartridge 100 is mounted to the tray 171 and the connecting member 205 is mounted. The connecting member 205 is a member (flexible material, such as a string-like member) capable of transmitting force in the tensile direction but not capable of transmitting force in the compressive direction, and is connected with the developing unit 109Y, 109M and 109C of the process cartridges 100Y, 100M and 100C. Although many connection methods are available, for example, they may be fastened with screws. Since the connecting member 205 is made of a flexible material, it cannot transmit a force in the compressive direction. Therefore, in the case that the connecting member 205 is provided and the upper part of the developing unit as shown in FIG. 48, the separation and contact mechanism 150 is provided on the process cartridge 100C. As another alternative, the connecting member is provided with a projection shape such as a boss or rib, the process cartridge is provided with a recess shape such as a groove or step, and the projection shape is engaged with the recess shape. In any case, the connecting member may be dismountably mounted to at least one cartridge. Further, it will suffice if the connecting member is removable from the main assembly of the image forming apparatus by the connecting member being removed from the cartridge or by the process cartridge being removed from the main assembly of the image forming apparatus.

Figure 49:
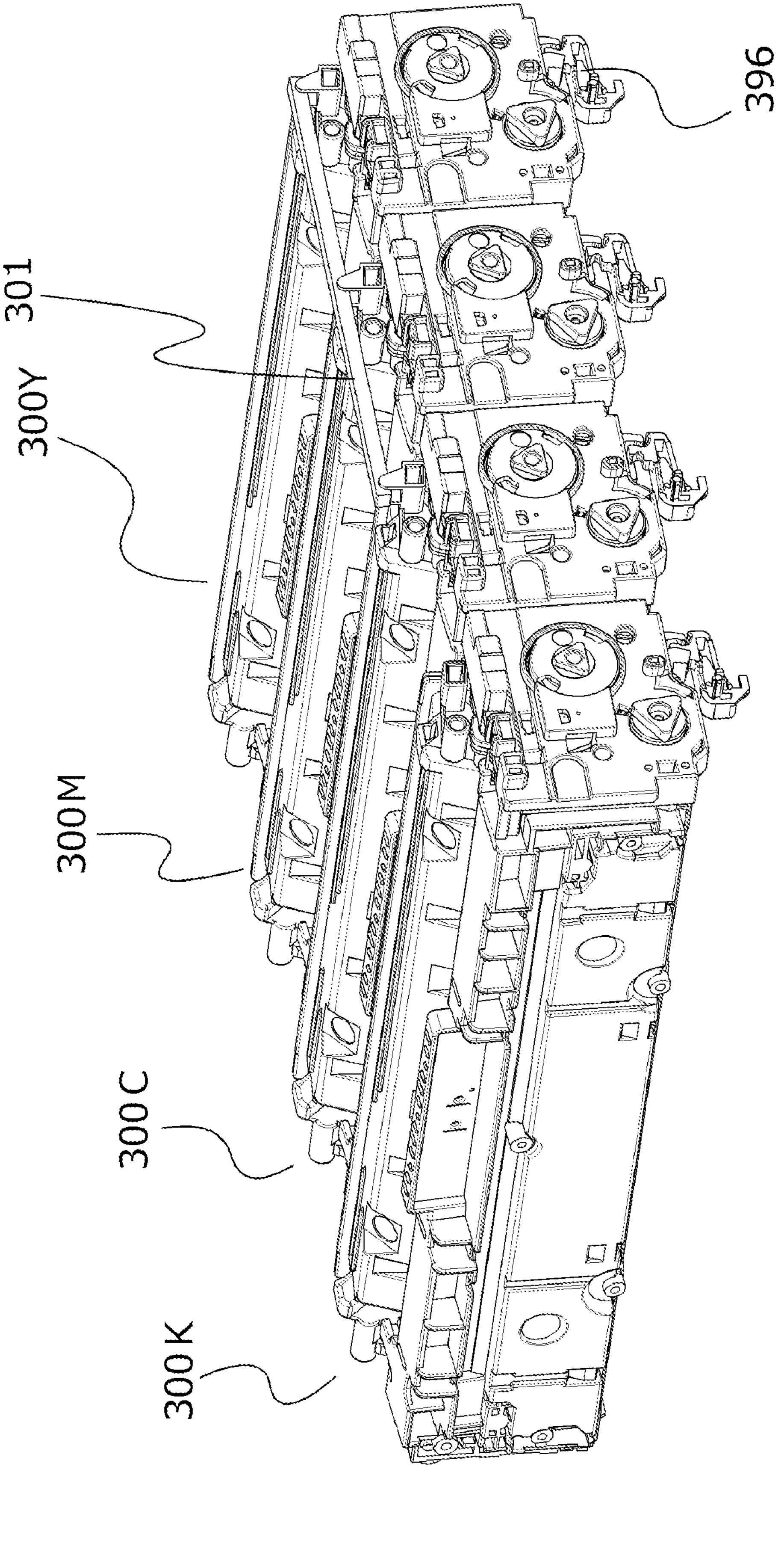
FIG. 49 is a perspective view of the process cartridge accommodated in the main assembly of the apparatus according to the Embodiment 1 (modification).

Heretofore, the description has been made as to examples in which at least one of the process cartridges 100Y, 100M, and 100C has the separation and contact mechanisms 150R and 150L, and the separation and contact mechanisms 150R and 150L are each provided with force applying members 152R and 152L, but the present invention is not limited to such an example. FIG. 49 is a perspective view wherein, a process cartridge 300 including no force application member as a separation and contact mechanism is mounted on a tray (not shown), and a connecting member 301 is mounted on the process cartridges 300Y, 300M, and 300C, in the state of having been mounted in the main assembly. The process cartridge 300Y performs a contact separation operation by an operation which will be described hereinafter. Similarly to the above-described contact separation operation of the process cartridges 100M and 100C the process cartridges 300M and 300C also perform the contact separation operation synchronism with the contact separation operation of the process cartridge 300Y by way of the action of the connecting member 301.

Figure 50:
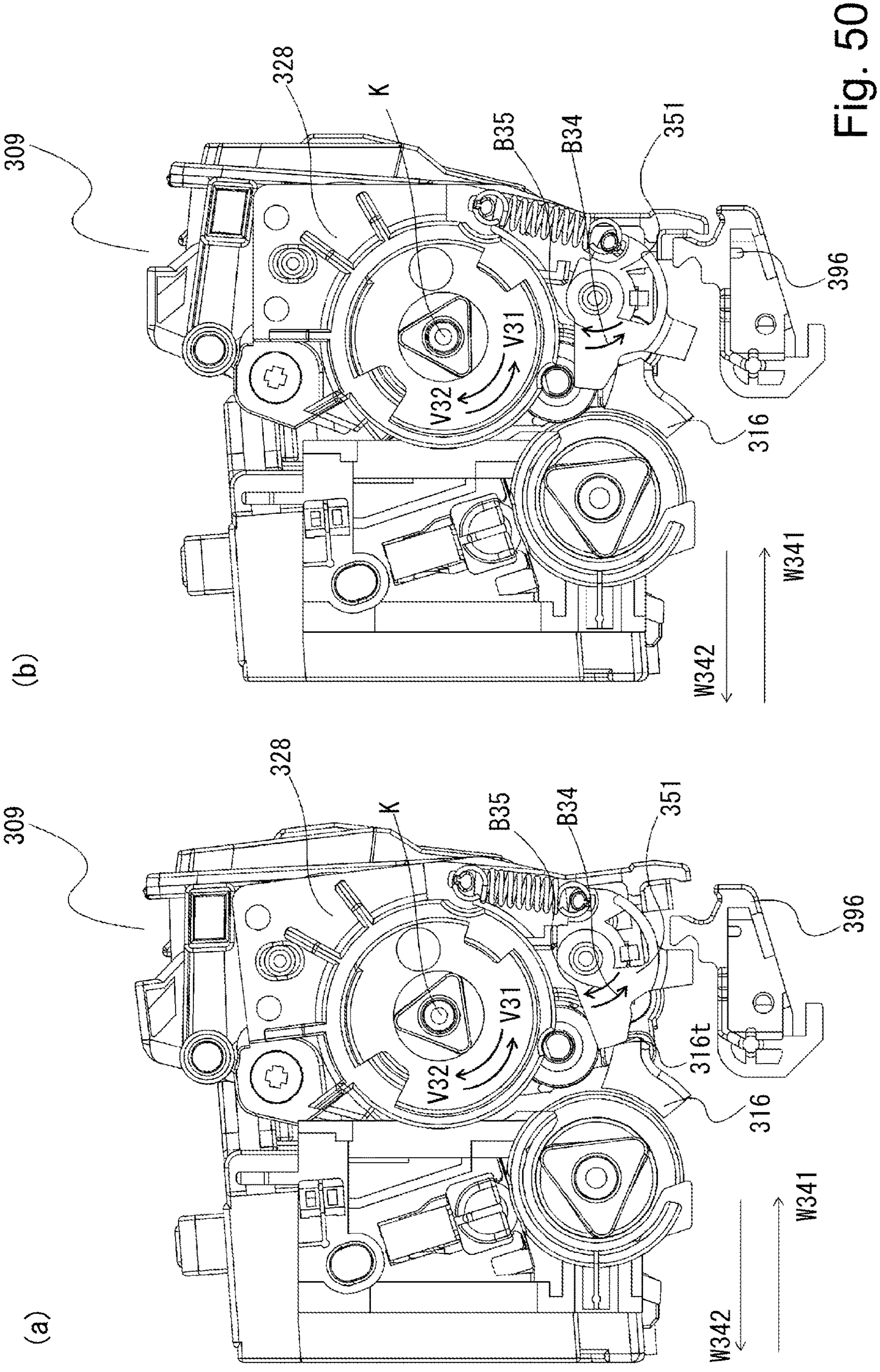
FIG. 50 is illustrations of a cartridge separating operation without the provision of the force applying member in the Embodiment 1 (modification).

Referring to part (a) of FIG. 50 and part (b) of FIG. 50, The description will be made as to the separation operation of the process cartridge 300 having no force application member as the separation/contact mechanism will be described. Part (a) of FIG. 50 is a partial cross-sectional view of the process cartridge 300 and the separation control member 396 at the time when the process cartridge 300 is in the separated state, and part (b) of FIG. 50 is a partial cross-sectional view of the process cartridge 300 and the separation control member 396 when the process cartridge 300 is in the contact state. When the developing unit 309 of the process cartridge 300 is in the spaced position (state shown in part (a) of FIG. 50), the separation holding member 351 rotatably provided on the developing cover member 328 abuts against a contact surface 316*t* the drive-side cartridge cover member 316. By this, the developing unit 309 is maintained at the separated position. When the process cartridge 300 shifts from the separated state to the abutment state, the separation control member 396 moves in the W342 direction, and contacts the separation holding member 352, so that the separation holding member 352 rotates in the B35 direction. Then, the developing unit 309 moves to the contact position about the swing axis K by the same mechanism as the contact operation of the process cartridge 100 including the separation and contact mechanism 150, and the separation control member 396 returns to the home position (state of part (b) of FIG. 50). Next, referring to part (a) of FIG. 50 and part (b) of FIG. 50, the separation operation will be described. When the developing unit 309 of the process cartridge 300 shifts from the contact position (the state shown in part (b) of FIG. 50) to the separated state, the separation control member 396 moves in the W343 direction, and the developing unit 309 contacts the pressed surface 328*h* so that developing unit rotates in the direction V31. Then, the developing unit 309 is maintained at the separated position by the separation holding member 351 by the same mechanism as the separation operation of the process cartridge 100 including the separation and contact mechanism 150 described above, and the separation control member 396 returns to the home position (FIG. 50 (state of a)).

INDUSTRIAL APPLICABILITY

There are provided a connecting member capable of connecting a plurality of process cartridges, a plurality of process cartridges connected by the connecting member, and an image forming apparatus including a plurality of process cartridges.

The present invention is not limited to the embodiments described above, and various modifications and variations are possible without departing from the spirit and scope of the present invention. Accordingly, the following claims are attached to publicize the scope of the invention.

This application claims priority based on Japanese Patent Application No. 2020-156781 filed on Sep. 17, 2020, and the entire contents of the description are incorporated herein.

The invention claimed is:

1. A process cartridge detachably mountable to a main assembly of an image forming apparatus, another process cartridge including a force receiving portion being detachably mountable to the main assembly and the main assembly including a force applying portion, the process cartridge comprising:

a photosensitive member;

a first frame rotatably supporting the photosensitive member;

a developing member for depositing toner onto the photosensitive member;

a second frame rotatably supporting the developing member and movable relative to the first frame between a developing position in which the developing member is in contact with the photosensitive member and a retracted position in which the developing member is more remote from the photosensitive member than in the developing position; and a connecting member capable of connecting the second frame and the other process cartridge, the connecting member being elongated at least in a direction intersecting with a longitudinal direction of the second frame, and the connecting member being removable from the other process cartridge and from the main assembly together with the second frame, and the force receiving portion of the other process cartridge receives a force from the force applying portion of the main assembly, and wherein, when connecting the second frame and the other process cartridge, the connecting member moves the second frame from the developing position to the retracted position in response to the movement of the other process cartridge by the force receiving portion of the other process cartridge receiving the force from the force applying portion of the main assembly.

2. A connecting member removable from a main assembly of an image forming apparatus and detachably mountable to first and second process cartridges mountable to the image forming apparatus, wherein the first and second process cartridges each include a photosensitive member, a first frame rotatably supporting the photosensitive member, a developing member for depositing toner onto the photosensitive member, a second frame rotatably supporting the developing member and movable relative to the first frame between a developing position in which the developing member is in contact with the photosensitive member and a retracted position in which the developing member is more remote from the photosensitive member than in the developing position, the connecting member comprising:

an engaging portion for engaging with engaged portions provided on the second frames of the first and second process cartridges, wherein the connecting member is elongated at least in a direction intersecting with a longitudinal direction of the second frame, wherein the main assembly of an image forming apparatus includes a force applying portion and the first process cartridge includes a force receiving portion for receiving a force from the force applying portion of the main assembly to move the second frame of the first process cartridge from the developing position to the retracted position, wherein the connecting member connects the first and second process cartridges so that movements of the first and second process cartridges from the developing positions to the retracted positions are interrelated with each other in a state in which the engaging portion is in engagement with the engaged portion when the second frame of the first process cartridge is moved from the developing position to the retracted position by the force receiving portion of the first process cartridge receiving the force from the force applying portion of the main assembly, and wherein, when the engaging portion of the connecting member is engaged with the engaged portion of the second process cartridge, the connecting member is removable from the main assembly of the image forming apparatus together with the second process cartridge.

3. A connecting member according to claim 2, further comprising a plurality of such engaging portions.

4. A connecting member according to claim 2, wherein the connecting member rotatably connects with the second frames of the first and second process cartridges.

* * * * *